(12) United States Patent
Rony et al.

(10) Patent No.: US 12,653,165 B2
(45) Date of Patent: Jun. 16, 2026

(54) AQUATIC THERMAL REFUGIUM SYSTEM, DEVICE AND METHODS

(71) Applicant: NDSU Research Foundation, Fargo, ND (US)

(72) Inventors: Mohammad Rajib Uddin Rony, Fargo, ND (US); Adam Gladen, Fargo, ND (US); Jeremy Kientz, Rapid City, SD (US)

(73) Assignee: NDSU Research Foundation

( * ) Notice: Subject to any disclaimer, the term of this patent is extended or adjusted under 35 U.S.C. 154(b) by 248 days.

(21) Appl. No.: 18/110,286

(22) Filed: Feb. 15, 2023

(65) Prior Publication Data

US 2023/0329197 A1 Oct. 19, 2023

Related U.S. Application Data

(60) Provisional application No. 63/331,658, filed on Apr. 15, 2022.

(51) Int. Cl.
*A01K 63/00* (2017.01)
*A01K 63/06* (2006.01)

(52) U.S. Cl.
CPC .......... *A01K 63/006* (2013.01); *A01K 63/065* (2013.01)

(58) Field of Classification Search
CPC ........ F24F 13/30; F24F 5/0046; F24F 12/006; F24F 2005/0064; F24F 12/00; Y02B 30/56
See application file for complete search history.

(56) References Cited

U.S. PATENT DOCUMENTS

2014/0076979 A1* 3/2014 Weng ................ H01M 10/6567
236/74 R
2018/0006494 A1* 1/2018 Wong .................... A01K 63/06

FOREIGN PATENT DOCUMENTS

JP S603727 Y2 * 2/1985
KR 20130043804 A * 5/2013

OTHER PUBLICATIONS

Rony, "Design and Evaluation of a Thermal Refuge for Cold Water Species: A Dissertation," May 2023, North Dakota State University of Agriculture and Applied Science), 142 pages.
Rony et al., "Design and Evaluation of Lab-Scale, Heat Exchanger Prototypes to Provide Thermal Refugia for Trout," Academic Research Paper—North Dakota State University & South Dakota Game, Fish, and Parks, Jul. 1, 2022, 11 pages.

(Continued)

*Primary Examiner* — Harry E Arant
(74) *Attorney, Agent, or Firm* — Mueting Raasch Group

(57) ABSTRACT

A system to provide at least one thermal refugium in a body of water. The system includes at least one enclosure configured to partially isolate at least one local volume of water, at least one heat exchanger within the enclosure, a thermal apparatus operably coupled to the heat exchanger, and a controller operably coupled to the thermal apparatus. The heat exchanger transfers heat into or out of the local volume of water. The thermal apparatus transfers the heat in and out of a fluid being circulated between the thermal apparatus and the heat exchanger. The controller is configured to control the transfer of the heat into or out of the local volume of water to maintain a local temperature in the local volume of water sustainable for wildlife living in the body of water.

20 Claims, 61 Drawing Sheets

(56) References Cited

OTHER PUBLICATIONS

Rony et al., "Design and Evaluation of Lab-Scale, Heat Exchanger Prototypes Designed to Provide Refugia for Trout," 15$^{th}$ International Conference on Energy Sustainability [online]. ES 2021-63934, Jun. 16-18, 2021. Presented Jun. 16, 2021. 10 pages.

Rony et al., "Experimental Investigation of a Prototype Thermal Refuge for Trout," Aug. 4, 2022, *Energies,* 15:1-13.

Shuai et al., "The Design and Application of the Water Temperature Control System for Large Aquaculture Pond," 2011, *IEEE Computer Society,* DOI 10.1109/ICMTMA.2011.756, 3 pages.

* cited by examiner

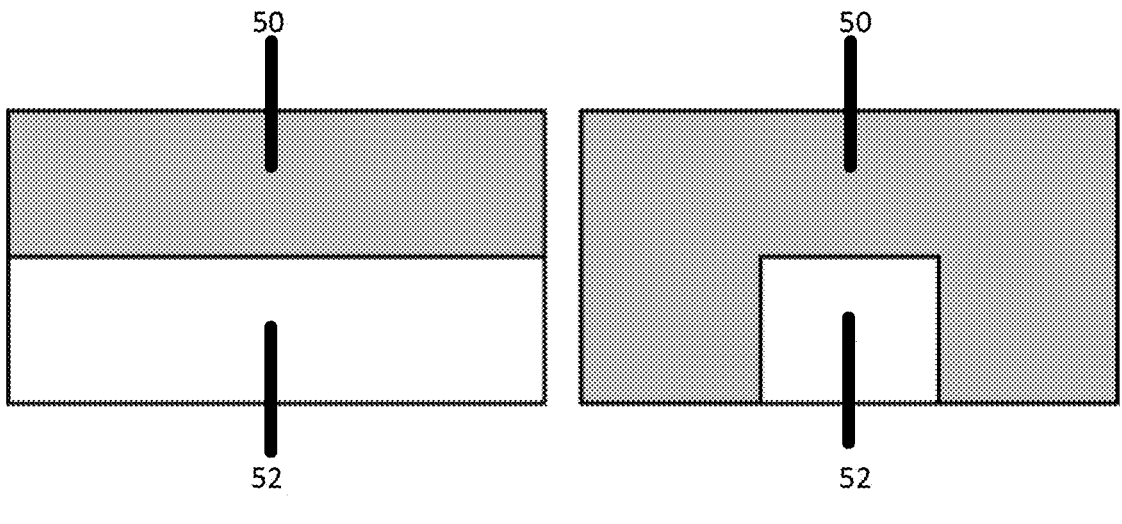
FIG. 4A          FIG. 4B
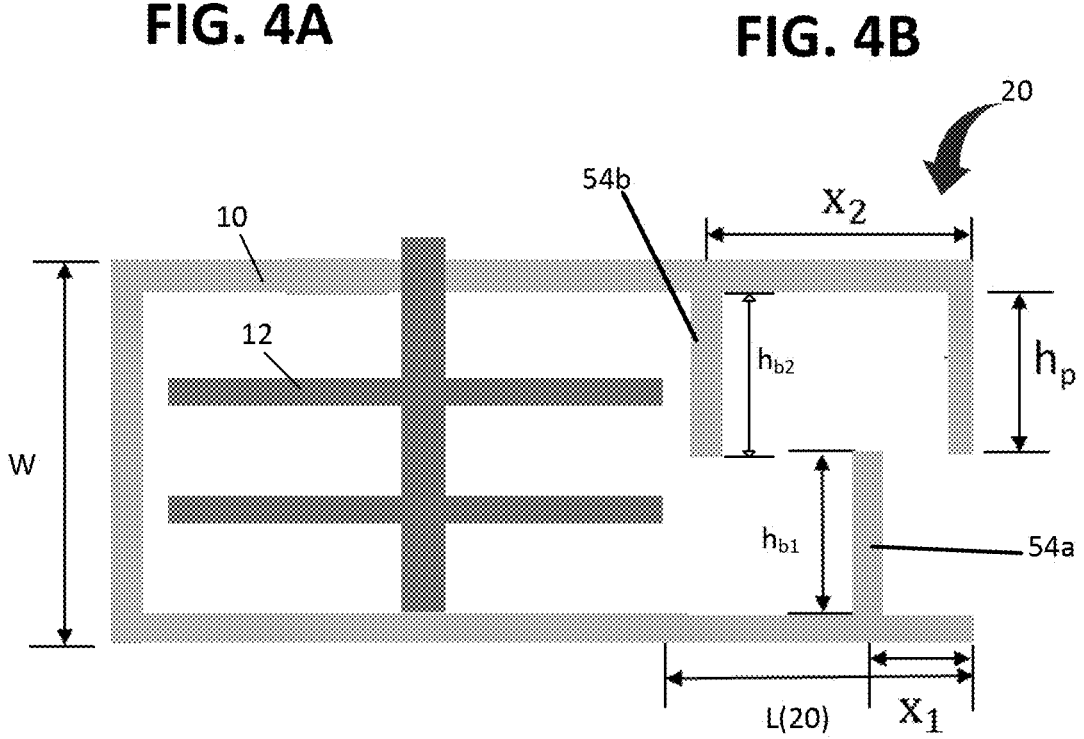
FIG. 4C

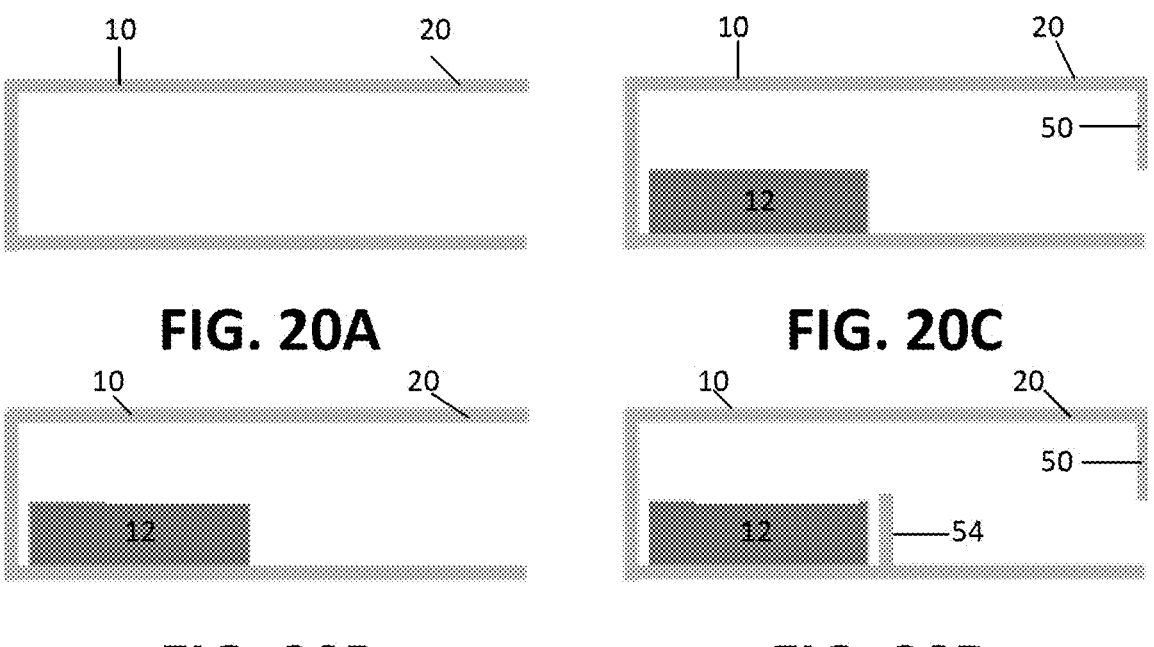
FIG. 20A
FIG. 20C
FIG. 20B
FIG. 20D
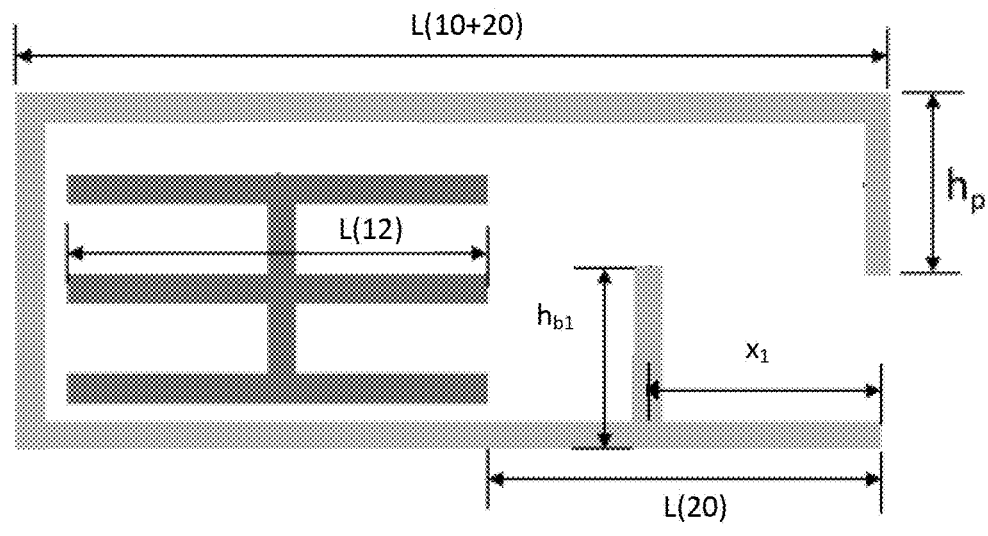
FIG. 20E

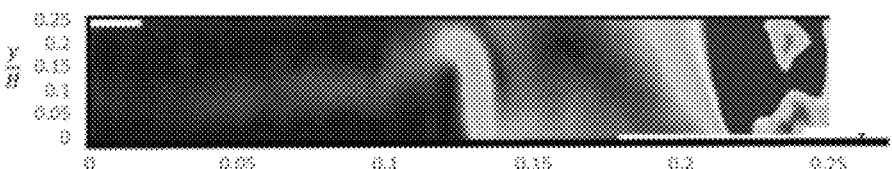
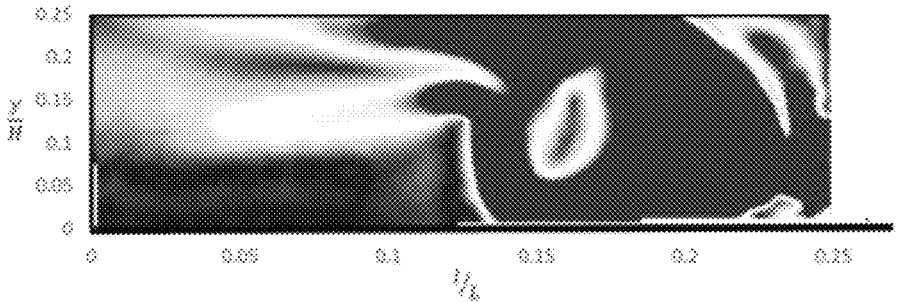
FIG. 22A
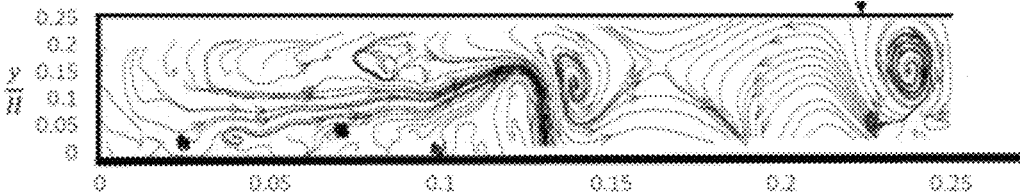
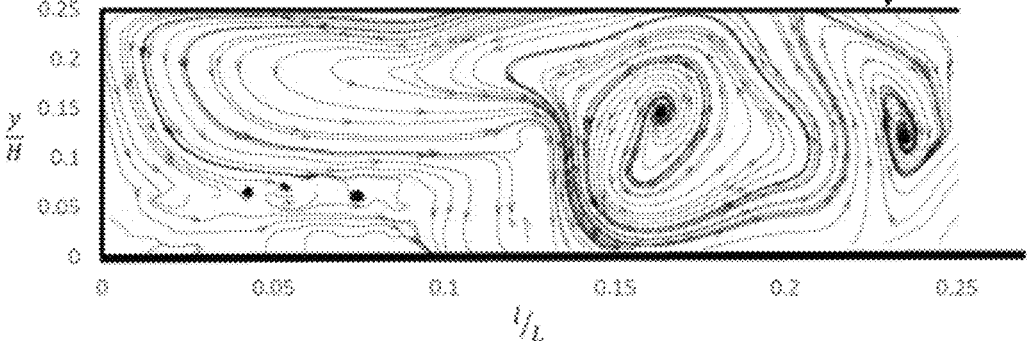
FIG. 22B

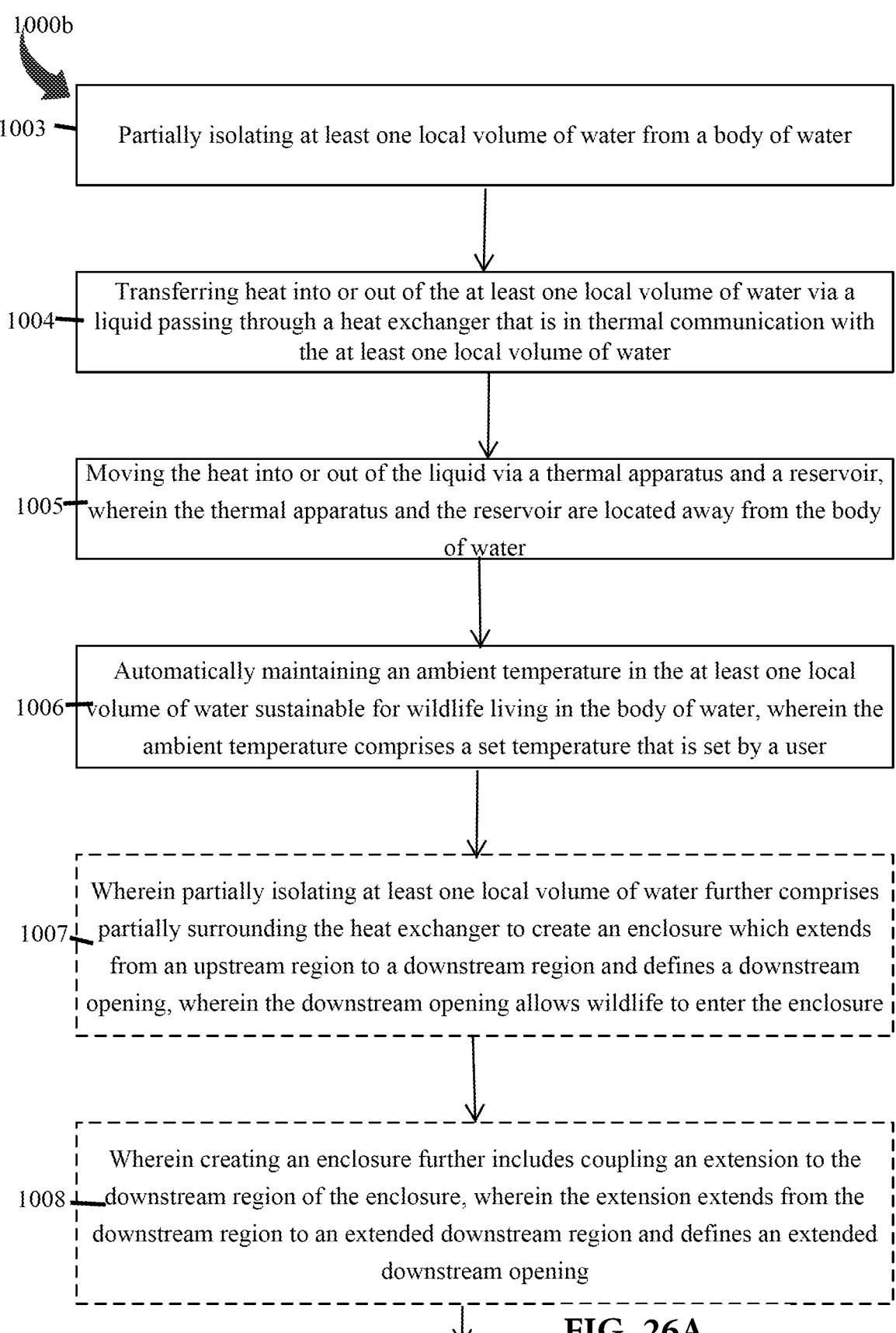

1000b

1003 — Partially isolating at least one local volume of water from a body of water 1004 — Transferring heat into or out of the at least one local volume of water via a liquid passing through a heat exchanger that is in thermal communication with the at least one local volume of water 1005 — Moving the heat into or out of the liquid via a thermal apparatus and a reservoir, wherein the thermal apparatus and the reservoir are located away from the body of water 1006 — Automatically maintaining an ambient temperature in the at least one local volume of water sustainable for wildlife living in the body of water, wherein the ambient temperature comprises a set temperature that is set by a user 1007 — Wherein partially isolating at least one local volume of water further comprises partially surrounding the heat exchanger to create an enclosure which extends from an upstream region to a downstream region and defines a downstream opening, wherein the downstream opening allows wildlife to enter the enclosure 1008 — Wherein creating an enclosure further includes coupling an extension to the downstream region of the enclosure, wherein the extension extends from the downstream region to an extended downstream region and defines an extended downstream opening

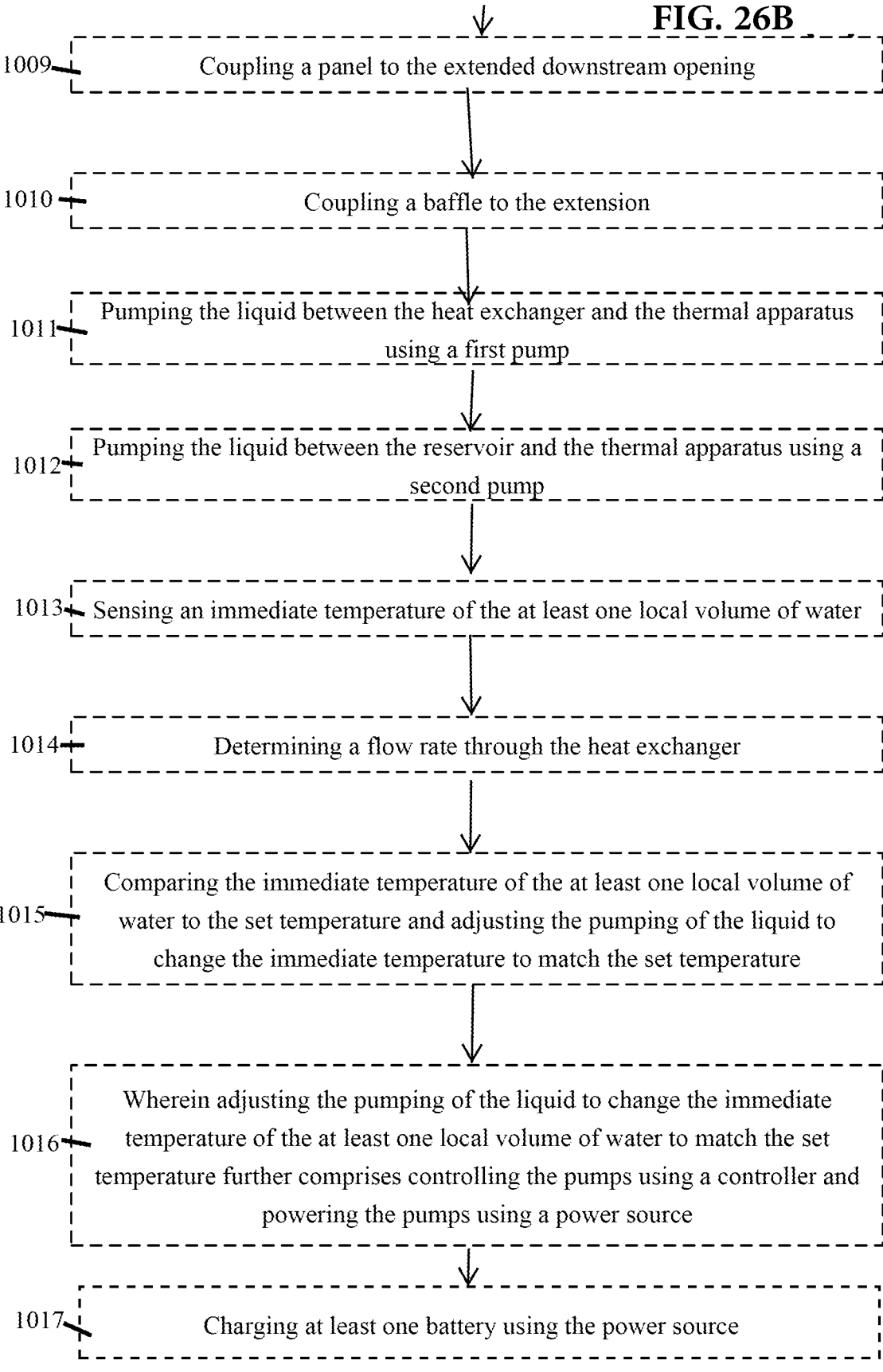

1009 — Coupling a panel to the extended downstream opening

1010 — Coupling a baffle to the extension

1011 — Pumping the liquid between the heat exchanger and the thermal apparatus using a first pump 1012 — Pumping the liquid between the reservoir and the thermal apparatus using a second pump 1013 — Sensing an immediate temperature of the at least one local volume of water 1014 — Determining a flow rate through the heat exchanger 1015 — Comparing the immediate temperature of the at least one local volume of water to the set temperature and adjusting the pumping of the liquid to change the immediate temperature to match the set temperature 1016 — Wherein adjusting the pumping of the liquid to change the immediate temperature of the at least one local volume of water to match the set temperature further comprises controlling the pumps using a controller and powering the pumps using a power source 1017 — Charging at least one battery using the power source

AQUATIC THERMAL REFUGIUM SYSTEM, DEVICE AND METHODS

RELATED PATENT DOCUMENTS

This application claims the benefit of U.S. Provisional Application No. 63/331,658, filed on Apr. 15, 2022, which is incorporated herein by reference in its entirety.

FEDERAL FUNDING

This application received federal funding under Grant #20sc06w011-01, sponsored by U.S. Fish and Wildlife Service (US DOI FWS). The title of the grant is "Using Solar-powered cooling to increase Trout Habitat." The primary listed on the grant is South Dakota Game, Fish & Parks.

SUMMARY

The present disclosure is directed to an aquatic thermal refugium suitable for installation in a body of water such as a natural stream. The thermal refugium may partially isolate a local volume of water and may ideally maintain a set temperature within the local volume of water. The set temperature may be set above or below the local volume of water local temperature and create a thermal refugium for life forms in the body of water.

In one embodiment, a system to provide at least one thermal refugium in a body of water includes at least one enclosure. The at least one enclosure is configured to partially isolate at least one local volume of water from the body of water. The system further includes at least one heat exchanger within the at least one enclosure. The heat exchanger transfers heat into or out of the at least one local volume of water to heat or cool the local volume of water. The system further includes a thermal apparatus operably coupled to the at least one heat exchanger. The thermal apparatus is configured to transfer the heat in and out of a fluid. The fluid being circulated between the thermal apparatus and the at least one heat exchanger. The system further includes a controller operably coupled to the thermal apparatus. The controller is configured to control the transfer of the heat into or out of the at least one local volume of water to maintain a local temperature in the at least one local volume of water sustainable for wildlife living in the body of water.

In another embodiment, a system to provide a thermal refugium in a body of water includes at least one enclosure. The at least one enclosure is configured to provide at least one local volume of water from the body of water. The system further includes a heat exchanger within the at least one enclosure to cool the at least one local volume of water of the body of water. The system further includes a thermal apparatus. The thermal apparatus is operably coupled to the heat exchanger. The system further includes a fluid disposed within at least one of the heat exchanger and the thermal apparatus. The system further includes a controller operably coupled to the thermal apparatus. The controller is configured to automatically maintain a local temperature of the at least one local volume of water. The local temperature comprises a set temperature that is set by a user. The system further includes a power source. The power source is operably coupled to the controller.

In another embodiment, a method includes partially isolating at least one local volume of water from a body of water. The method further includes transferring heat into or out of the at least one local volume of water via a fluid passing through a heat exchanger. The fluid is in thermal communication with the at least one local volume of water. The method further includes moving the heat into or out of the fluid via a thermal apparatus. The thermal apparatus is located away from the body of water. The method further includes automatically maintaining a local temperature in the at least one local volume of water sustainable for wildlife living in the body of water. The local temperature comprises a set temperature that is set by a user.

These and other features and aspects of various embodiments may be understood in view of the following detailed discussion and accompanying drawings.

BRIEF DESCRIPTION OF THE DRAWINGS

The discussion below makes references to the following figures, wherein the same reference number may be used to identify the similar/same component in multiple figures. The figures are not necessarily to scale.

FIGS. 4A and 4B are downstream side views of an enclosure according to an example embodiment;

FIG. 4C is a schematic side view of an enclosure according to the enclosure of FIGS. 4A and 4B;

FIGS. 20A-20D are schematic side views of various enclosures according to various example embodiments;

FIG. 20E is a schematic side view of an enclosure according to an example embodiment;

FIG. 22A is an example data set of non-dimensional velocity magnitude contour of various enclosure embodiments, each with a panel and with a baffle;

FIG. 22B is an example data set of streamlines of various enclosure embodiments, each with a panel and with a baffle;

FIGS. 26A and 26B are other example methods using the systems of FIGS. 1-24.

DETAILED DESCRIPTION

The present disclosure is generally related to a thermal refugium (plural: refugia) suitable for installation in a body of water such as a natural stream. The thermal refugium may partially isolate a local volume of water and may ideally maintain a set temperature within the local volume of water. The set temperature may be set above or below the local volume of water local temperature and create a thermal refugium for life forms in the body of water. Recent years have seen an increase in surface water temperatures in bodies of water, which has a detrimental effect on cold-water species such as trout. One possibility to resolve this issue is to create localized refugia of colder water generated through active cooling. An alternative embodiment may create localized refugia of hotter water generated through active heating, in order to offset decreases in surface water temperatures in bodies of water, which may be detrimental to warmer-water species such as, for example, largemouth bass and catfish. In particular, this disclosure relates to systems, devices, and methods related to solar based aquatic refugia.

The functionality and suitable dimensions of the thermal refugia and their detailed connections to other elements of a system are described herein. The technologies described herein can enable a solar-powered thermal refugia device or system, which will produce green energy, will not occupy additional land, and is easy to construct. The system component design, including the mechanical components, electrical connectors, controllers, and converters/inverters, is tailored to account for specific conditions expected to affect outdoor structures. The system is designed for improved lifecycle costs, enhanced safety, such as ensuring low-voltage operations via the system's modular configuration. The effect of solar panels on the primary functions of the structures (e.g., powering the thermal refugium) was also considered. Such a system is expected to provide equivalent or better thermal refugium compared to any currently existing aquatic thermal refugia.

Figure 1A:
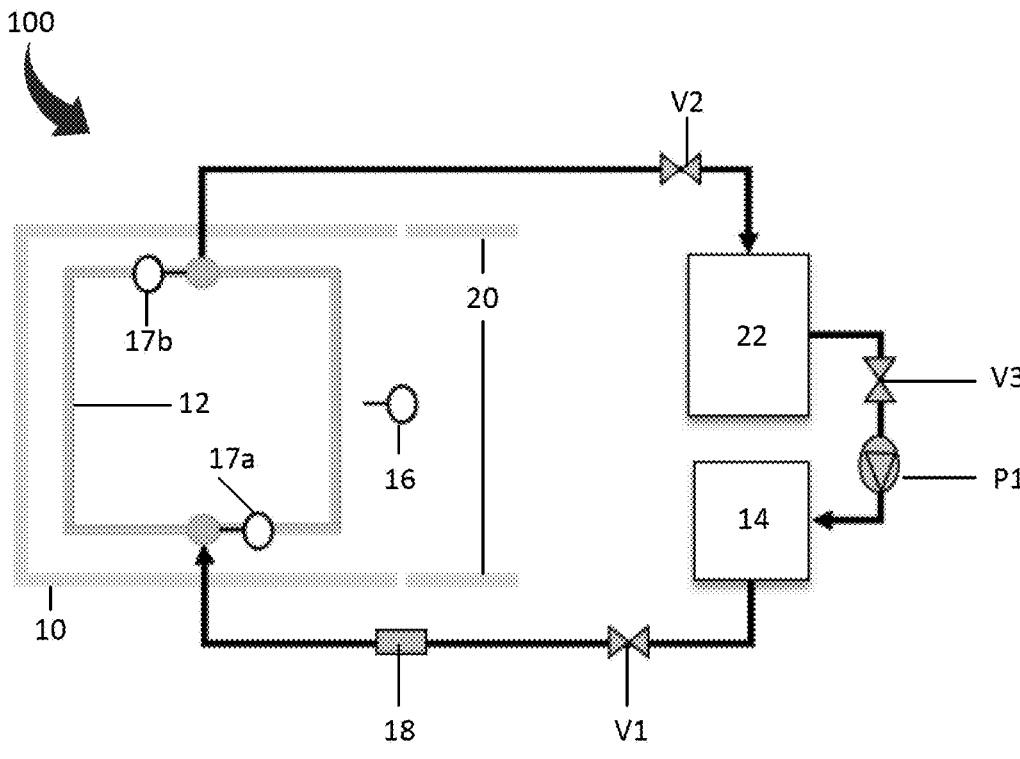
FIGS. 1A and 1B are schematic views showing a thermal refugium system according to an example embodiment.
Figure 1B:
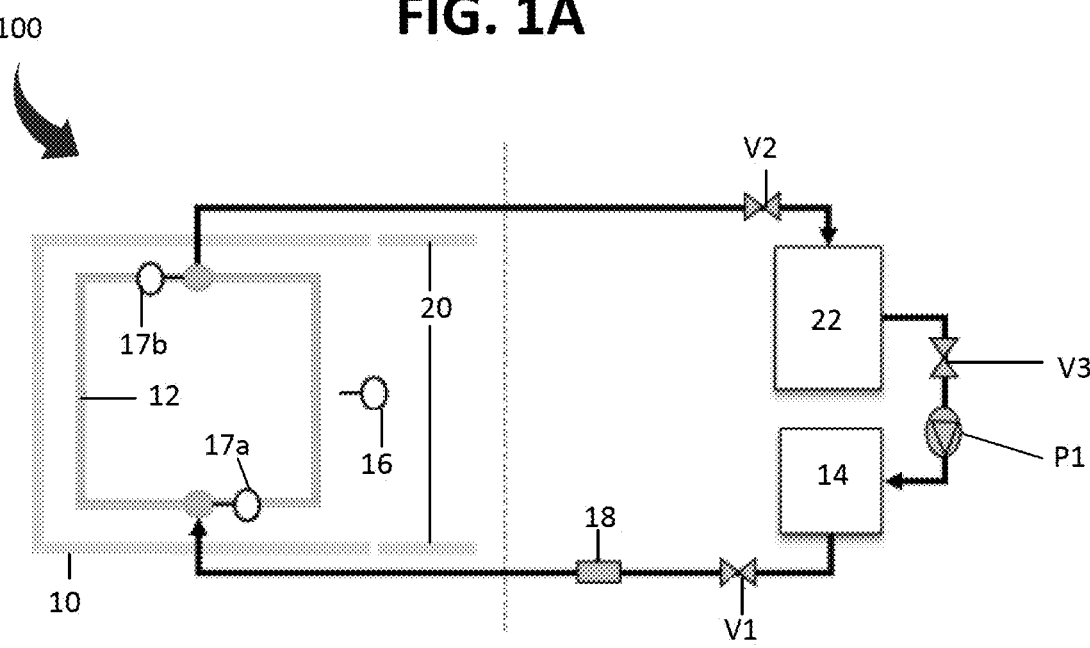
Figure 6A:
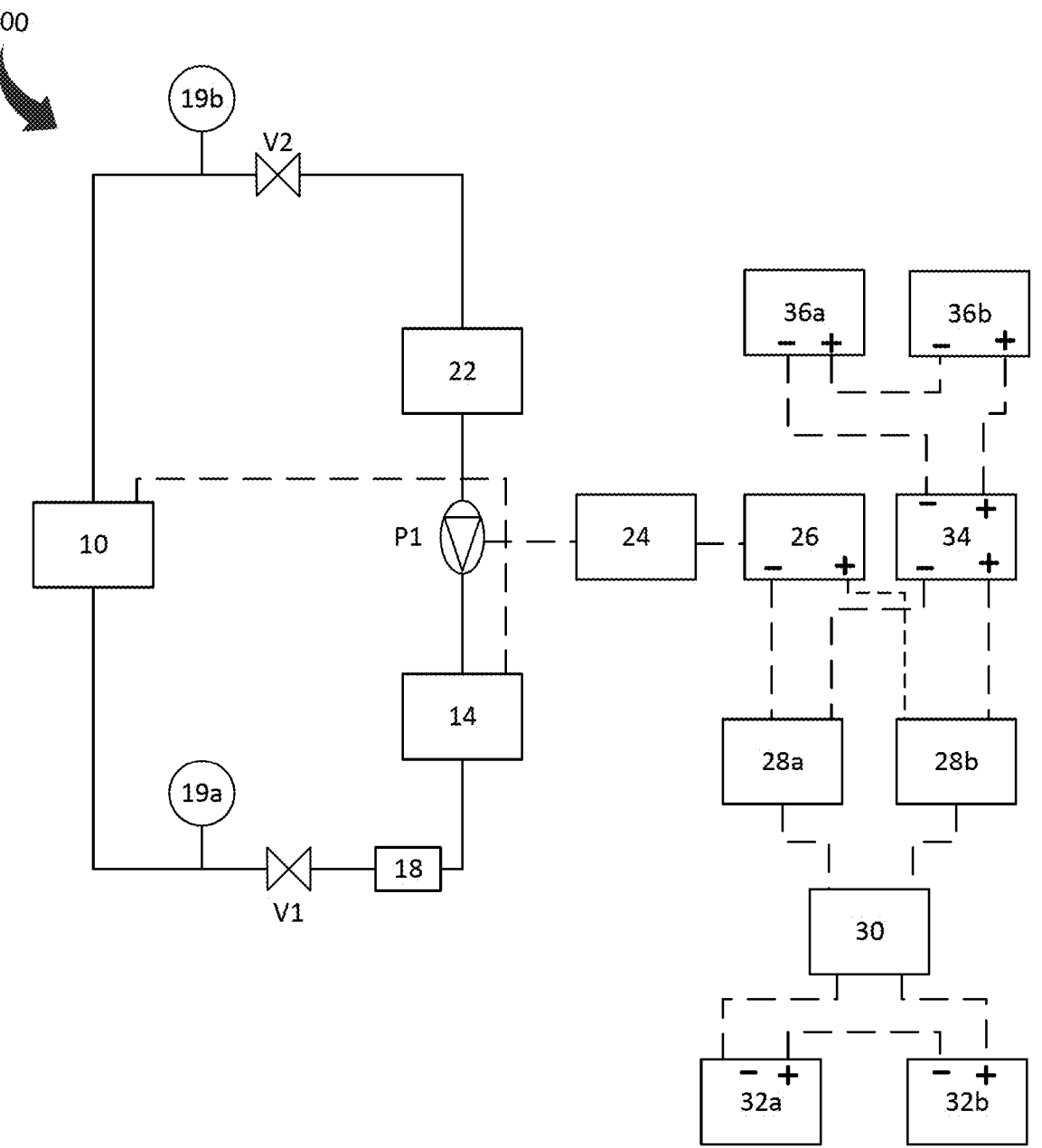
FIG. 6A is a block diagram showing a thermal refugium system according to an example embodiment.
Figure 6B:
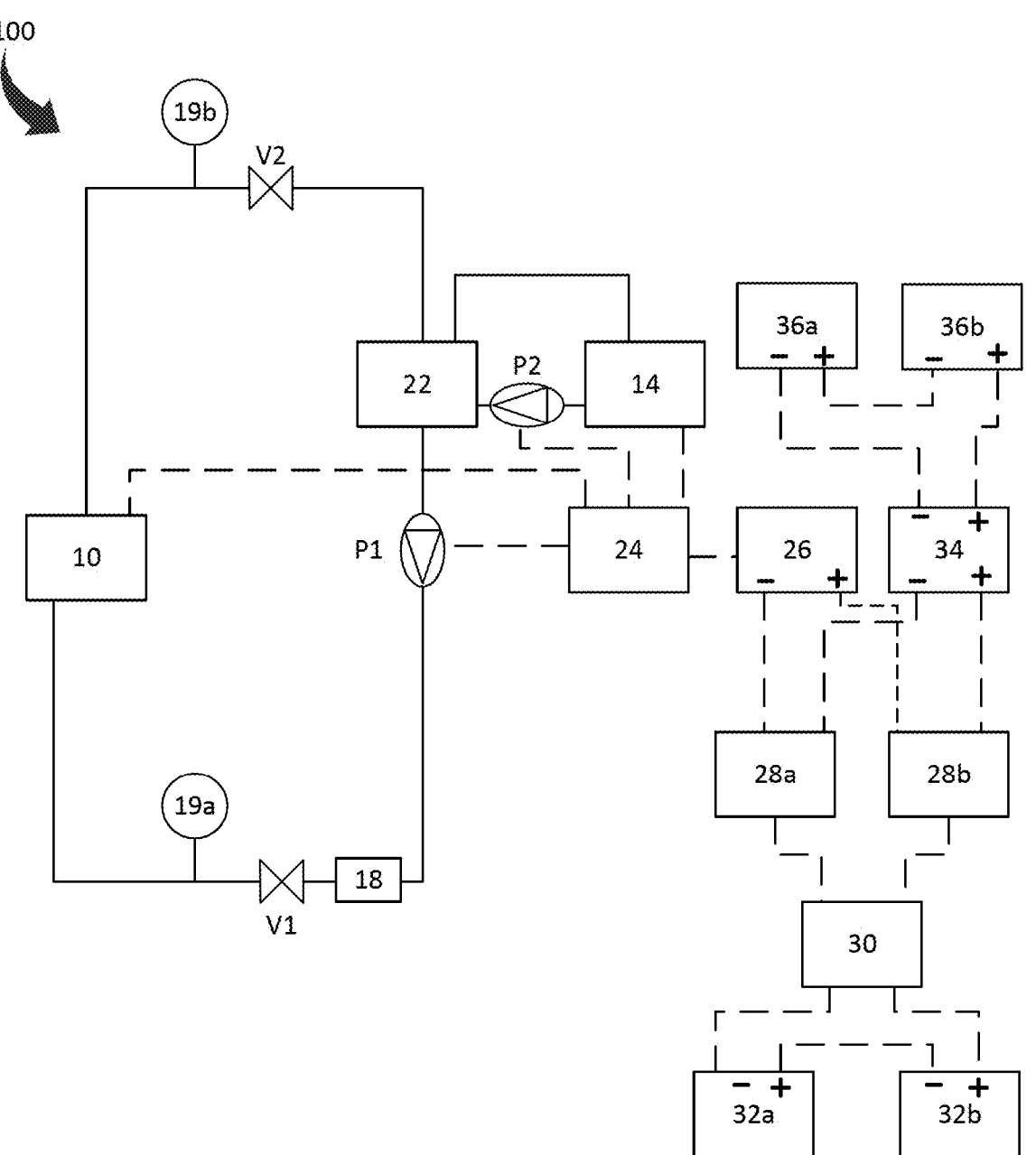
FIG. 6B is a block diagram showing a thermal refugium system according to an example embodiment.

Structural Design of the System, Including Structural Design of the Heat Exchanger and of the Enclosure Various embodiments and various testing conditions are disclosed herein. Elements which may appear in one embodiment may be included in any other embodiment as disclosed herein. FIGS. 1A and 1B are schematic views showing a thermal refugium system 100 according to an example embodiment. The system 100 may include an enclosure 10, a heat exchanger 12, a thermal apparatus 22, and a controller 24 (shown in FIGS. 6A-B), which together may provide a thermal refugium. FIGS. 1A and 1B illustrate further optional components to the system 100, including an extension 20, a reservoir 14, a thermal apparatus 22, a mass flow meter 18, temperature sensors 17a and 17b, valves V1-V3, at least one pump, including a first at least one pump P1, and thermistor 16, each of which is discussed further herein. FIG. 1A shows a general schematic, and FIG. 1B shows a dashed line symbolizing the water's edge, where the enclosure 10 and the extension 20 are located in a body of water, and the components opposite the dashed line are located on land. The arrows in FIGS. 1A and 1B indicate the direction of flow of a fluid in the system 100. Fluid may flow through plumbing which operably connects each of the components used in the system 100. Conversely, flow of the body of water may flow from left to right in the FIGS., and the system 100 is optimized for such flow from left to right. If the body of water is flowing in a different direction, the system 100 and the enclosure 10 may advantageously shift with the water flow such that the right side of FIGS. 1A and 1B is downstream, and the left side of FIGS. 1A and 1B is upstream. The components that are symbolized as on land may or may not be downstream, and may instead be on land adjacent or proximal to the enclosure 10 and other water-borne elements.

A number of metrics may be used to evaluate the performance of the embodiments. These metrics were used in the final testing and in the design process:

Degree of cooling: Eq. 1 and 2

Dimensionless degree of cooling: Eq. 3 and 4

Heat transfer rate: Eq. 5

Heat transfer rate per degree of cooling: q/ΔT and $q/\theta_{avg}$ $$\Delta T(x, t) = T_{stream}(x, t) - T(x, t) \qquad \text{(Eq. 1)}$$

$$\Delta \bar{T}_{avg} = \bar{T}_{stream} - \bar{T}_{avg} \qquad \text{(Eq. 2)}$$

$$\bar{\theta}(x) = \frac{\bar{T}_{stream} - \bar{T}(x)}{\bar{T}_{stream} - \bar{T}_{in}} \qquad \text{(Eq. 3)}$$

$$\bar{\theta}_{avg} = \frac{\bar{T}_{stream} - \bar{T}_{avg}}{\bar{T}_{stream} - \bar{T}_{in}} \qquad \text{(Eq. 4)}$$

$$q(t) = \dot{m} \cdot C_P \cdot (T_{out}(t) - T_{in}(t)) \qquad \text{(Eq. 5)}$$

The degree of cooling is the temperature difference between the average temperature of the body of water and the temperature within the enclosure. This degree of cooling can be expressed at a given location within the enclosure (Eq. 1 is a function of time, t, and location, x, in the enclosure). It can also be expressed an average value for the entire enclosure (Eq. 2). Because the temperature of the stream can vary from day to day and the inlet conditions to the heat exchanger 12 can vary, dimensionless versions of the degree of cooling are also used (Eq. 3 and Eq. 4). In these dimensionless degree of cooling values, the actual degree of cooling (the numerator in Eq. 3 and Eq. 4) is divided by the maximum possible degree of cooling which would be achieved if the entire enclosure were cooled down to the inlet temperature of the heat exchanger 12 (denominator in Eq. 3 and Eq. 4). The heat transfer is calculated from equation Eq. 5. In general, the objective is to maximize the degree of cooling while minimizing the heat transfer rate, at least because higher heat transfer rates require larger cooling systems and more power.

The enclosure 10 may extend from an upstream region to a downstream region relative to the body of water. The enclosure 10 may define a downstream opening. The upstream region may include an upstream sidewall extending across an upstream opening of the enclosure 10 such that the upstream region of the enclosure 10 is enclosed and water does not transfer between the interior and exterior of the enclosure 10 from the upstream region. The downstream opening may be configured to allow wildlife to enter the enclosure.

The enclosure 10 may be sized such that it partially isolates or is configured to partially isolate a local volume of water from a body of water. The enclosure 10 may be sized according to Table 1 below or may be any size capable of partially isolating a local volume of water and including the components discussed herein. The larger enclosure may have a length-to width ratio of about 2×, and the smaller enclosure may have a length-to-width ratio of about 2.5×. In alternative embodiments, the larger enclosure may have a length-to-width ration of equal to or greater than 0.5×, 1×, 1.5×, 2×, 2.5×, 3×, 3.5×, 4×, and/or less than or equal to 3.75×, 3.25×, 2.75×, 2.25×, 1.75×, 1.25×, etc. Additional details of the enclosure 10 structural design according to the embodiment shown in FIG. 1 are listed below in Table 1.

TABLE 1

| | Heat Exchanger Dimensions | | | |
| --- | --- | --- | --- | --- |
| Name | Component | Length (cm) | Width (cm) | Height (cm) |
| Larger Enclosure ("BHX") | Heat Exchanger | 114.3 | 78.74 | 30.48 |
| | Enclosure | 182.88 | 91.44 | 45.72 |
| Smaller Enclosure ("SHX") | Heat Exchanger | 114.3 | 53.34 | 30.48 |
| | Enclosure | 152.4 | 60.94 | 45.72 |

The thermal refugium system and the enclosure may be designed in various shapes and sizes to allow for optimized design based on the body of water it may be used in, based on the type of wildlife in the body of water, based on the climate of the area the body of water is located in, et cetera. For example, one embodiment of the thermal refugia system may include an enclosure built with material with low thermal conductivity (e.g., polyvinyl chloride, etc.), which may advantageously prevent heat transfer via conduction through the walls from inside the enclosure to outside. Other materials may be used as known by a person of ordinary skill in the art.

The enclosure 10 may include the extension 20. The extension 20 may be operably connected to the downstream region of the enclosure 10. The extension 20 may extend from the downstream region to an extended downstream region. The extension 20 may define an extended downstream opening 52. The extended downstream opening 52 may allow wildlife to enter the enclosure. In embodiments which include the extension 20, the extended downstream opening 52 is the first opening into the interior of the enclosure, and in embodiments which do not include the extension 20, the downstream opening is the first opening into the interior of the enclosure. The panel 50 may be operably connected to the extended downstream opening 52 and configured to restrict flow into and out of the enclosure 10. The panel 50 may extend from a wall of the extended downstream opening 52 towards a different or another wall of the extended downstream opening 52. The panel 50 may extend from any wall, e.g., from the top, bottom, or side walls. In embodiments where other shapes are used besides a rectangle or square, the wall may be curved. It is understood that the panel 50 may extend from any wall and extend over at least part of the extended downstream opening 52. As discussed further herein, the extension 20 and a panel 50 may be beneficial for temperature control inside the enclosure 10, and the extended downstream opening 52 and the panel 50 are related to the extension 20.

FIGS. 4A and 4B are downstream side views of an enclosure 10 according to an example embodiment. The downstream side of the enclosure 10 may include a panel 50 and the extended downstream opening 52. The extended downstream opening 52 may be sized such that wildlife may pass through freely. The opening 52 may be sized such that energy consumption of the system 100 (not shown) is minimized due to minimized loss of localized water in the enclosure 10 to the body of water outside the enclosure 10, or such that the system, device, or methods perform more efficiently and/or more accurately. FIG. 4A illustrates a panel 50 which is operably connected to the extended downstream opening 52 and configured to restrict flow into and out of the enclosure 10 by covering about half of the opening 52. FIG. 4B illustrates a panel 50 which is operably connected to the opening 52 and configured to restrict flow into and out of the enclosure 10 by covering the top half of the opening 52 and the right and left thirds of the opening 52 such that over 75% of the opening 52 is covered. In alternative embodiments, the panel 50 may cover equal to or greater than 0% of the opening 52, equal to or greater than 25%, 50%, 75%, 90%, or less than or equal to 99%, 80%, 60%, 40%, 10%, 5%, etc.

FIG. 4C is a schematic side view of an enclosure 10 according to the enclosure of FIGS. 4A and 4B. The enclosure 10 may further include at least one baffle operably connected to the extension 20 and forming a tortuous fluid flow pathway in the extension 20. In alternative embodiments, the at least one baffle is operably connected to the enclosure 10 instead of the extension 20. The at least one baffle may include a first baffle 54a extending from a first interior sidewall of the extension 20. In one embodiment, the first baffle 54a may extend from a floor of the extension 20 if the panel 50 extends from a ceiling of the extension 20. In an alternative embodiment, for example, the first baffle 54a may extend from a port sidewall and the panel 50 may extend from a starboard sidewall.

In another embodiment, the at least one baffle may further include a second baffle 54b. The second baffle 54b may extend from a second interior sidewall that opposes the first interior sidewall. The first baffle 54a may be located more proximal to the extended downstream opening 52 than the second baffle 54b. This may advantageously provide a more tortuous fluid flow pathway, which may further insulate the interior and exterior of the enclosure 10, which may further optimize efficiency of the thermal refugium.

FIG. 4C also notes an enclosure width (W), an extension length L(20), a panel height (hp), a first baffle height (Hb1), a second baffle height (hb2), a distance from the panel to the first baffle (x1), and a distance from the panel to the second baffle (x2).

FIGS. 8A-8F are example data sets of the effect of extension 20 size on average temperature difference, dimensionless average temperature difference, average heat transfer per average temperature difference, average heat transfer per dimensionless average temperature difference, standard deviation of temperature difference, and dimensionless standard deviation of temperature difference, respectively. FIGS. 9A-9F are example data sets of the effect of baffle location on average temperature difference, dimensionless average temperature difference, average heat transfer per average temperature difference, average heat transfer per dimensionless average temperature difference, standard deviation of temperature difference, and dimensionless standard deviation of temperature difference, respectively. FIGS. 8-9 suggest that 1.5" panel baffle configuration resulted in optimized performance.

In the graphs 8-9, comparison among different enclosure configuration showed than configurations with panel and baffle performs significantly better than only panel or extension. Additionally, a 1.5" panel baffle configuration resulted in optimized performance. Further information may be found at U.S. Provisional Application No. 63/331,658, filed on Apr. 15, 2022.

FIGS. 10A-10D are example data sets of the effect of various test conditions (for the below seven test conditions in Table 2) on average temperature difference vs. average heat transfer per average temperature difference, average dimensionless temperature difference vs. average heat transfer per dimensionless average temperature difference, average temperature difference vs. standard deviation of average temperature differences, and average dimensionless temperature difference vs. standard deviation of the average dimensionless temperature differences, respectively.

TABLE 2

| Various Embodiment Testing for the Enclosure 10 | |
| --- | --- |
| Test | Embodiment Configuration |
| Test Condition 1 | Base Enclosure + Extension |
| Test Condition 2 | Base Enclosure + Extension + 2" Panel |
| Test Condition 3 | Base Enclosure + Extension + 2" Panel + 2" Baffle |
| Test Condition 4 | Base Enclosure + Extension + 1.5" Panel |
| Test Condition 5 | Base Enclosure + Extension + 1.5" Panel + 1.5" Baffle |
| Test Condition 6 | Base Enclosure + Extension + 2" Panel + 1.5" Baffle |
| Test Condition 7 | Base Enclosure + Extension + 1.5" Panel + 2" Baffle |

Figure 12A:
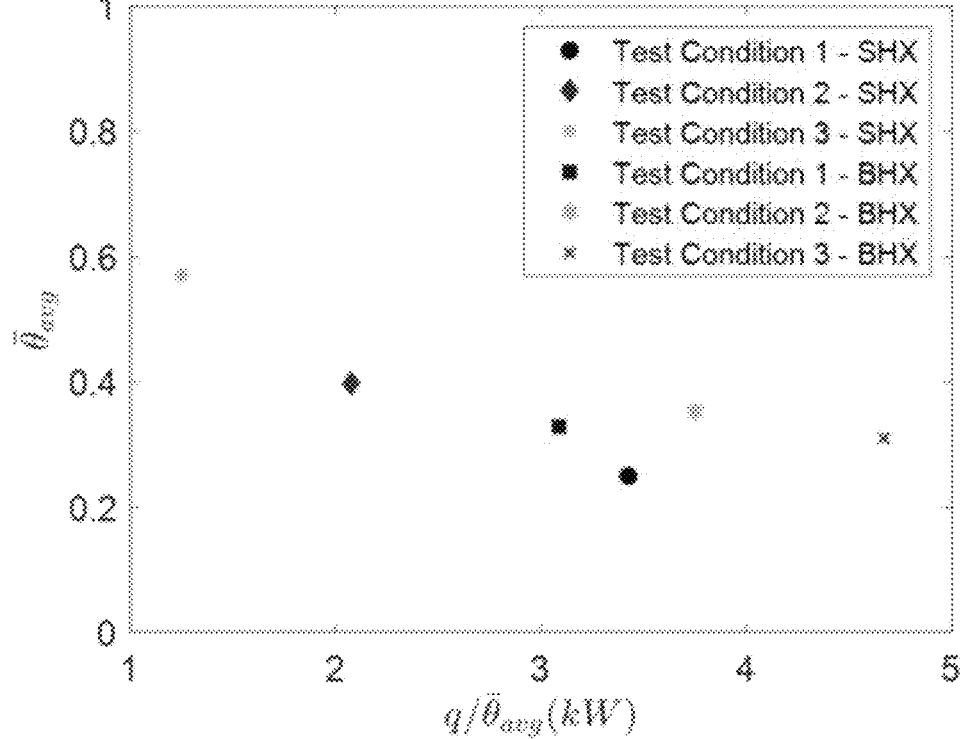
FIGS. 12A and 12B are example data sets of the effect of various test conditions on average dimensionless temperature difference vs. average heat transfer per average dimensionless temperature difference and average dimensionless temperature difference vs. average heat transfer per dimensionless average temperature difference, respectively.
Figure 12B:
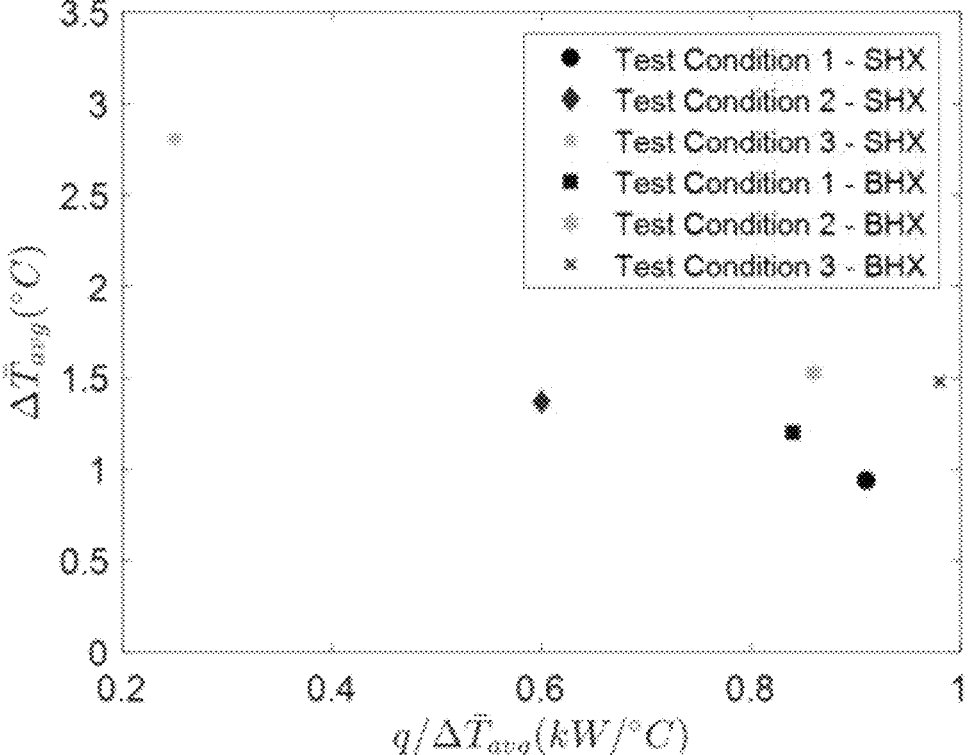
Figure 12C:
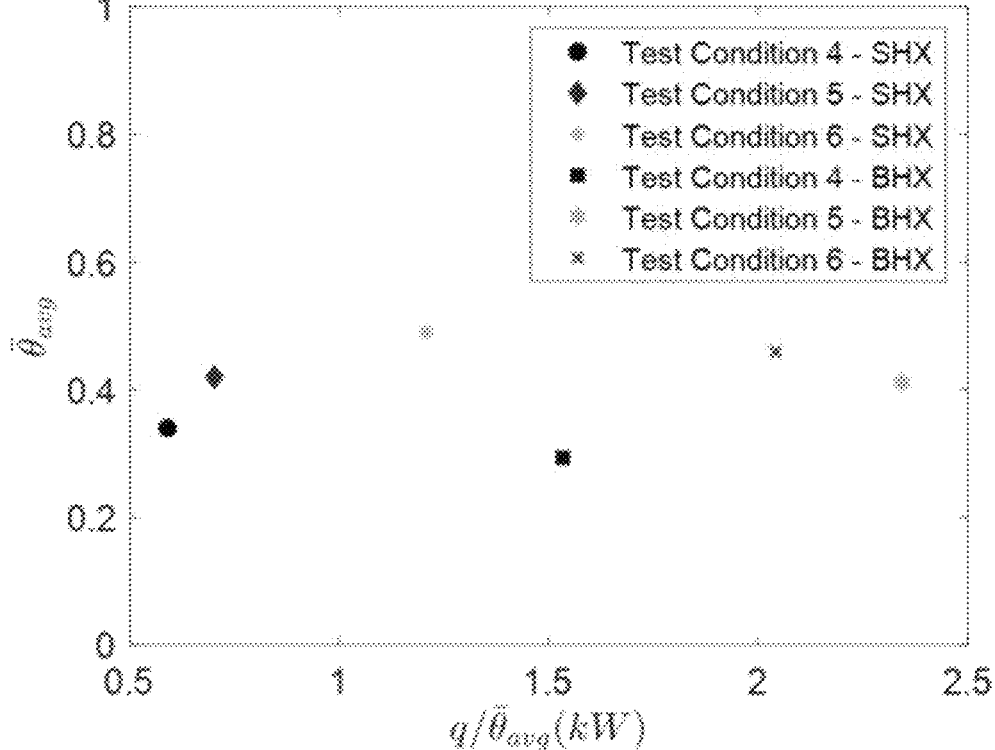
FIGS. 12C and 12D are example data sets of the effect of further various test conditions on average dimensionless temperature difference vs. average heat transfer per average dimensionless temperature difference and average dimensionless temperature difference vs. average heat transfer per dimensionless average temperature difference, respectively.
Figure 12D:
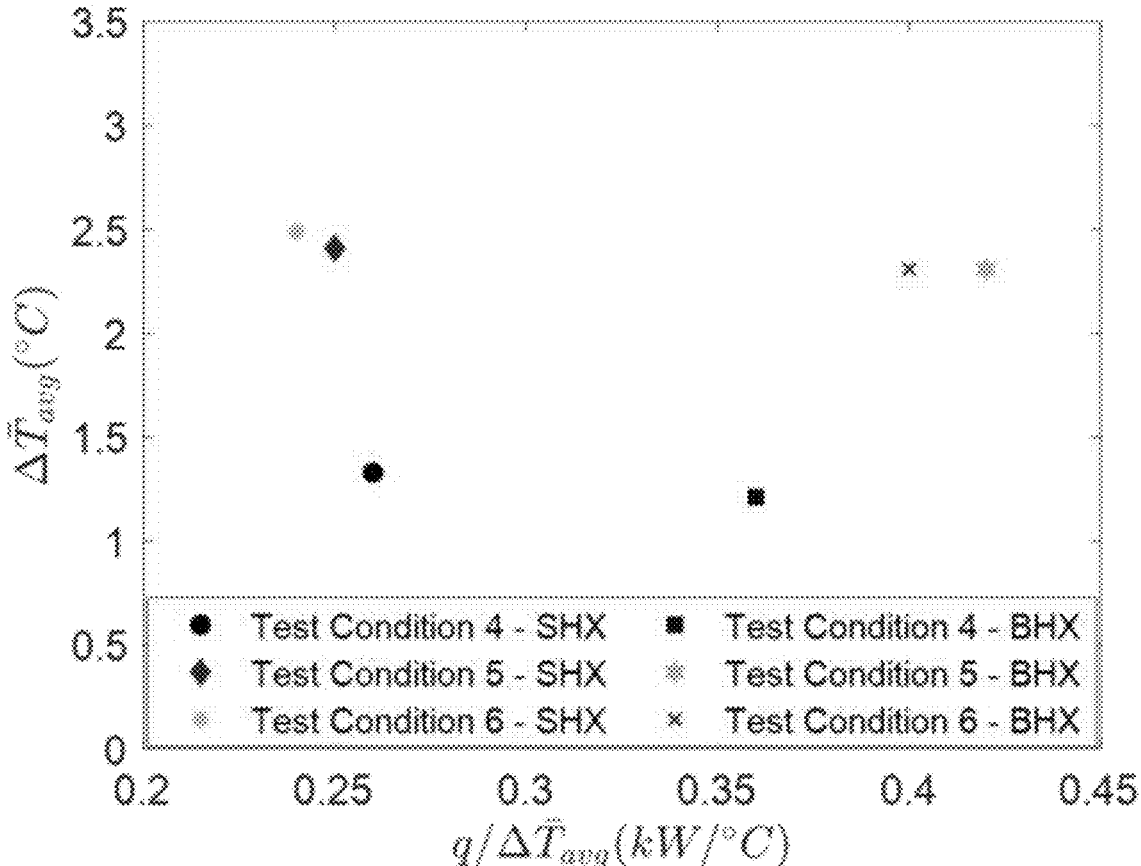

FIGS. 12A and 12B are example data sets of the effect of various test conditions #1-#3 as outlined in table 3 below. The various test conditions' effect on average dimensionless temperature difference vs. average heat transfer per average dimensionless temperature difference and average dimensionless temperature difference vs. average heat transfer per dimensionless average temperature difference are shown in FIGS. 12A and 12B, respectively. FIGS. 12C and 12D are example data sets of the effect of further various test conditions #4-#6 on average dimensionless temperature difference vs. average heat transfer per average dimensionless temperature difference and average dimensionless temperature difference vs. average heat transfer per dimensionless average temperature difference, respectively.

TABLE 3

Short-Term Experiments (e.g., minutes, hours, days)

| Text # | Heat Exchanger | Baffle configuration | Flowrate (kg/s) |
|---|---|---|---|
| 1 | SHX | 1 baffle at $\frac{x_1}{L} = 0.17$ | 0.144 |
| | BHX | 2 baffles | |
| 2 | SHX | 1 baffle at $\frac{x_1}{L} = 0.67$ | |
| | BHX | 1 baffle at $\frac{x_1}{L} = 0.44$ | |
| 3 | SHX | 2 baffles | |
| | BHX | 1 baffle at $\frac{x_1}{L} = 0.30$ | |
| 4 | SHX | 2 baffles | 0.034 |
| | BHX | | |
| 5 | SHX | 2 baffles | 0.068 |
| | BHX | | |
| 6 | SHX | 2 baffles | 0.094 |

TABLE 4

Long-Term Experiments (e.g. days, months, years)

| Test # | Hx and Enclosure | Panel type | Flow Rate (kg/s) | Experiment time (Days) |
|---|---|---|---|---|
| (i) | SHX | Type 1 | SHX – 0.20 | 4 |
| (ii) | BHX and SHX | Type 2 | SHX – 0.06 BHX – 0.06 | 2 |
| (iii) | BHX and SHX | Type 2 | SHX – 0.09 BHX – 0.09 | 2 |
| (iv) | BHX and SHX | Type 2 | SHX – 0.14 | 3 |

In the graphs 10 A-B and 12 A-B, it is preferable to have designs in the upper, left corner. Lower performing designs will be in the lower, right corner. This rule is flipped for FIGS. 10 C-D and 12 C-D. FIGS. 12A and 12B illustrate that for enclosure configurations with one baffle 54a, baffle location may have an impact on the dimensionless temperature difference. For the SHX, as the baffle 54a is moved further from the extended downstream opening 52 and closer to heat exchanger 12, the dimensionless temperature difference increased (0.25 to 0.40) and the heat transfer per dimensionless temperature difference decreased (3.42 to 2.07 kW). Such increase in dimensionless temperature difference is possibly due to the fact that when baffle 54a is closer to the heat exchanger 12, it introduces higher mixing in the heat exchanger 12 region, which increases heat transfer. A similar effect is observed for the BHX. However, with only a single baffle 54a, the max degree of cooling is only ~1.5 degrees Celsius. Both the SHX and BHX showed higher dimensionless temperature difference for enclosure configurations with two baffles 54a, 54b compared to one baffle 54a.

As such, the two baffle configuration is suitable to achieve a higher temperature difference. However, two baffle configurations likely further restrict water exchange with the free stream compared to a single baffle. There may be advantages to higher temperature difference or to less restriction on water exchange, depending on the species targeting and the location the device or system is being used in.

FIGS. 12C and 12D shows the effects of flow rates on the average degree of cooling and heat transfer. For the SHX, as the cooling water flow rate increased the dimensionless temperature difference increased. The heat transfer per dimensionless temperature difference also increased. A similar effect is observed for the BHX. The absolute temperature difference increased with increase in cooling water flow rate. The absolute degree of cooling is also reduced with the lower mass flow rate. Since the mass flow rate directly impacts the heat transfer coefficient inside the tubes of the heat exchanger 12 due to the lower fluid velocity, this result indicates that the heat transfer rate for this configuration is not only limited by the stream-side heat transfer coefficient but also impacted by the heat transfer coefficient inside the tubes of the heat exchanger 12.

Figure 11A:
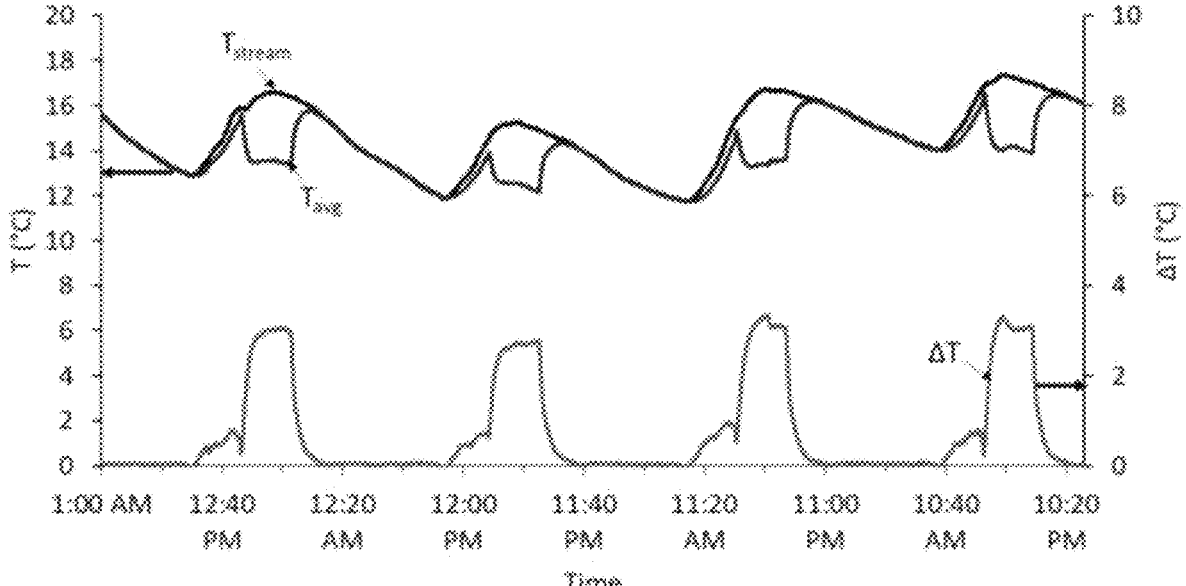
FIG. 11A is an example data set of instantaneous free stream temperature, average temperature inside the enclosure, and the corresponding temperature difference for a smaller heat exchanger with a downstream side view as shown in FIG. 4A.
Figure 11B:
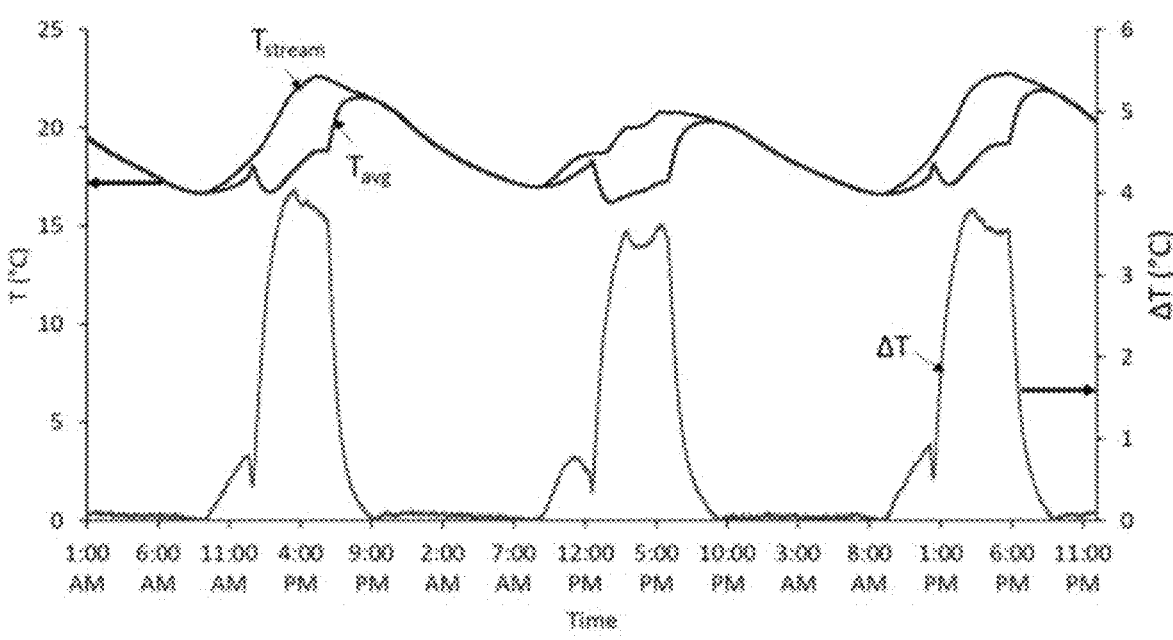
FIG. 11B is an example data set of instantaneous free stream temperature, average temperature inside the enclosure, and the corresponding temperature difference for a smaller heat exchanger with a downstream side view as shown in FIG. 4B.
Figure 11C:
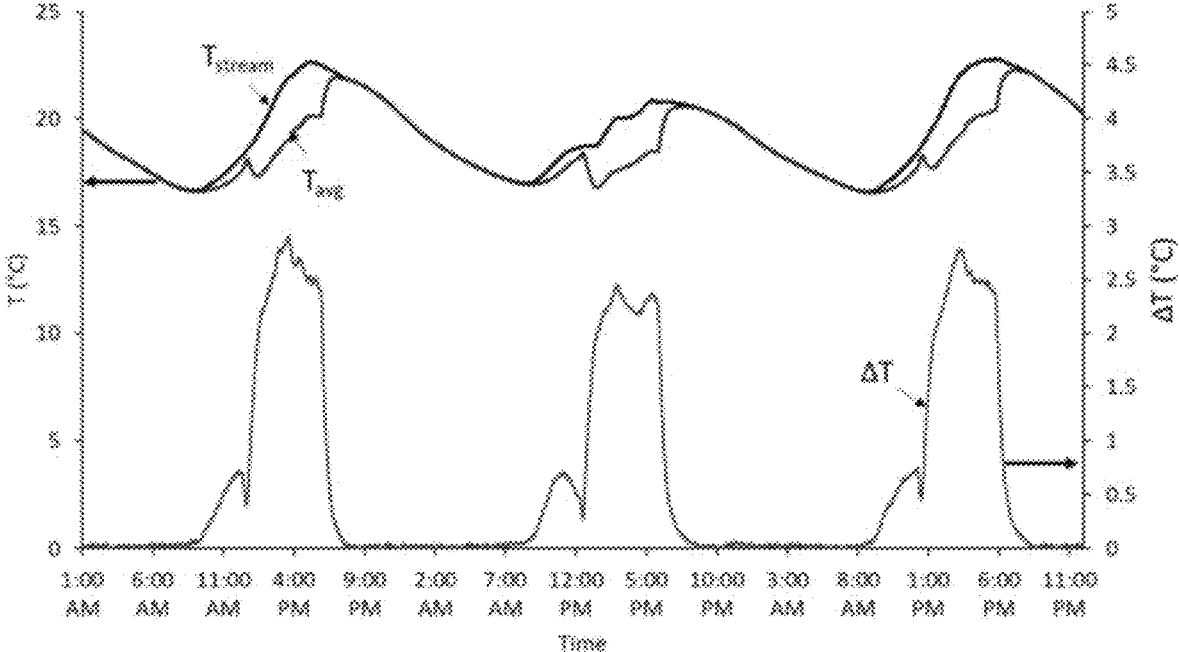
FIG. 11C is an example data set of instantaneous free stream temperature, average temperature inside the enclosure, and the corresponding temperature difference for a larger heat exchanger with a downstream side view as shown in FIG. 4B.

FIG. 11A is an example data set of instantaneous free stream temperature, average temperature inside the enclosure, and the corresponding temperature difference for a smaller heat exchanger 12 with a downstream side view as shown in FIG. 4A. FIG. 11B is an example data set of instantaneous free stream temperature, average temperature inside the enclosure, and the corresponding temperature difference for a smaller heat exchanger 12 with a downstream side view as shown in FIG. 4B. FIG. 11C is an example data set of instantaneous free stream temperature, average temperature inside the enclosure, and the corresponding temperature difference for a larger heat exchanger 12 with a downstream side view as shown in FIG. 4B.

For the SHX and BHX, the temperature inside the refuge was consistently lower during the time the cooling system was operated. For test condition (iii) found in Table 4 herein, the cooling system was operated for 3 days and each of those days the temperature inside the enclosure was on average 3.11 degrees Celsius lower than the free stream for the SHX (FIG. 11B). However, the temperature inside the BHX was slightly higher than the SHX. The BHX was able to keep the temperature on average 2.20 degrees Celsius lower than the free stream temperature. Again indicating using an enclosure with a larger length-to-width ratio results in better performance.

Figure 13A:
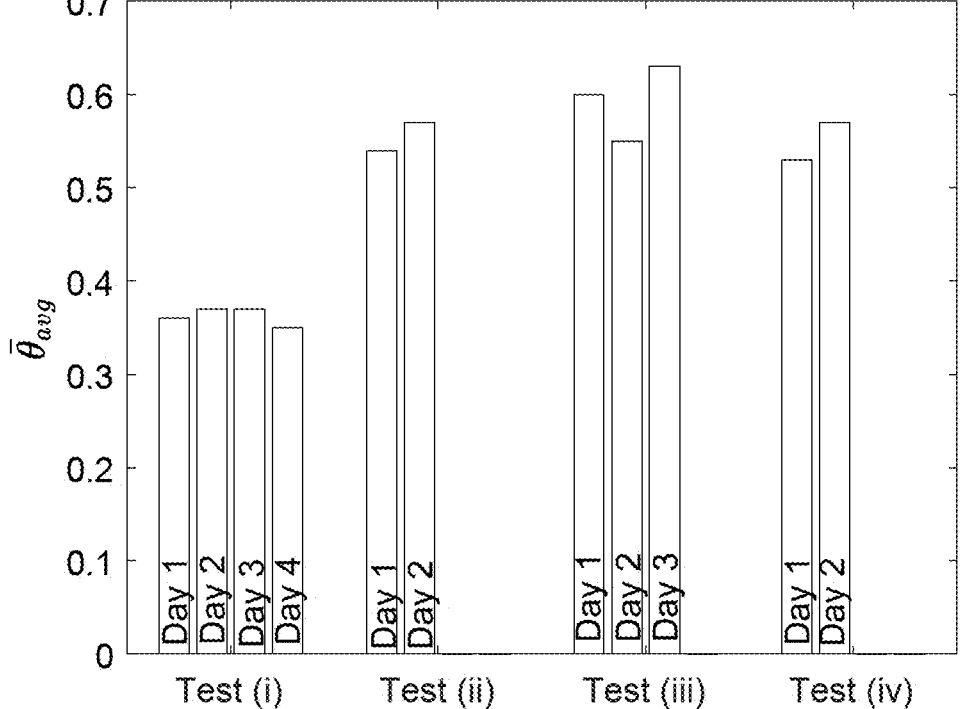
FIGS. 13A and 13C are example data sets of the average dimensionless temperature difference, for each day in a longer-term test using a smaller heat exchanger and a larger heat exchanger, respectively.
Figure 13B:
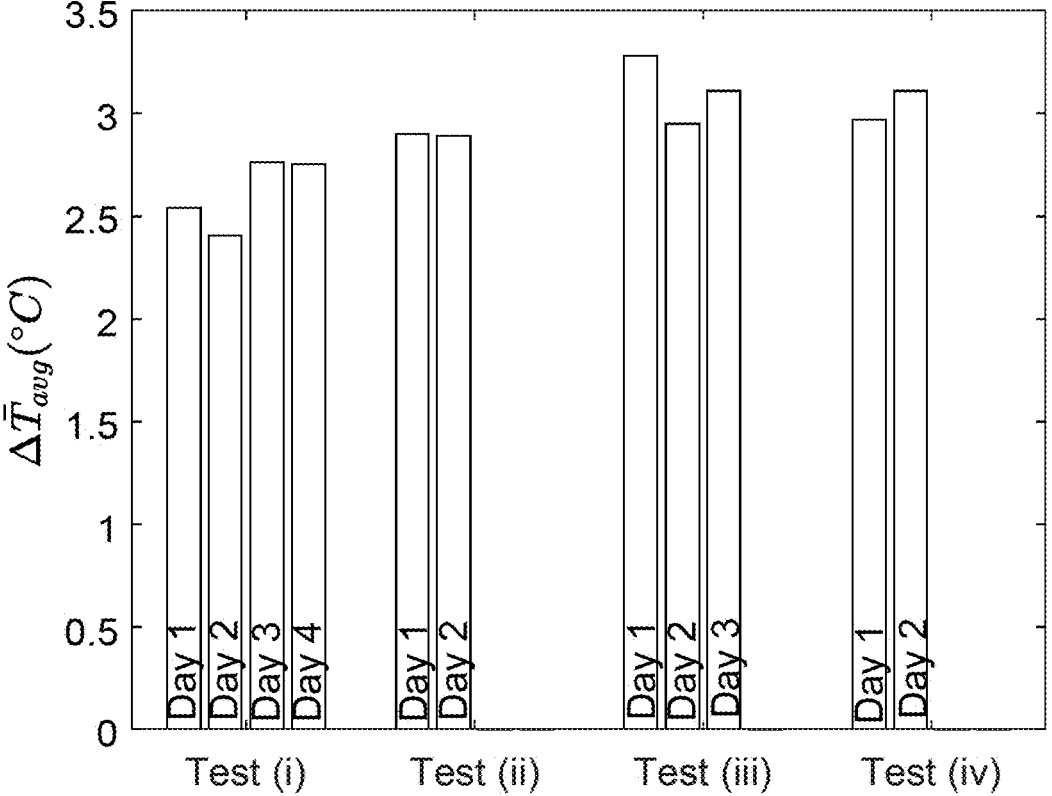
FIGS. 13B and 13D are example data sets of the average temperature difference, for each day in a longer-term test using a smaller heat exchanger and a larger heat exchanger, respectively.
Figure 13C:
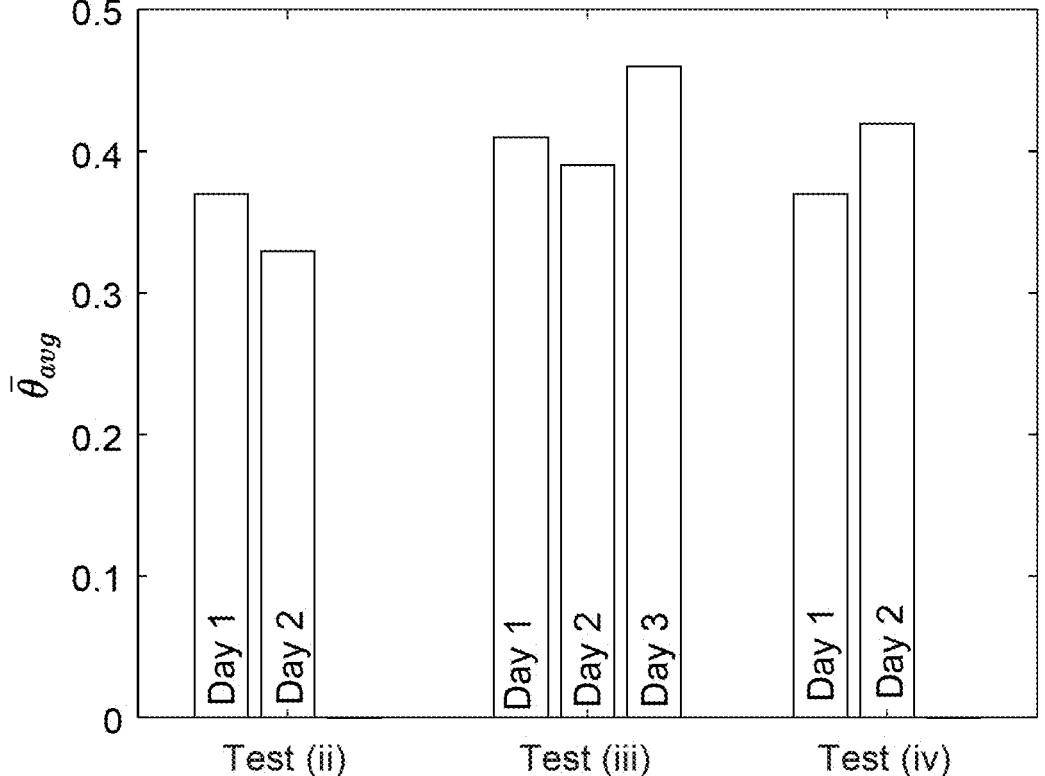
Figure 13D:
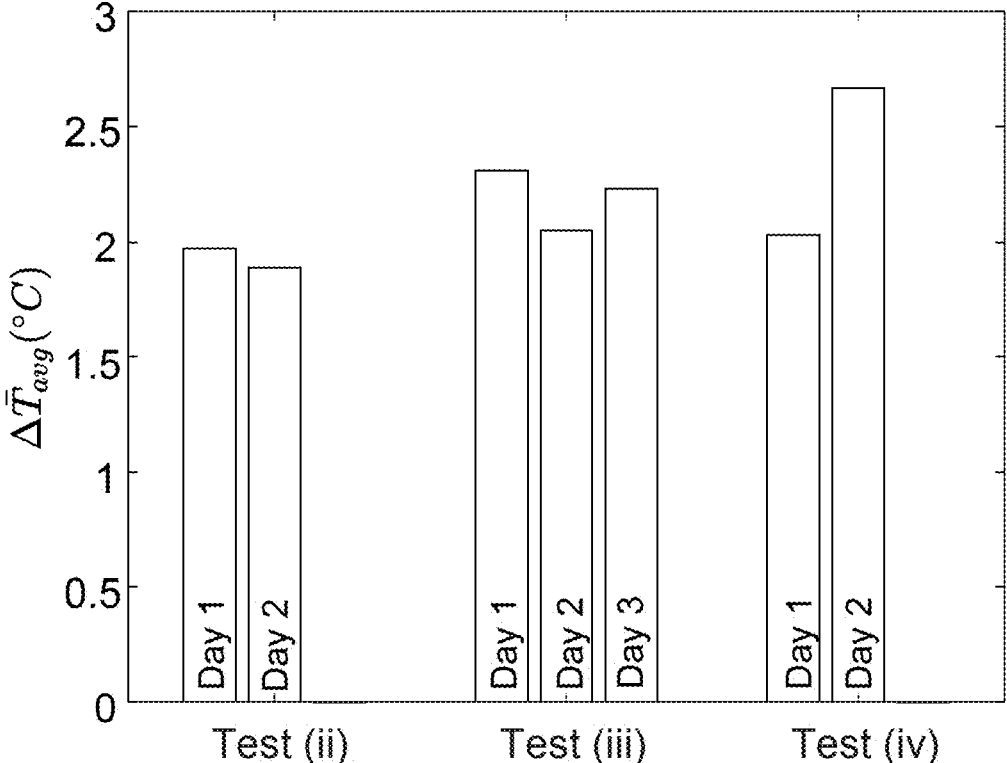

FIGS. 13A and 13C are example data sets of the average dimensionless temperature difference, for each day in a longer-term test using a smaller heat exchanger 12 and a larger heat exchanger 12, respectively. FIGS. 13B and 13D are example data sets of the average temperature difference, for each day in a longer-term test using a smaller heat exchanger 12 and a larger heat exchanger 12, respectively.

Over the course of the tests, a degree of cooling between 2 to 3.4 were measured which represent dimensionless degree of cooling between 0.35 and 0.65 (i.e., 35% to 65% of the maximum theoretical degree of cooling). In general, SHX was optimized. Also, comparing test (i) to test (iv) from Table 4 for the SHX indicates the importance of the downstream opening area of the panel. Test (i) has the larger opening (panel type 1) while test (iv) has the smaller opening (panel type 2). Test (iv) achieves a higher degree of cooling. A slight improvement was observed for increasing the flow rate from 0.06 to 0.09 kg/s (test ii vs iii). However, there is a limit to how much increasing the flow rate improves performance. For the SHX (FIG. 13A-13B), there was minimal advantage of running just the SHX without the BHX (Test (i)) (which allowed for the higher mass flow rate). This indicates that the higher flow rate for test (i) does not further impact the heat transfer rates. It also indicates that larger volumes (i.e., more enclosures) can be cooled without negative impacts. In other words, for test (i), if the BHX had also been running, the cooling in the SHX would have been similar to what is seen with only SHX running.

Solar data and power consumption were also recorded. Based on these data, the system primarily ran from the power directly from the solar panels without having to use much of the energy stored in the batteries. This data indicates that the physical footprint of the components of the prototype located outside the stream could be reduced. However, care must be exercised to not undersize the system when solar resources are less than during testing.

Figure 2A:
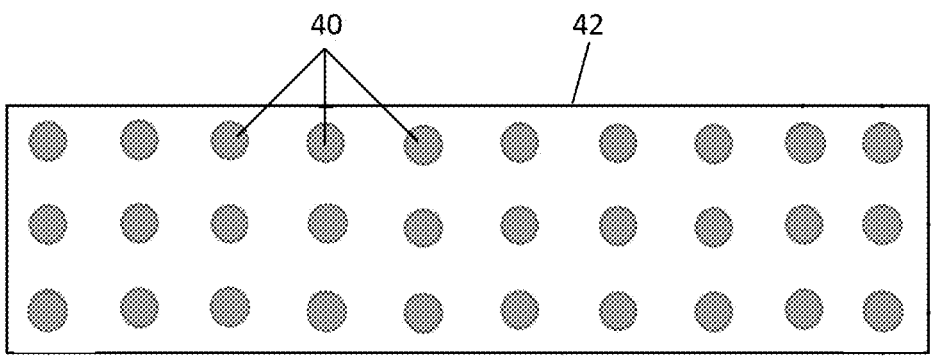
FIG. 2A is a side view of a bundle of tubes of a heat exchanger according to an example embodiment.
Figure 2B:
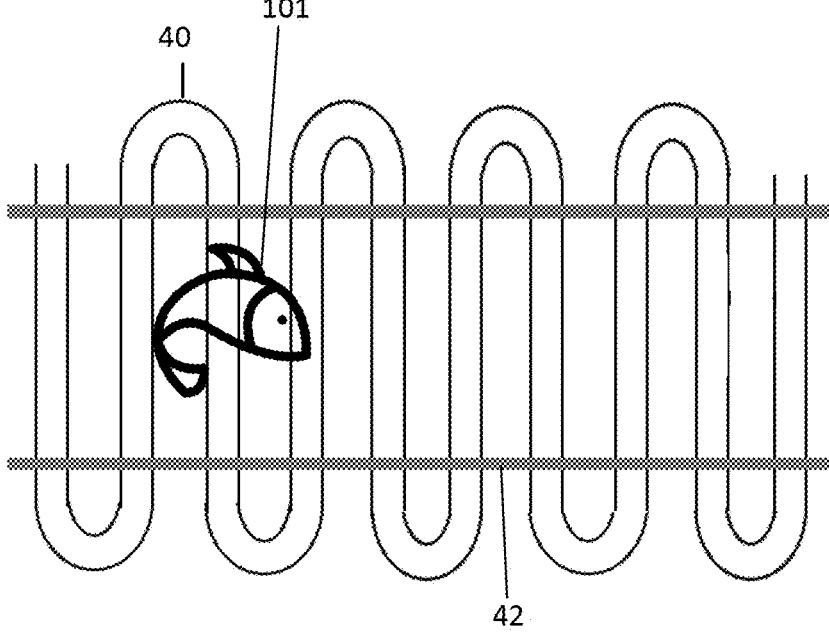
FIG. 2B is a top plan view of the bundle of tubes of the heat exchanger of FIG. 2A in a serpentine pattern.
Figure 27:
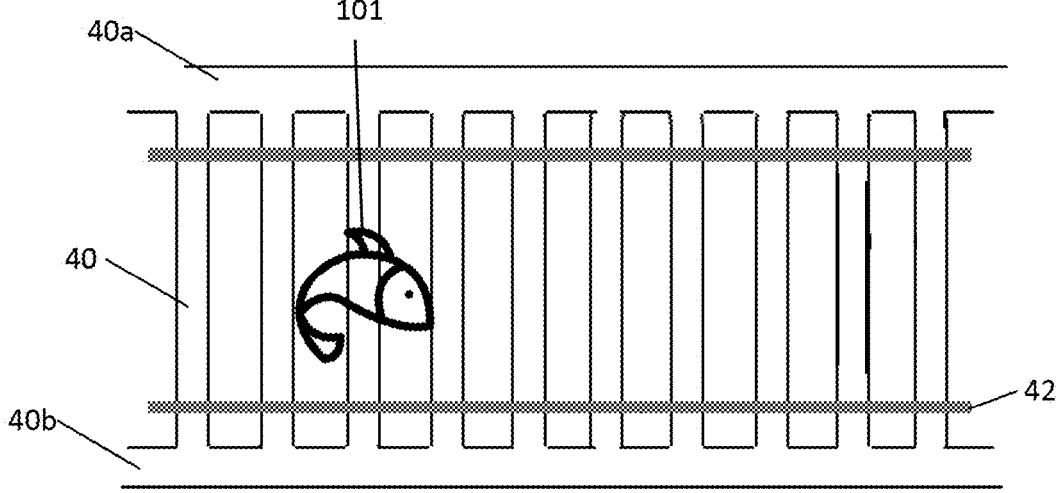
FIG. 27 is a top plan view of the bundle of tubes of the heat exchanger of FIG. 2A in a multi-channel configuration.

The heat exchanger 12 may be housed inside the enclosure 10. The heat exchanger 12 may include a single bundle of tubes 40, two bundles of tubes 40, or more than two bundles of tubes 40. A bundle of tubes may include a single-pass, dual-pass, triple-pass, or multi-pass heat exchanger 12. The bundle of tubes may be arranged in a serpentine pattern, as shown in FIGS. 2A and 2B. The bundle of tubes may be arranged in a parallel flow patterns, as shown in FIG. 27 and as discussed further herein.

FIG. 2A is a side view of a bundle of tubes 40 of the heat exchanger 12 according to an example embodiment, and FIG. 2B is a top plan view of the bundle of tubes 40 of the heat exchanger 12 in a serpentine pattern. For example, each row of tubes 40 shown in FIG. 2A may define a single bundle of multi-pass tubes arranged in a serpentine pattern. The multi-pass tubes may include between 2 and 30 passes. In one embodiment, the multi-pass tubes include a 14-pass serpentine patterns (i.e., there are at least 13 bends and 14 straight sections). Each row of tubes 40 may have a single inlet and a single outlet, and allow for parallel fluid flow through each bundle of tubes 40 simultaneously. In some embodiments, an inlet tube (not shown) may connect each of the single inlets of each row of tubes 40, and an outlet tube (not shown) may connect each of the single outlets of each row of tubes 40. This may be beneficial to reduce energy consumption while maximizing temperature control in the local body of water. The tubes may be fabricated using copper, for example, or any other suitable material (e.g., metals, plastics, ceramics, synthetics, etc.). The material chosen may optimize weight, or energy consumption, or performance of the system 100.

The serpentine pattern may wind from fore-to-aft of the enclosure 10, or may wind from port-to-starboard of the enclosure 10, or may be angled within the enclosure 10. The heat exchanger 12 may be substantially parallel to the ground or may be angled with respect to the ground. In alternative embodiments, the tubes 40 may not be arranged in a serpentine pattern, and may instead form a differently shaped pattern, such as triangular or square along the perimeter of the enclosure 10. There may be one or more rows of tubes 40. FIG. 2A illustrates three rows, but any number of rows between 1 row and 50 rows could be beneficial for optimal temperature control. The rows are shown as symmetrical and aligned, but in alternative embodiments the rows could be offset or staggered from one another. The orientation chosen may allow for fish or other wildlife to move freely between the tubes 40 without getting stuck. An example fish 101 is provided in FIG. 2B (the fish 101 not drawn to scale) to illustrate how fish may have enough room between the tubes of the bundle of tubes 40 to move freely through the heat exchanger 12. One example diagonal pitch between tubes 40 may be about 125 mm. In alternative embodiments, the diagonal pitch between tubes 40 may be less than or equal to 50 mm, less than or equal to 100 mm, less than or equal to 150 mm, more than or equal to 175 mm, more than or equal to 125 mm, more than or equal to 75 mm, more than or equal to 25 mm, etc.

In the example shown, the tubes 40 are single channel (meaning they have one inlet and one outlet). In alternative embodiments, and as illustrated in FIG. 27, the tubes 40 may be arranged in a multi-channel, parallel flow configuration such that fluid flows along individual tube openings, and through more than one of the tubes 40, simultaneously. The multi-channel, parallel flow configuration may further include an inlet tube 40a and an outlet tube 40b, where the fluid pumped through the system enters the inlet tube 40a from one or both sides, and exits the outlet tube 40b at one or both sides. The sides of the inlet and outlet tubes 40a, 40b may be open or closed. Similar to the serpentine patters, the multi-channel configuration may be oriented port-to-starboard or fore-to-aft. The multi-channel, parallel flow configuration may be beneficial for faster flow rates, which may provide better temperature control, and may further be beneficial because it may provide more uniform heat transfer and may also have a lower pressure drop and require less energy to pump the fluid through the heat exchanger 12. In cases where increasing flow rate does not provide better temperature control (for example, in embodiments where the enclosure 10 size is optimized for another parameter), then a serpentine pattern may be beneficial. Further, a serpentine pattern provides optimal usage of space within the enclosure 10, such that, for example, the size of the enclosure 10 may be minimized because only one inlet and outlet are needed.

The heat exchanger 12 may include fins 42. Fins 42 may include metal plates with through-holes to retain the tubes 40. Thus, fins 42 may advantageously provide structure and rigidity to the heat exchanger 12, and further the fins 42 may ensure the proper pitch as discussed above, and further the fins 42 may be used to increase the area of heat transfer.

The heat exchanger 12 may further be configured to transfer heat into or out of the local volume of water based on the desired water temperature inside the enclosure 10 compared to the measured temperature inside the enclosure 10, as discussed further herein. Further information regarding the structure of the heat exchanger 12 may be found in U.S. Provisional Application No. 63/331,658, filed on Apr. 15, 2022.

Figure 16A:
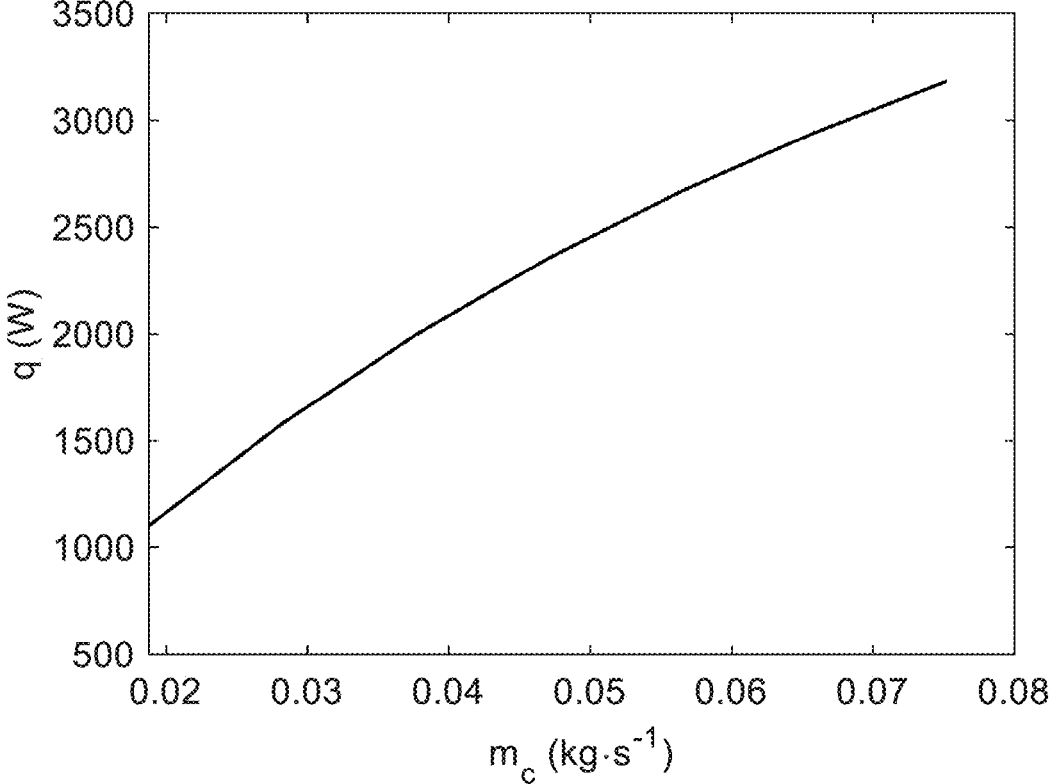
FIGS. 16A and 16B are example data sets of the effect of heat exchanger mass flow rate on the heat transfer rate and on the stream temperature at the downstream exit of the heat exchanger, respectively.
Figure 16B:
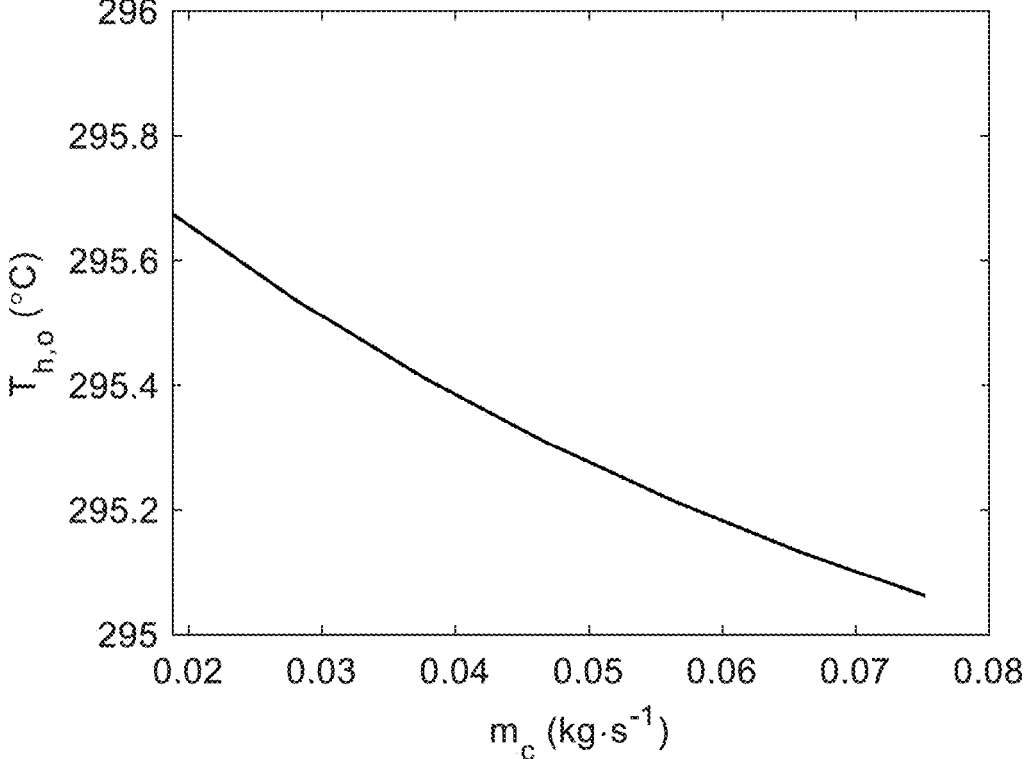
Figure 16C:
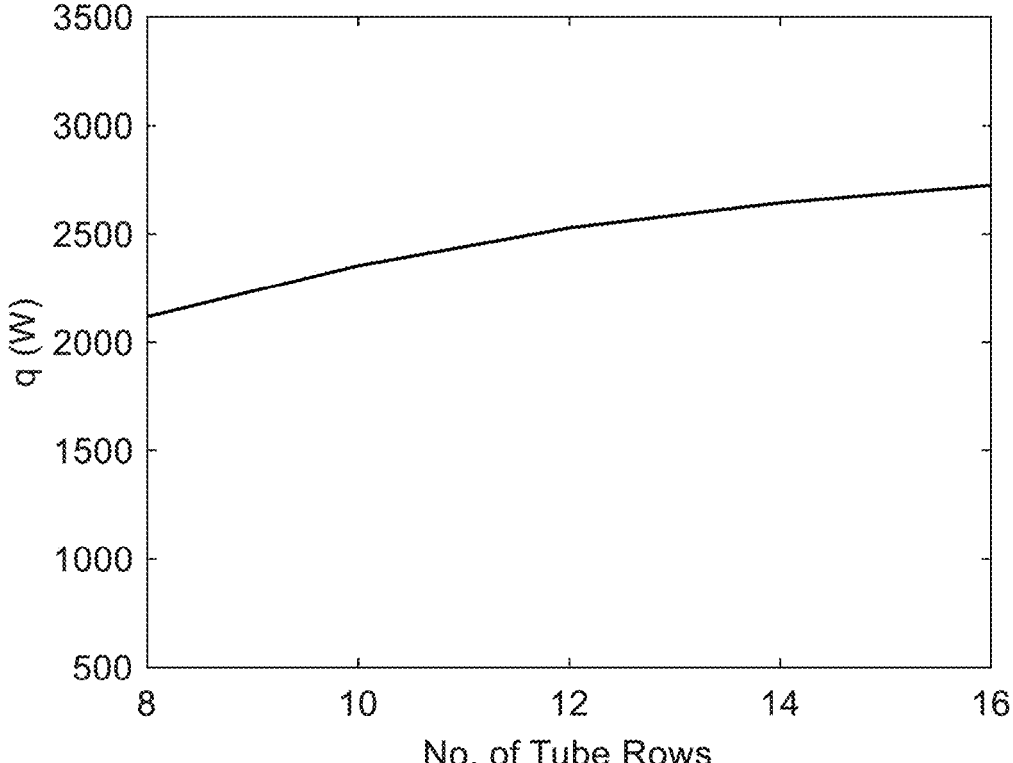
FIGS. 16C and 16D are example data sets of the effect of the number of tube rows on the heat transfer rate and on the stream temperature at the downstream exit of the heat exchanger, respectively.
Figure 16D:
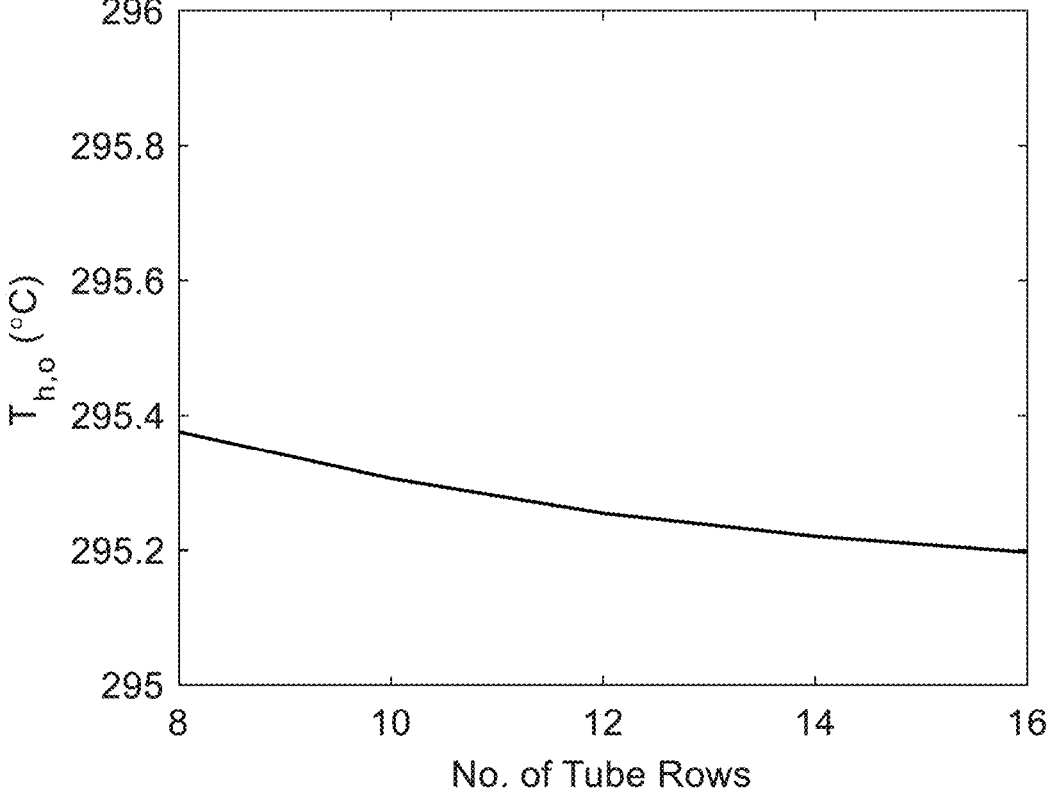

FIGS. 16A and 16B are example data sets of the effect of heat exchanger mass flow rate on the heat transfer rate and on the stream temperature at the downstream exit of the heat exchanger, respectively. FIGS. 16C and 16D are example data sets of the effect of the number of tube rows on the heat transfer rate and on the stream temperature at the downstream exit of the heat exchanger, respectively. FIGS. 16A-D provide some example results from this analysis. A key conclusion from this analysis is that heat exchanger 12 placed directly in the stream (without an enclosure) will result in a small degree of cooling. For all the configurations considered in the analysis, all had less than 1 degree Celsius degree of cooling. In addition, the required heat transfer to achieve that cooling is very high, on the order of 1-2.5 kW for a scaled model. The modeling also identified that the mass flow rate through the heat exchanger 12 is an important parameter to optimize heat exchange and minimize energy consumption.

Figure 17A:
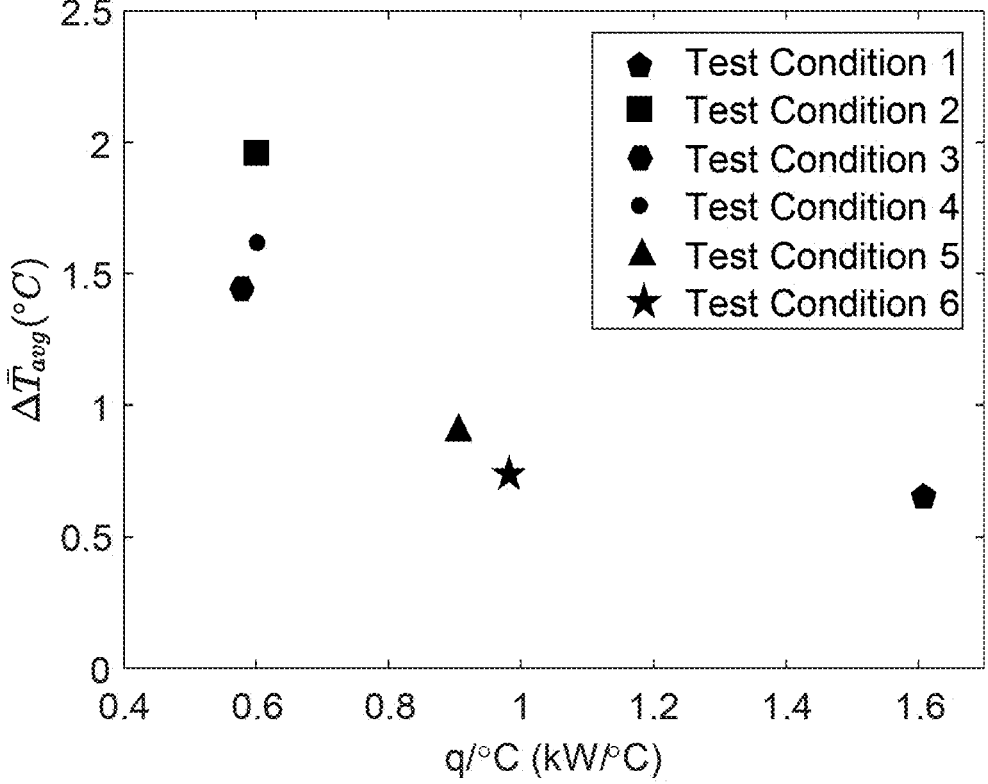
FIGS. 17A and 17B are example data sets of the effect of various test conditions on the temperature difference vs. heat transfer per degree Celsius of cooling, and on the dimensionless temperature difference vs. average heat transfer per dimensionless temperature difference, respectively.

FIGS. 17A and B are example data sets of the effect of various test conditions on the temperature difference vs. heat transfer per degree Celsius of cooling, and on the dimensionless temperature difference vs. average heat transfer per dimensionless temperature difference, respectively. The test conditions are listed in Table 5.

TABLE 5

| Further Embodiment Configurations of the Enclosure 10 | |
| --- | --- |
| Test | Embodiment Configuration |
| Test Condition 1 | Heat Exchanger |
| Test Condition 2 | Base Enclosure |
| Test Condition 3 | Base Enclosure + Panel |
| Test Condition 4 | Base Enclosure + Extension |
| Test Condition 5 | Base Enclosure + Extension + Panel |
| Test Condition 6 | Base Enclosure + Extension + Panel + Low Flowrate |

Figure 17B:
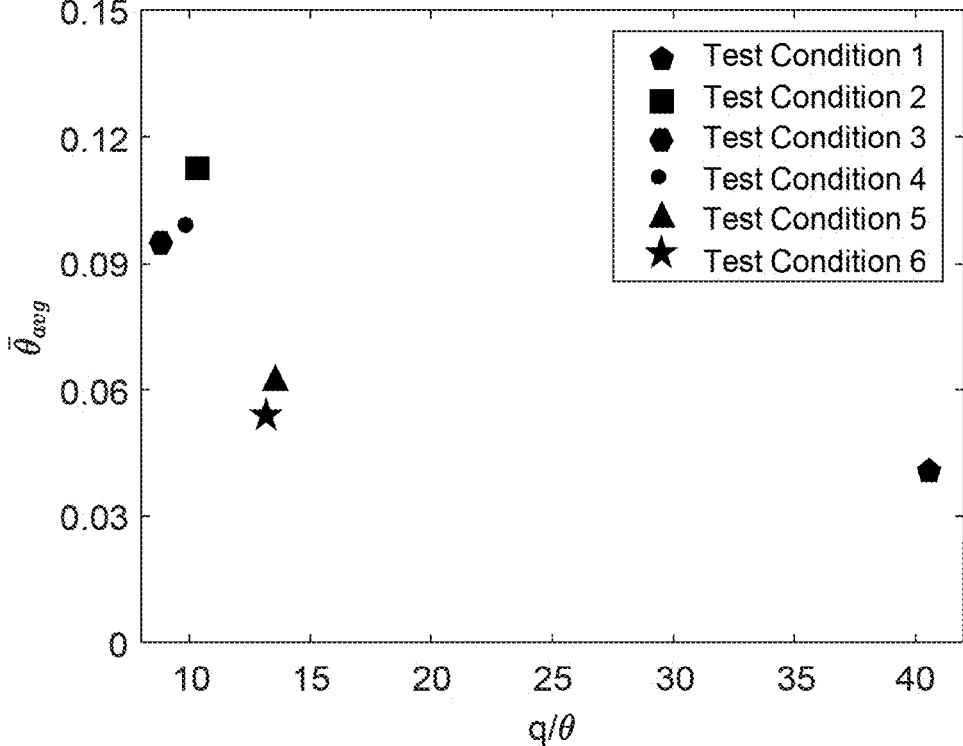

FIGS. 17A and 17B provide the degree of cooling versus the heat transfer per degree of cooling. The data clearly shows the need for an enclosure 10. With an enclosure 10, the degree of cooling tripled compared to without an enclosure 10, and the heat transfer per degree of cooling decreased to approximate one-third of the value for a cooling system without the enclosure. Adding an extension 20 to the enclosure 10, i.e., making it even longer than the heat exchanger 12, or a panel 20 to partially block the extended downstream opening 52 also improve performance. Decreasing the flow rate reduced the performance compared to using the higher flow rate.

Figure 14A:
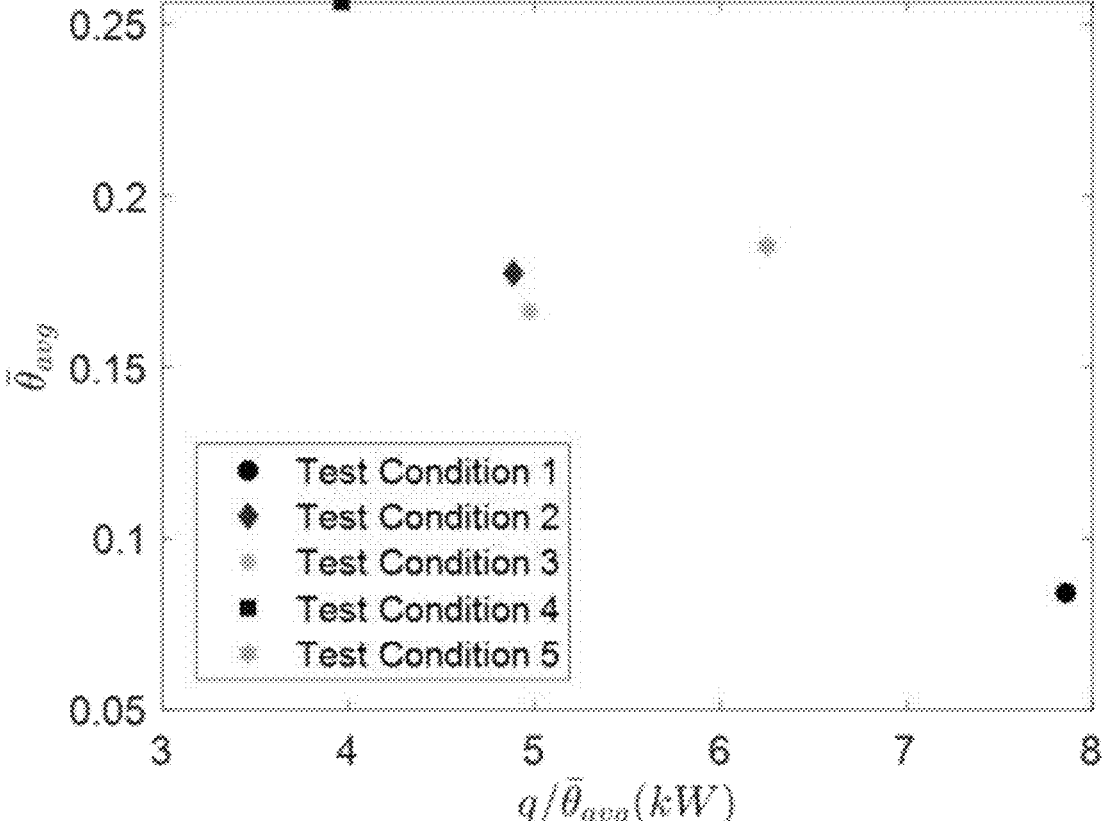
FIGS. 14A and 14B are example data sets of the effect of various test conditions on average dimensionless temperature difference vs. heat transfer per degree of dimensionless heating, and on average temperature difference vs. heat transfer per degree of heating, respectively.
Figure 14B:
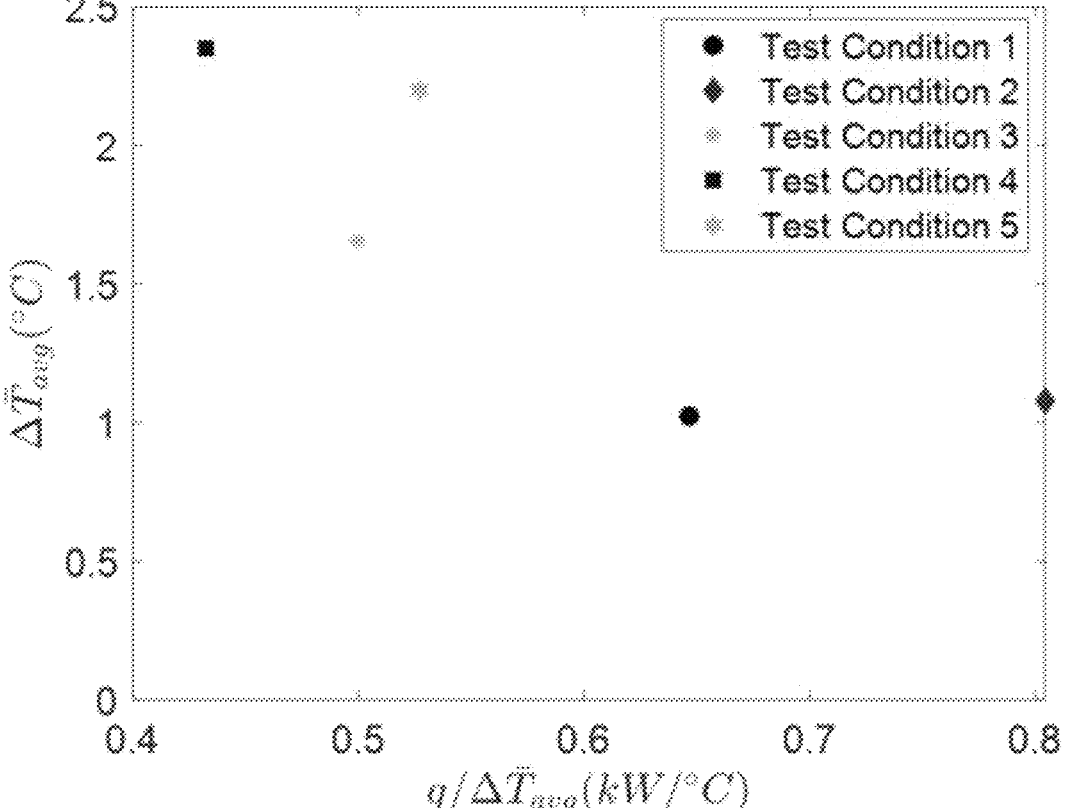

FIGS. 14A and 14B are example data sets of the effect of various test conditions on average dimensionless temperature difference vs. heat transfer per degree of dimensionless heating, and on average temperature difference vs. heat transfer per degree of heating, respectively. Five short term experiments were conducted. The primary difference between the experiments were the flow rates through the heat exchanger 12. Additionally, two different water heaters were used, a 1.44 kW electric heater and a 2.0 kW electric heater.

Figure 15:
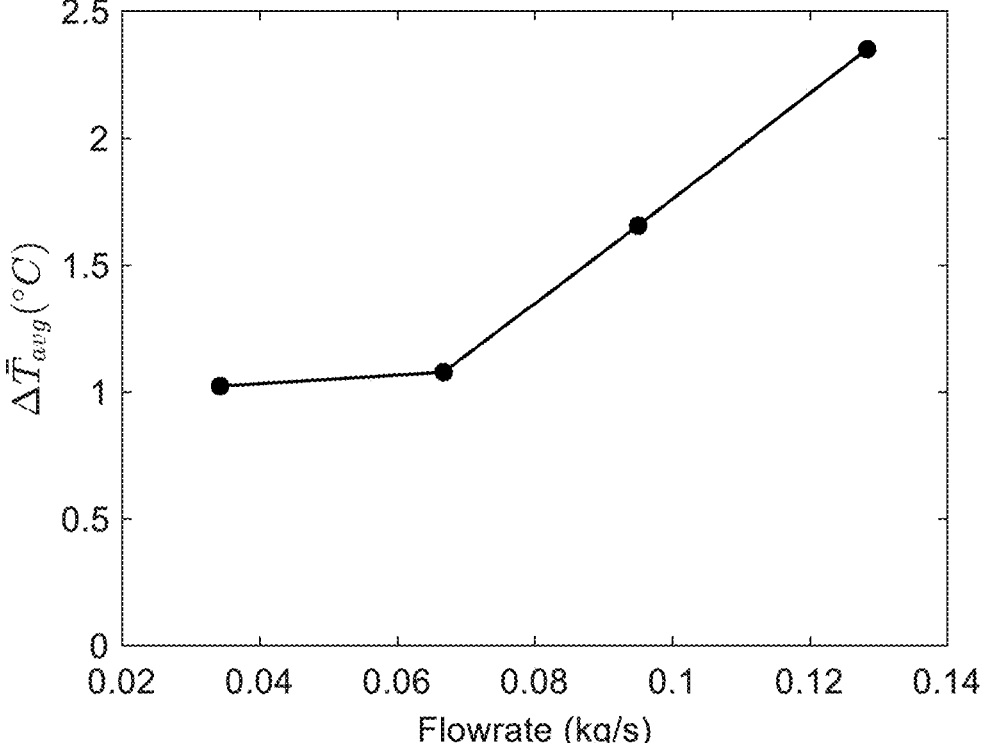
FIG. 15 is an example data set of the degree of heating vs. heat exchanger flow rates.

FIGS. 14A and 14B show the effects of the flowrates on the average degree of heating and heat transfer per degree of cooling. FIG. 15 shows the effect of mass flow rate on the degree of heating. Test 1 has the lowest flow rate and as a result has the lowest dimensionless average temperature difference. Additionally, the average heat transfer required per dimensionless, average temperature difference is significantly higher. Increasing the flow rate (FIG. 15) increases the temperature difference with a maximum degree of heating of ~2.4° C. achieved. The higher flow rate also resulted in the lowest heat transfer per degree of cooling. Likely this is because the higher flow rates reduced the thermal resistance. Switching to a larger heater (Test 5) did increase the degree of heating compared to Test 3 (which had the same flow rate), but also slightly increased the heat transfer per degree of heating. This indicates that further improvements could be obtained with a larger heater. However, it would be better to utilize a heat pump because it will use less electricity than an electric resistance heater for the same amount of heat transfer provided.

TABLE 6

| Test Conditions for Heating | | |
| --- | --- | --- |
| Test condition | Heater | Flowrate (kg/s) |
| 1 | 1.44 kW | 0.03 |
| 2 | 1.44 kW | 0.07 |
| 3 | 1.44 kW | 0.10 |
| 4 | 1.44 kW | 0.13 |
| 5 | 2.0 kW | 0.10 |

Figure 3:
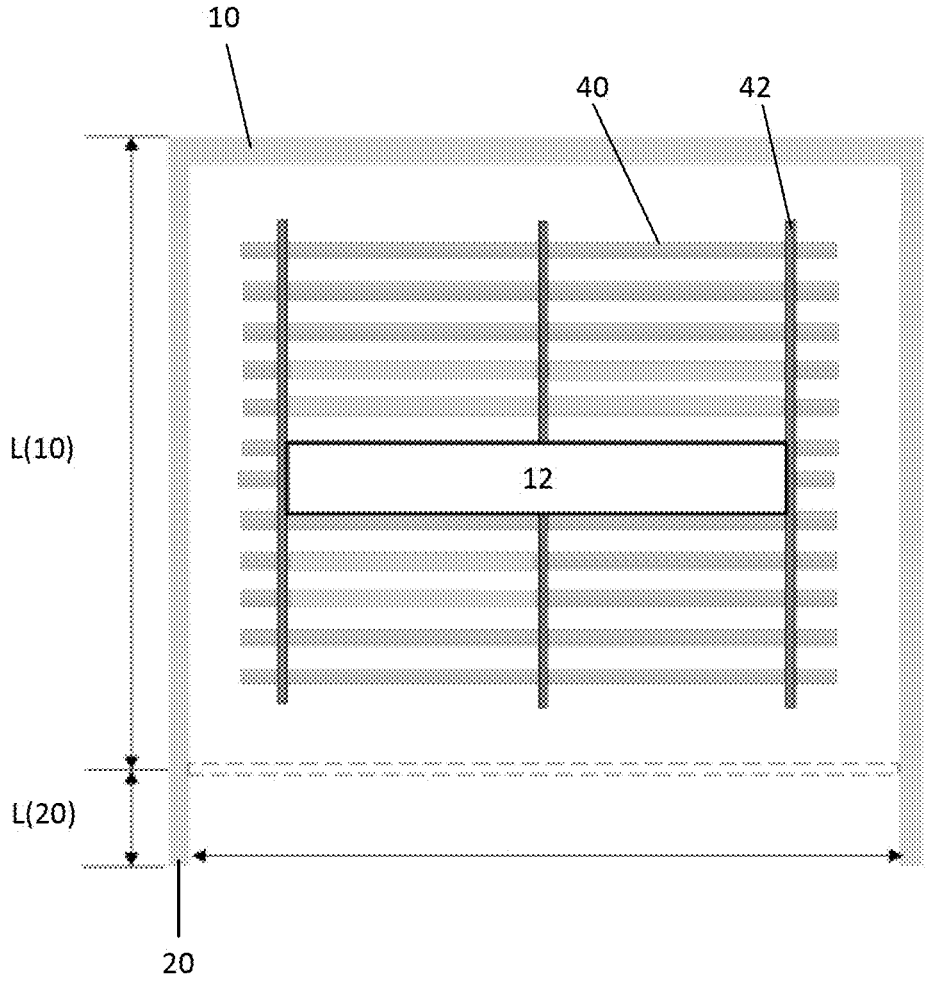
FIG. 3 is a schematic view showing a thermal refugium system according to an example embodiment.

FIG. 3 is a schematic view showing a thermal refugium system according to an example embodiment. The heat exchanger 12 is located within the enclosure 10, similar to FIGS. 1A and 1B. The water from the body of water may flow from the top of FIG. 3 to the bottom, which is equivalent to a flow from upstream to downstream, for example. The length of the enclosure 10 is marked L(10), and may be as described in Table 1. The tubes 40 are port-to-starboard within the enclosure 10, and the fins 42 are fore-to-aft. In alternative embodiments, the fins 42 may be port-to-starboard when the tubes 40 are fore-to-aft, or one or both of the tubes 40 and the fins 42 may be angled with respect to the enclosure 10. There may be one fin 42, or more than one fin 42, depending on the optimal structure, rigidity, and area of heat transfer. FIG. 3 further illustrates the extension 20 (as discussed further herein), and notes the length of the extension as L(20).

Further Structure of the System, Including Electronics

Figure 5:
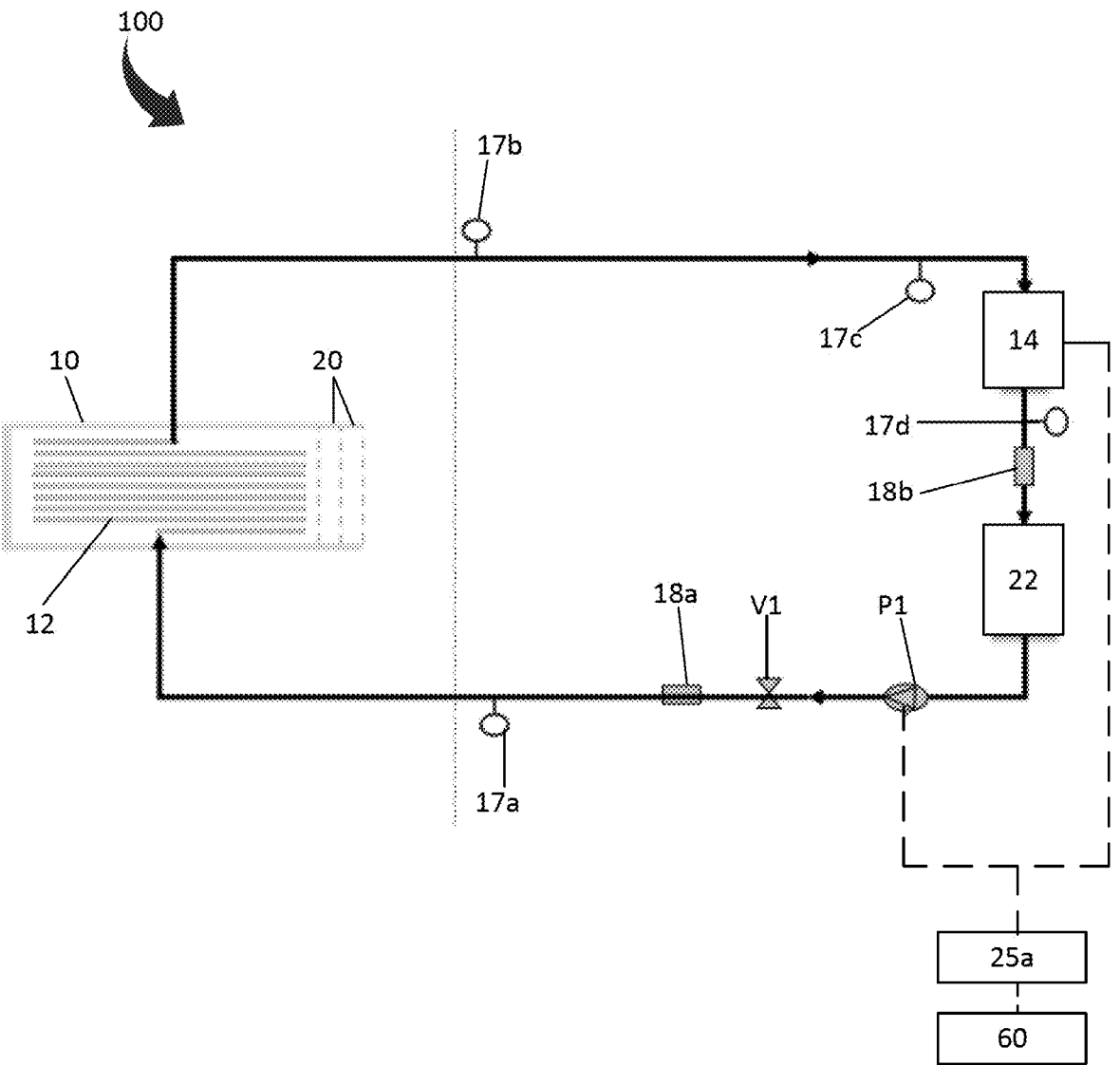
FIG. 5 is a schematic view showing a thermal refugium system according to an example embodiment.
Figure 6C:
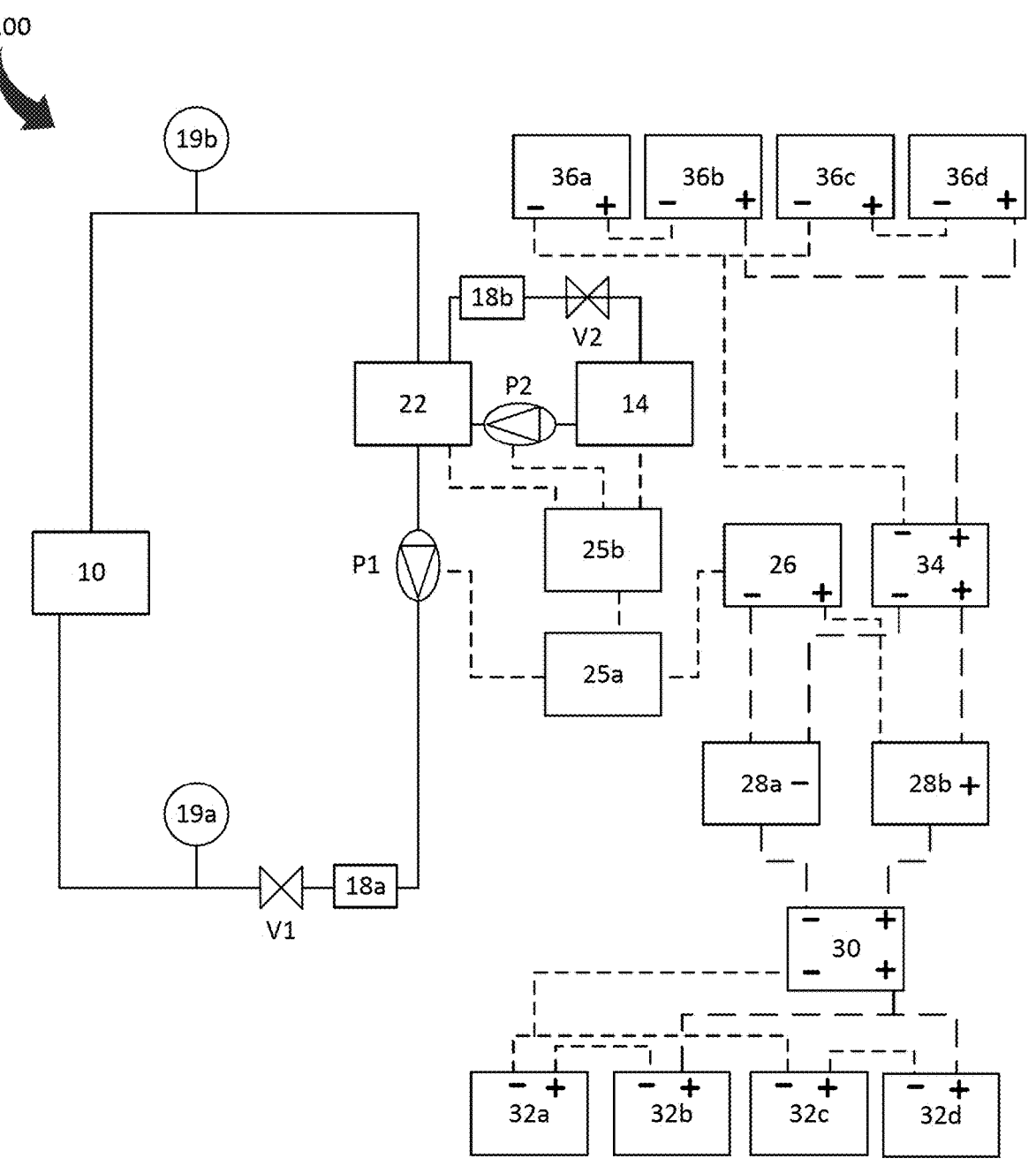
FIG. 6C is a block diagram showing a thermal refugium system according to an example embodiment.
Figure 6D:
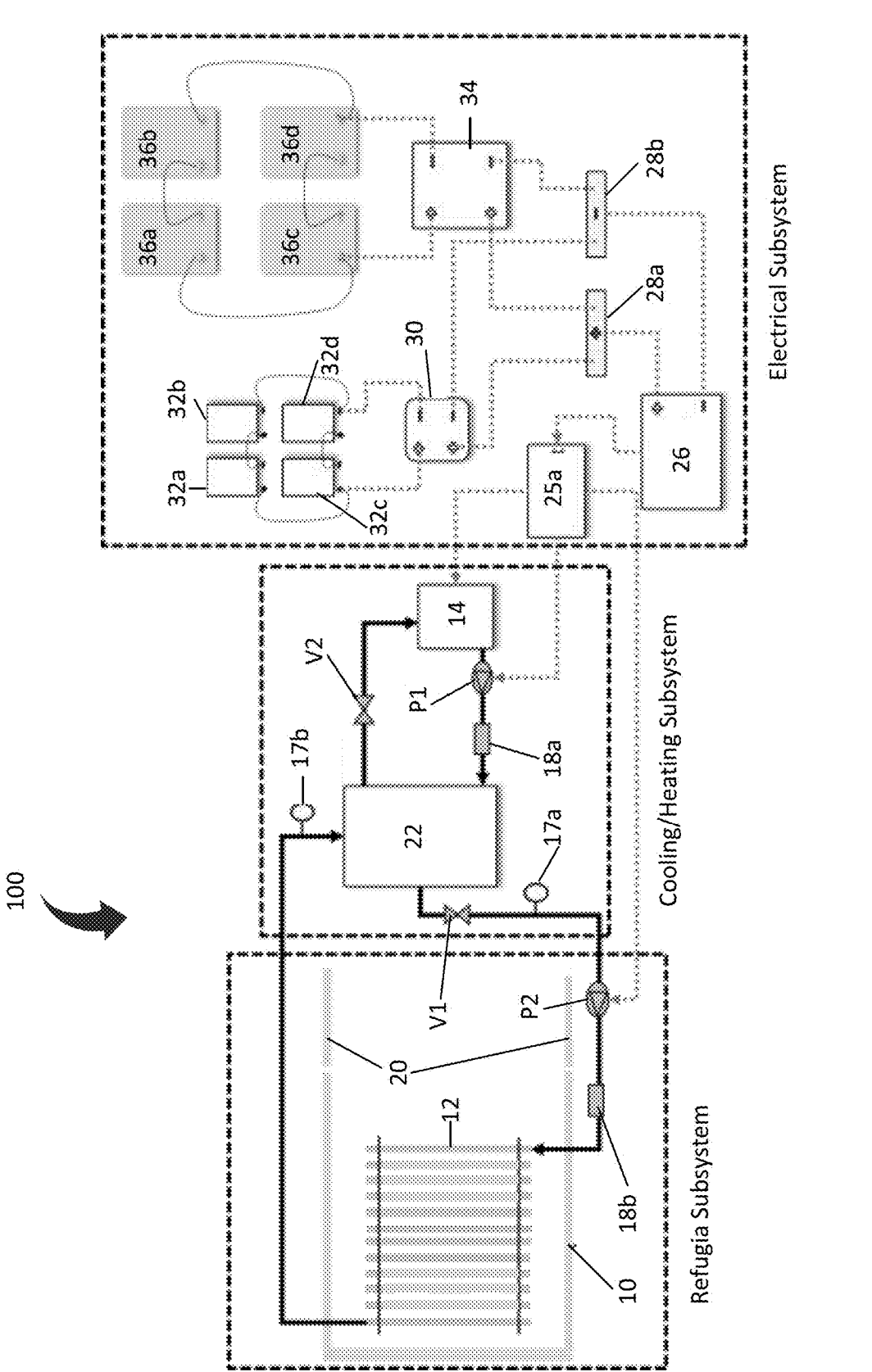
FIG. 6D is a schematic view showing a thermal refugium system according to an example embodiment.
Figure 7:
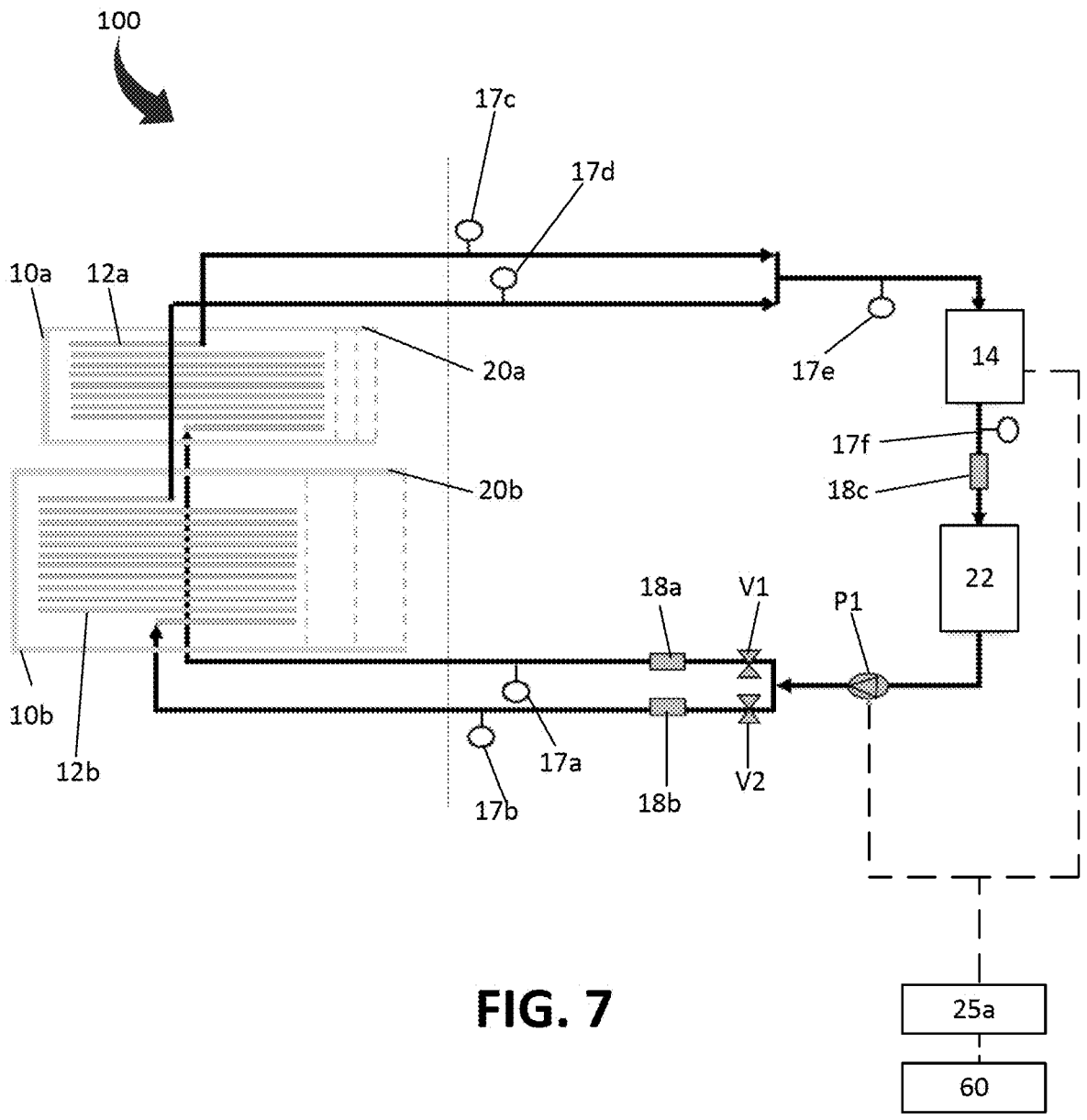
FIG. 7 is a schematic view showing a thermal refugium system according to an example embodiment.
Figure 8A:
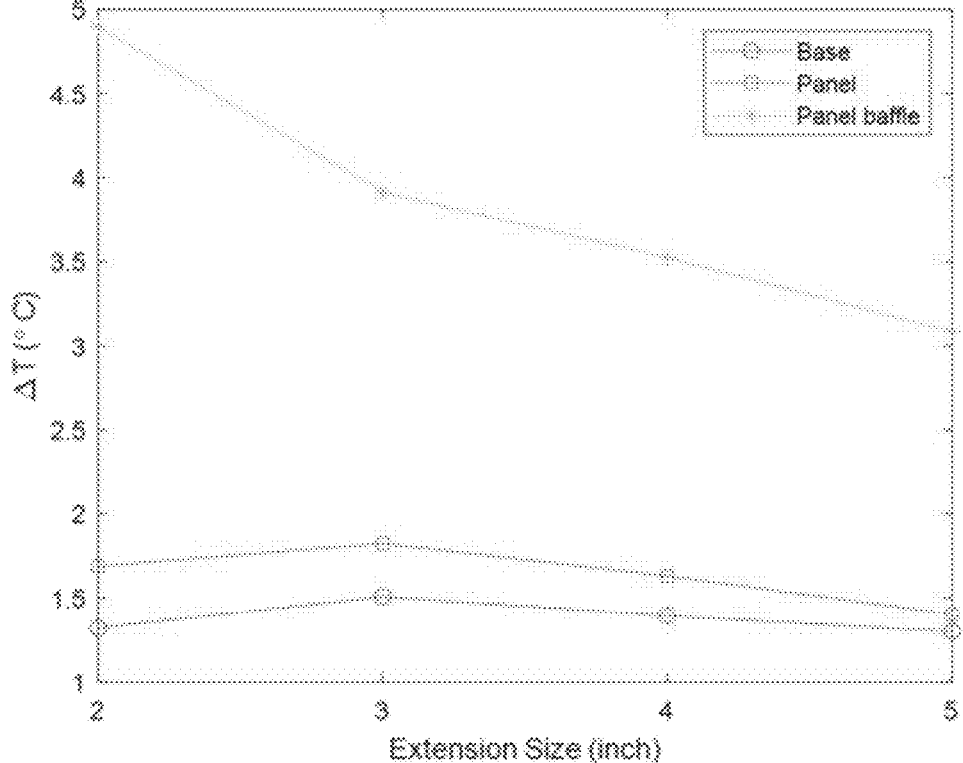
FIGS. 8A-8F are example data sets of the effect of extension size on average temperature difference, dimensionless average temperature difference, average heat transfer per average temperature difference, average heat transfer per dimensionless average temperature difference, standard deviation of temperature difference, and dimensionless standard deviation of temperature difference, respectively.
Figure 8B:
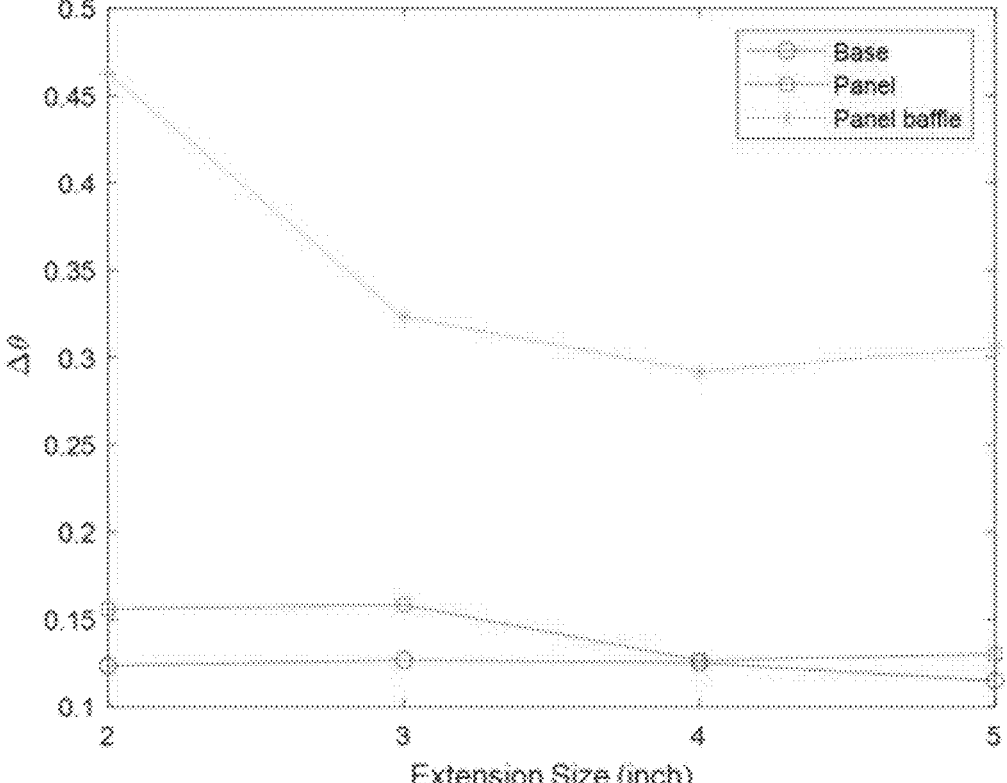
Figure 8C:
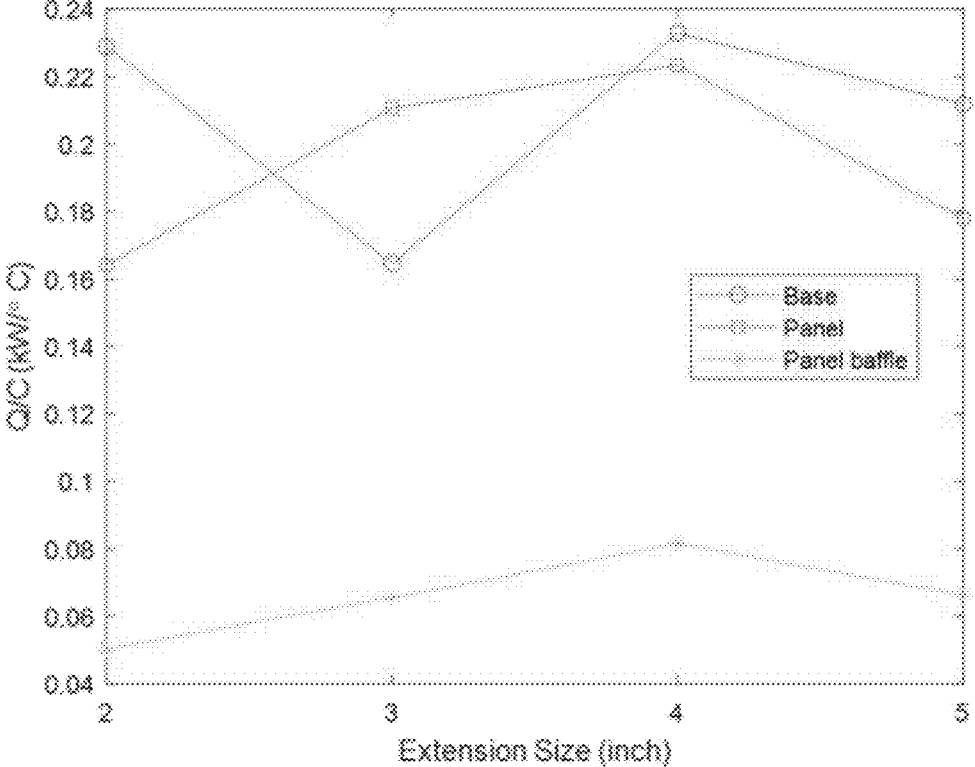
Figure 8D:
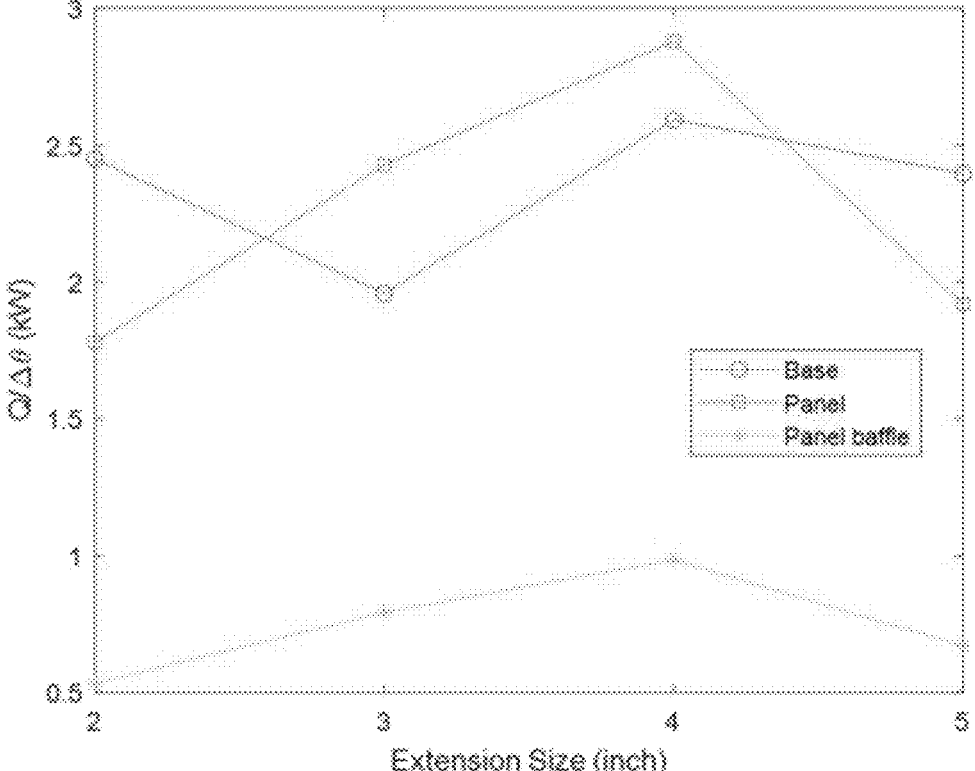
Figure 8E:
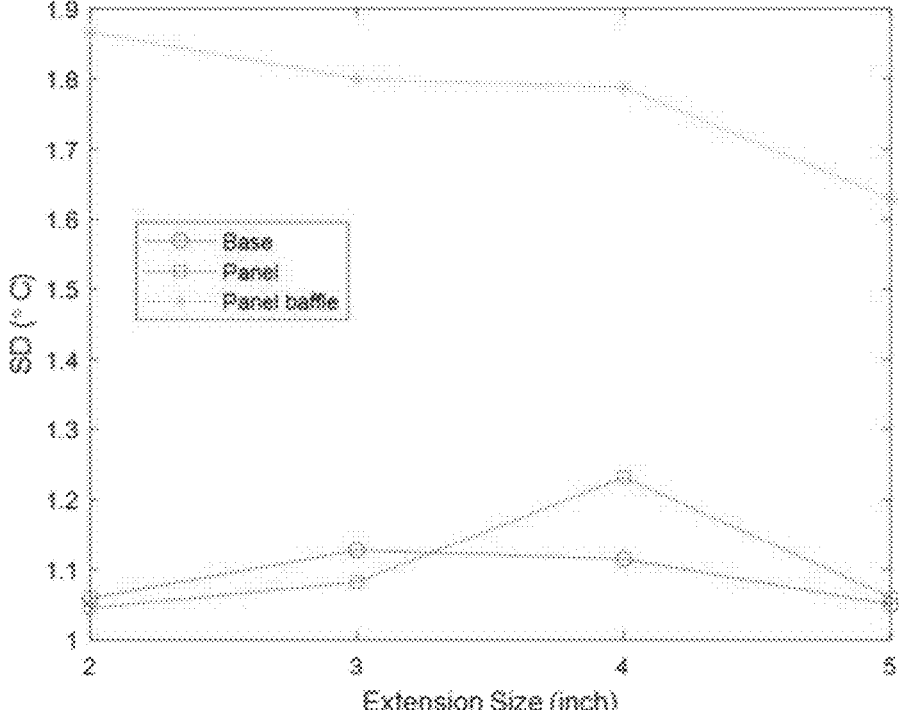
Figure 8F:
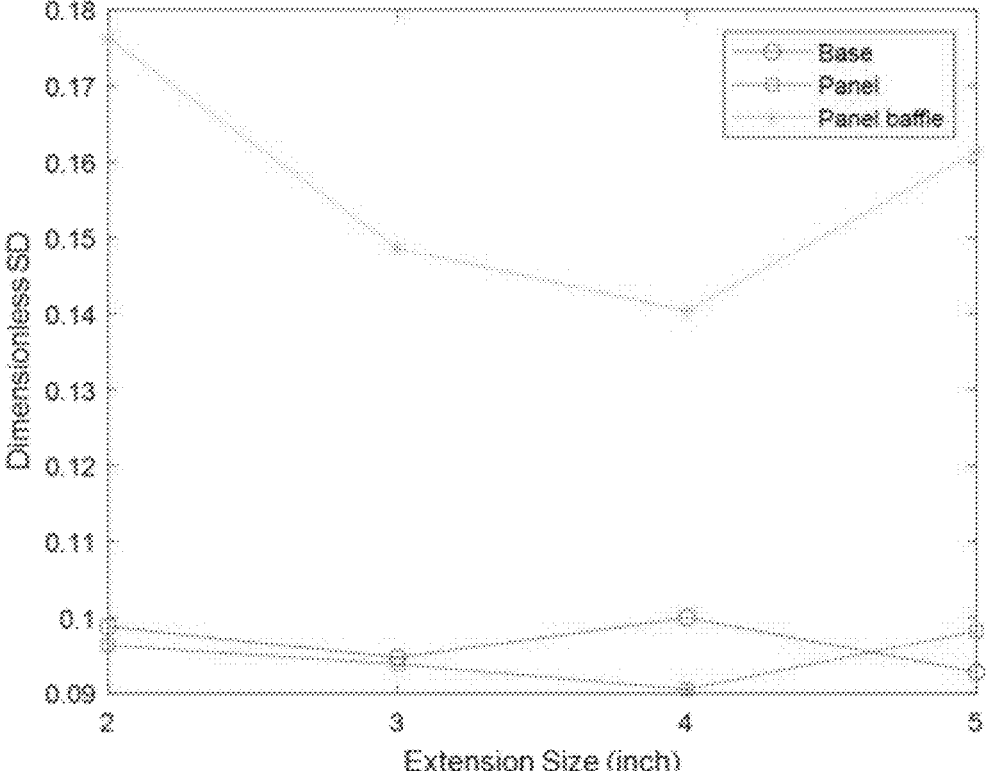
Figure 9A:
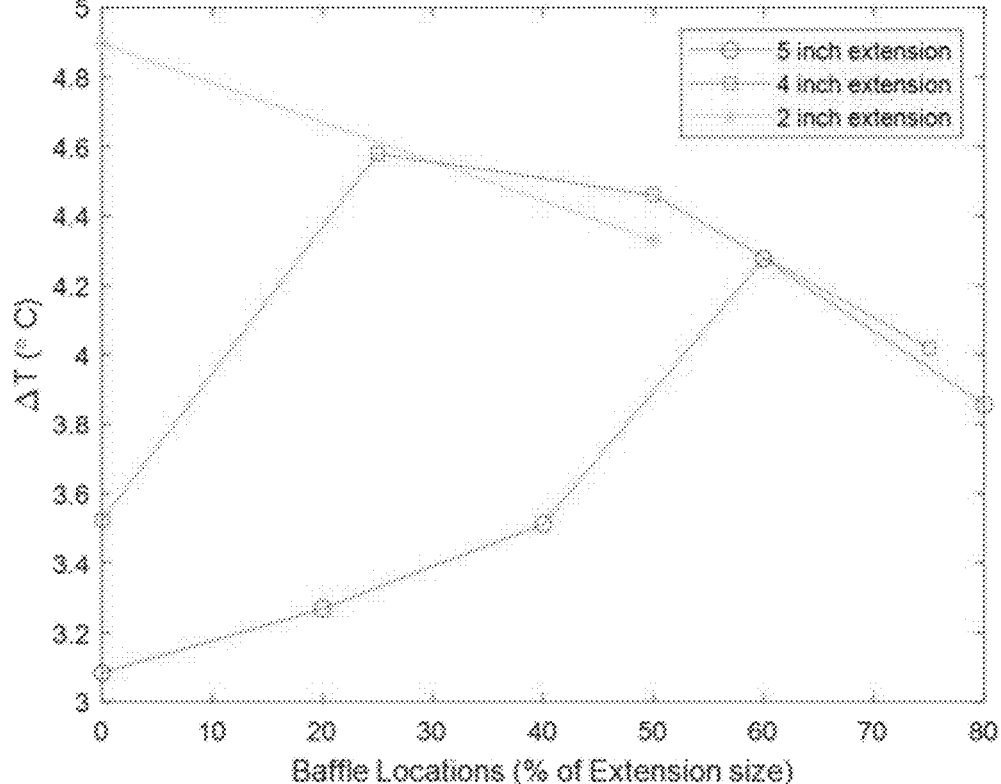
FIGS. 9A-9F are example data sets of the effect of baffle location on average temperature difference, dimensionless average temperature difference, average heat transfer per average temperature difference, average heat transfer per dimensionless average temperature difference, standard deviation of temperature difference, and dimensionless standard deviation of temperature difference, respectively.
Figure 9B:
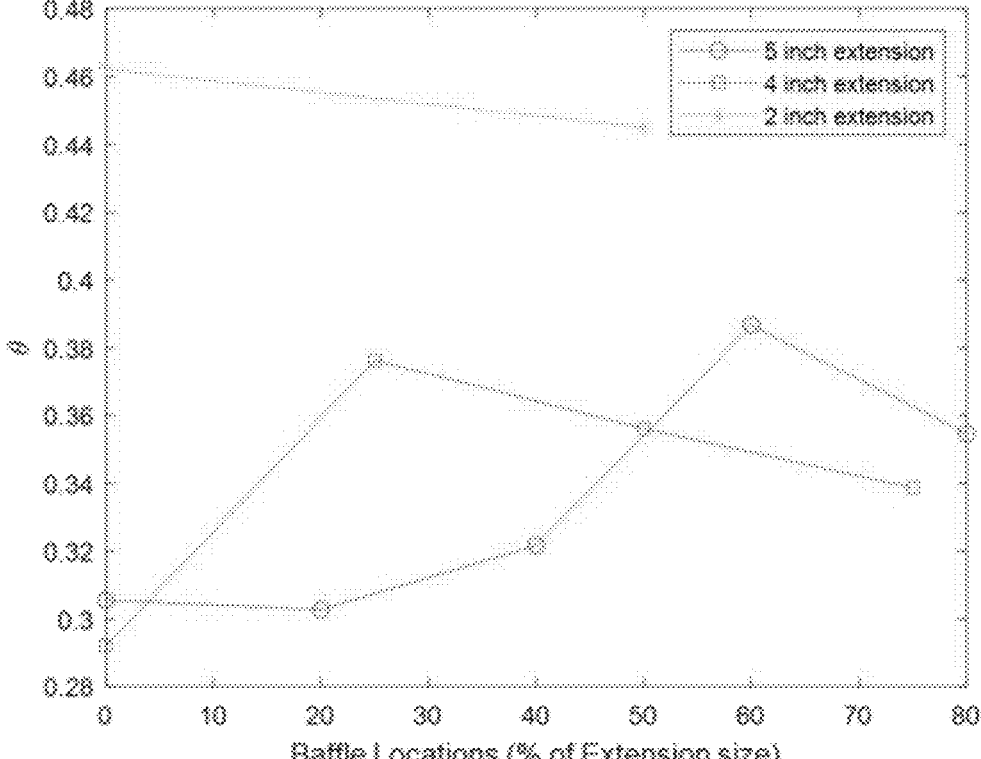
Figure 9C:
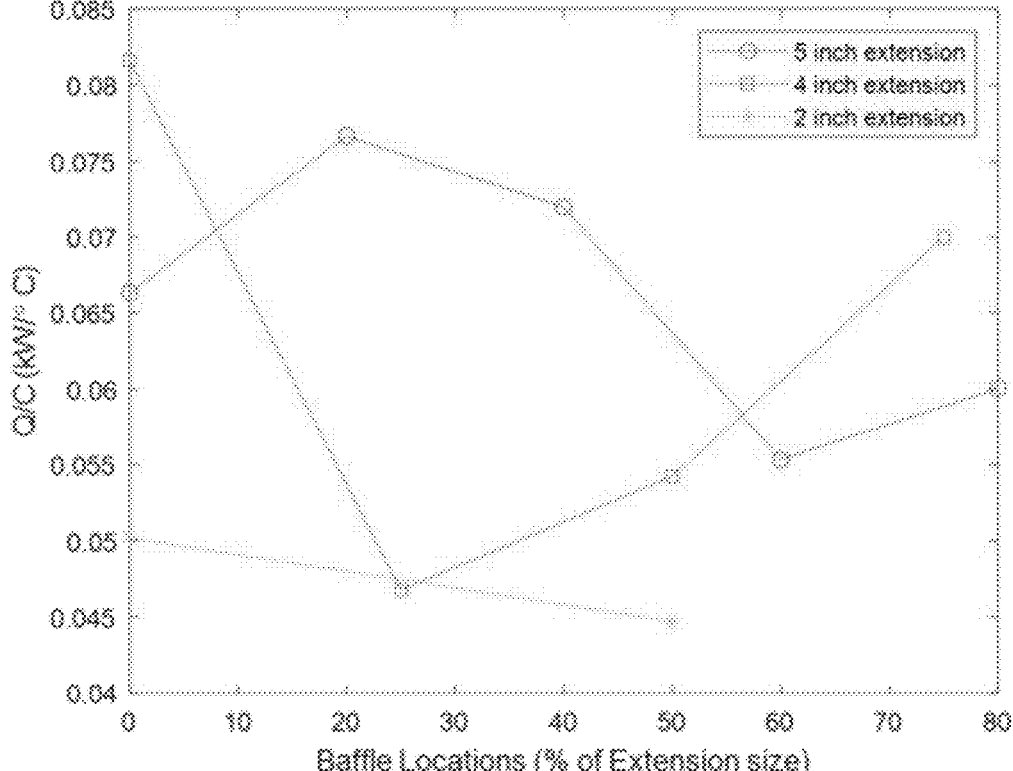
Figure 9D:
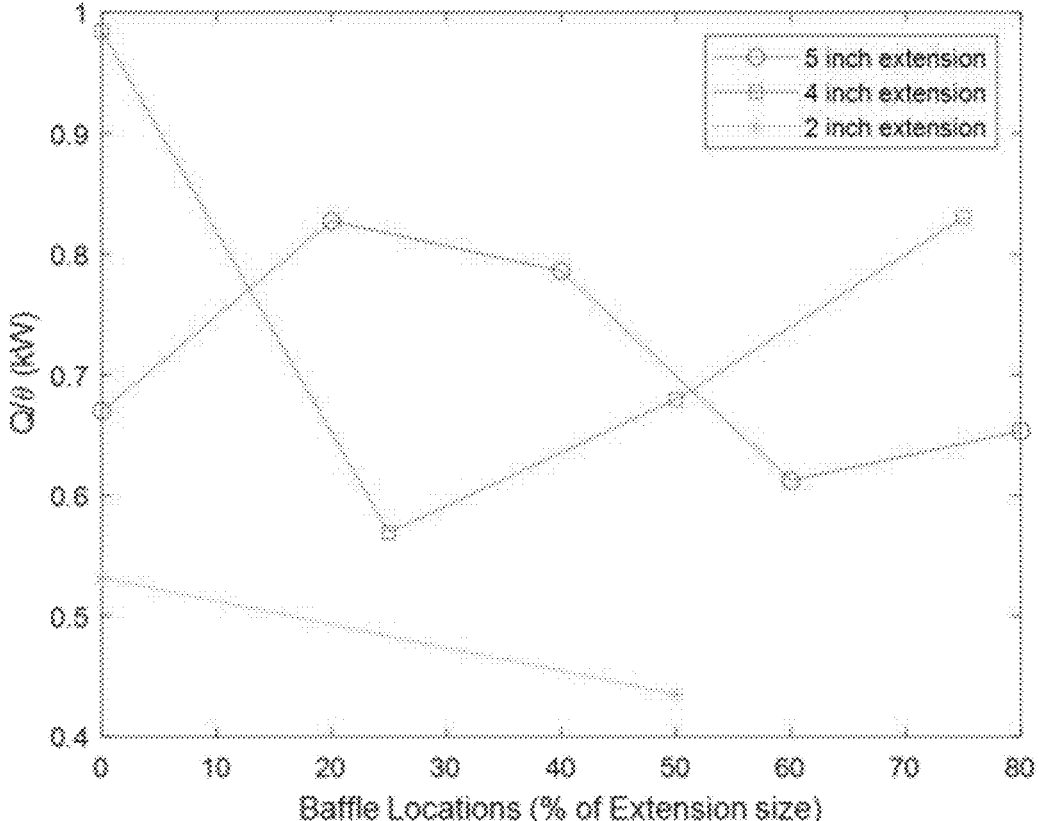
Figure 9E:
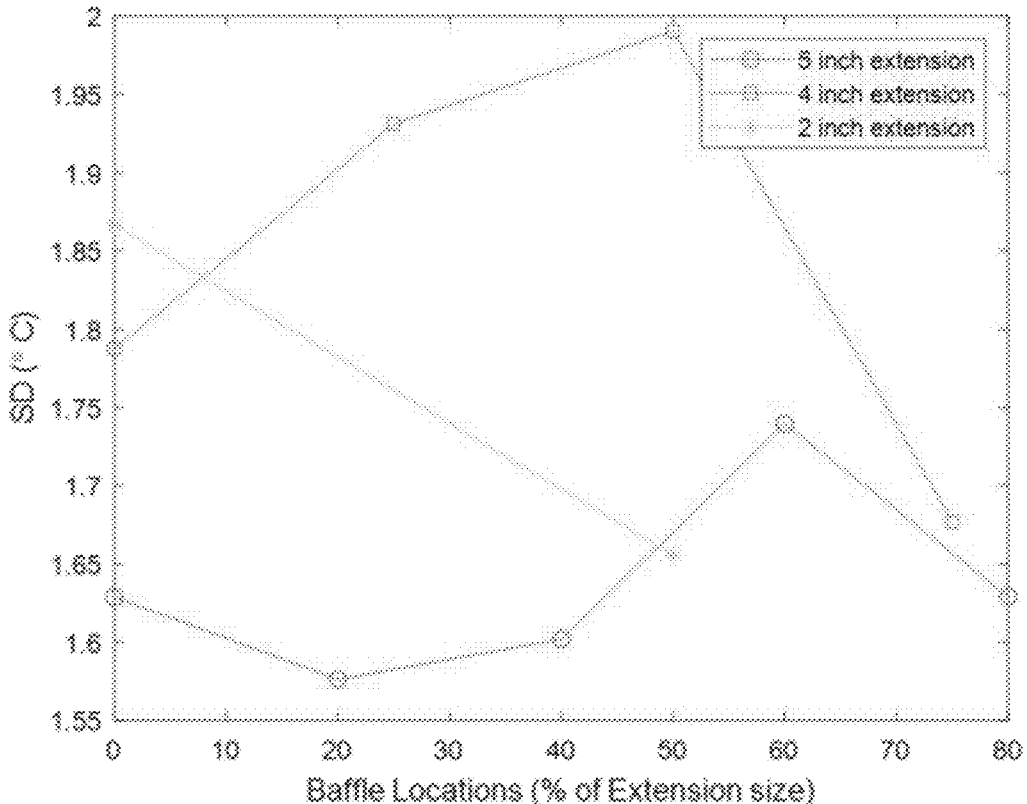
Figure 9F:
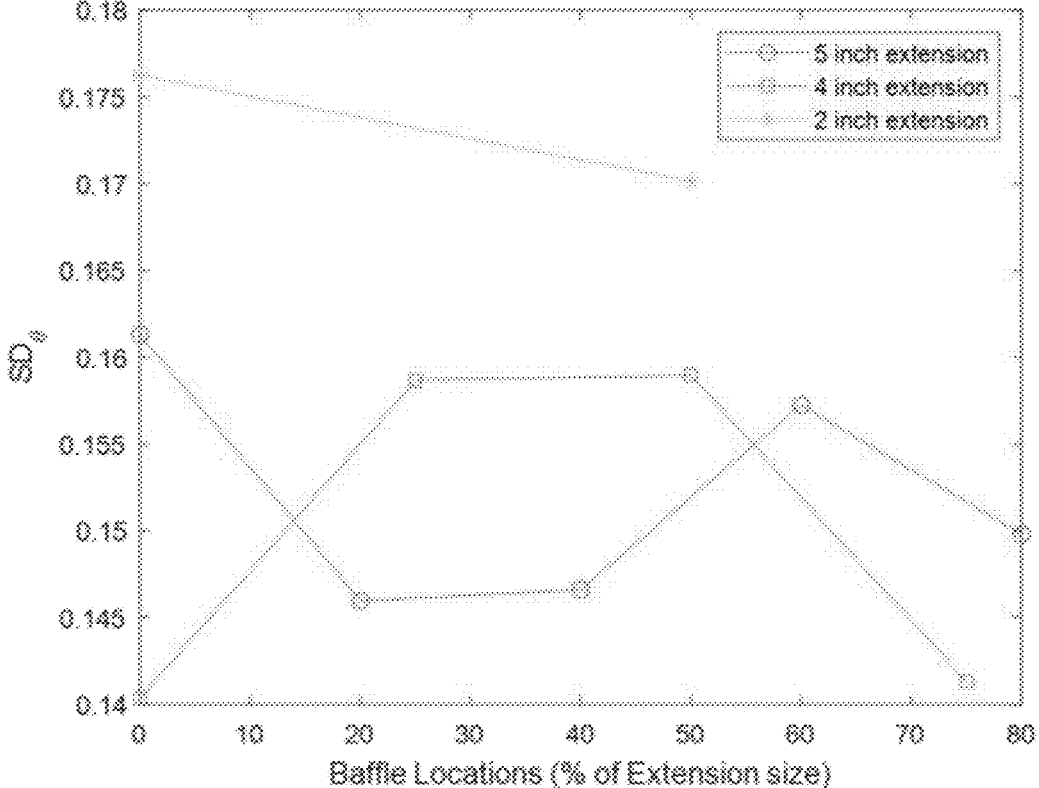
Figure 10A:
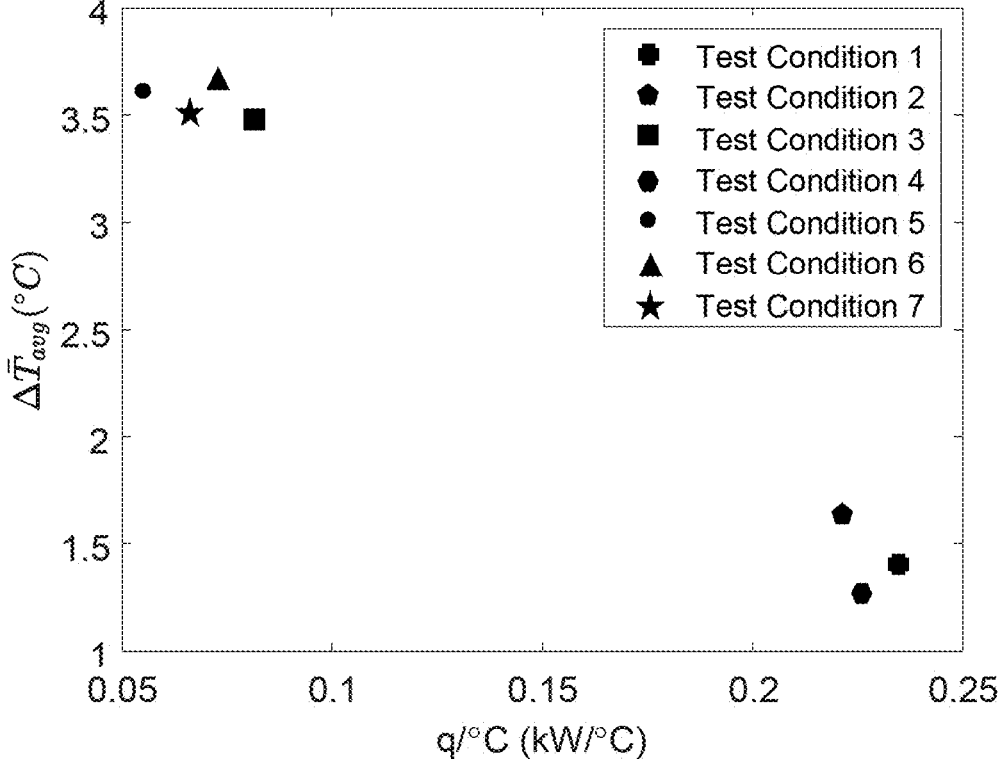
FIGS. 10A-10D are example data sets of the effect of various test conditions on average temperature difference vs. average heat transfer per average temperature difference, average dimensionless temperature difference vs. average heat transfer per dimensionless average temperature difference, average temperature difference vs. standard deviation of average temperature differences, and average dimensionless temperature difference vs. standard deviation of the average dimensionless temperature differences, respectively.
Figure 10B:
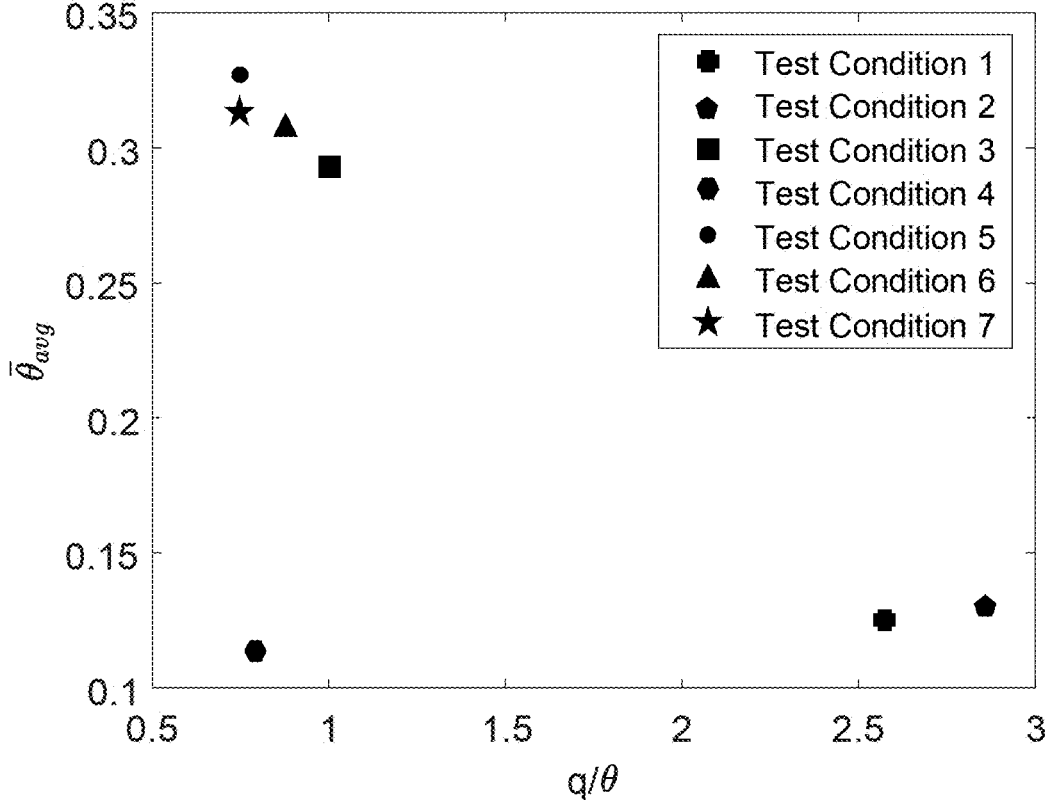
Figure 10C:
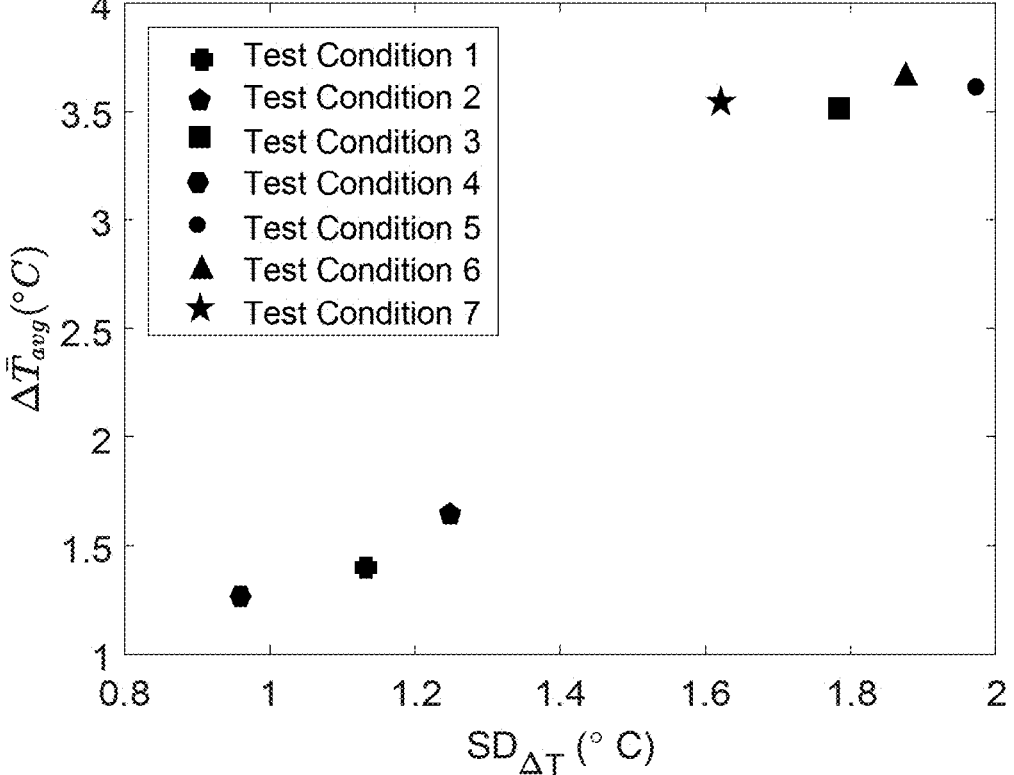
Figure 10D:
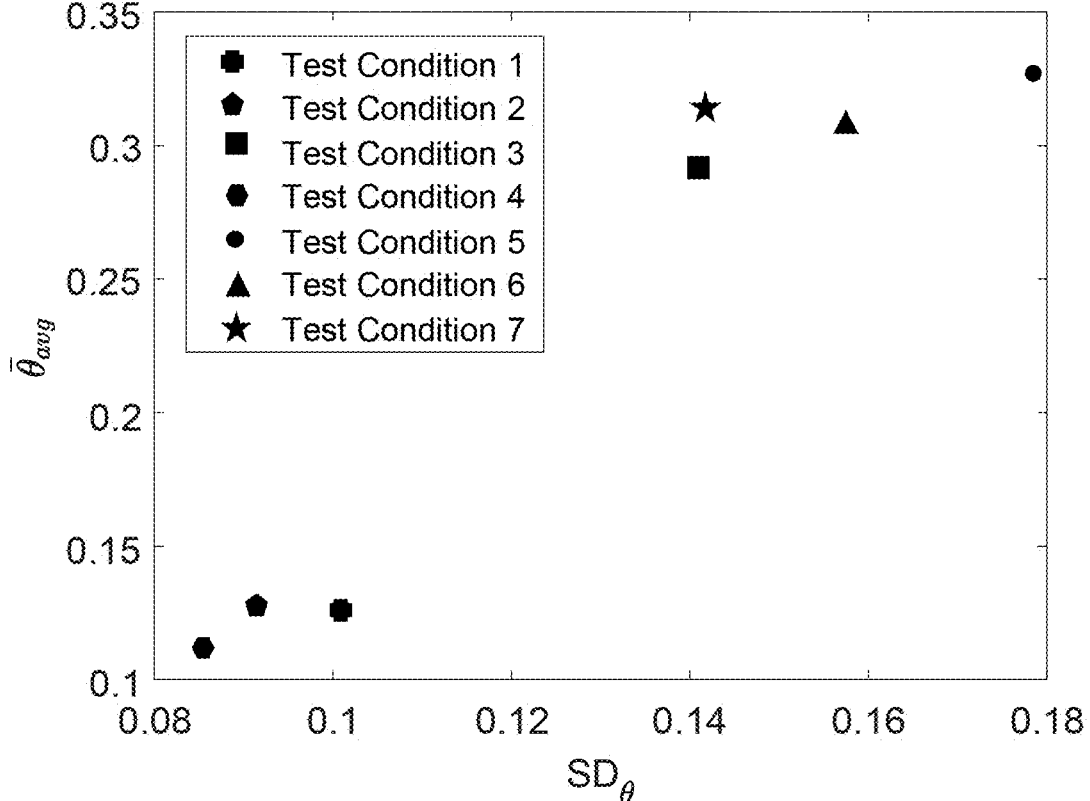

FIGS. 5-7 are schematic view showing a thermal refugium system 100 according to various example embodiments. Dashed lines denote possible electrical connections, and solid lined denote possible mechanical connections. The following elements may be included in each embodiment as shown or may be included in each embodiment even if not shown. In alternative embodiments, the following elements may be removed from the embodiments even if not shown. For elements with multiple identical elements (e.g., 10a-d, 12a-b, 17a-d, 18a-d, 19a-b, 28a-b, 32a-d, 36a-d), some, all, or none of the elements may be included in each embodiment.

The system 100 may further include the thermal apparatus 22 and the controller 24, as outlined above. The thermal apparatus may be an electrically driven chiller, an electrically driven heater, a gas driven chiller or heater, etc. The thermal apparatus 22 may be operably coupled to the heat exchanger 12. The thermal apparatus 22 may be configured to transfer heat in and out of a fluid in order to heat or cool the local volume of water. The fluid may be circulated between the thermal apparatus 22 and the heat exchanger 12. Thus, the thermal apparatus includes processing circuitry to heat or cool the fluid circulating through the heat exchanger 12, in order to maintain a set temperature of the water inside the enclosure 10. The fluid being circulated through the plumbing may include water, or may include refrigerant, or may include natural refrigerant (e.g., carbon dioxide), or may include any other fluid or gas which is configured to cool a heat exchanger.

The controller 24 may be a microprocessor or a microcontroller (e.g., an integrated circuit controlling a timer, a Proportional-Integral-Derivative controller, otherwise known as a "PID" controller, etc.). The controller may control the transfer of heat into or out of the local volume of water to maintain a local temperature in the local volume of water sustainable for wildlife living in the body of water. In another embodiment, the controller may be operably coupled to and may control the pump(s), the thermal apparatus, and a power source. The controller 24 may be operably coupled to the thermal apparatus 22. The controller 24 may be configured to control the transfer of the heat into or out of the local volume of water inside the enclosure 10, in order to maintain a local temperature in the local volume of water sustainable for wildlife living in the body of water. In one embodiment, the local temperature comprises a set temperature that is set by a user.

The controller 24 may be configured to compare the immediate temperature of the local volume of water to the set temperature, and may be further configured to adjust at least one of the first at least one pump P1 and the thermal apparatus 22 to change the immediate temperature to match the set temperature. The system 100 may further include a plumbing system to operably couple the heat exchanger 12 and the thermal apparatus 22 (and other elements of the system 100), as discussed herein. Further, the plumbing system may comprise any suitable material (e.g., plastic, metal, etc.).

The system 100 may further include an optional reservoir 14 fluidly coupled between the heat exchanger 12 and the thermal apparatus 22. The reservoir 14 may be removed from any embodiment herein, and is fully optional. The benefit of including a reservoir is to have a supply of fluid for the system 100, but this is not required for the system 100 to work. The reservoir 14 may be configured to hold the fluid that is being cycled through the plumbing of the system. The thermal apparatus 22 and reservoir 14 may be housed on land near the body of water, for example. In another embodiment, water from the stream may be pumped into the thermal apparatus 22 and then back into the stream without the use of a heat exchanger 12. In another embodiment, different cooling systems than vapor compression cycles may be used, such as, for example, absorption cooling. In another embodiment, the coolant used may be cooled by vapor compression without the need for a reservoir 14. In another embodiment, a heat pump or a water heater (e.g., a propane heater, a solar thermal system, etc.) may be used to provide a warmer thermal refugia in colder weather. In another embodiment, the heat exchanger 12 may be used as the evaporator of the vapor compression cycle, thereby eliminating the need for an additional coolant fluid. Refrigerant from the thermal apparatus 22 may then be pumped directly to the heat exchanger 12 in the enclosure 10 to be evaporated in the enclosure 10 and then return to the thermal apparatus 22 to complete the vapor compression cycle. In another embodiment, both a chiller thermal apparatus and a heat pump or water heater thermal apparatus may be provided such that the thermal refugia may be used throughout the year and be adapted to warm or cool the water as needed.

In alternative embodiments, a first heat exchanger 12 inside the enclosure 10 is used as an evaporator (e.g., when cooling is needed) or a condenser (e.g., when heating is needed), and a second heat exchanger 12 is located on land (instead of a thermal apparatus 22). In both cases, a refrigerant may be used as the heat transfer fluid and pumped directly through the heat exchanger 12. For cooling, fluid refrigerant may be sent to the heat exchanger 12 (operating as an evaporator) where the fluid refrigerant evaporates into a vapor. The vapor is condensed back to a fluid by the second heat exchanger 12 on land (operating as a condenser). For heating, vapor refrigerant is sent to the heat exchanger 12 in the enclosure 10 (now operating as a condenser) where it condenses to form a fluid thereby heating the local volume of water in the enclosure 10. The fluid refrigerant is converted back to a vapor by the second heat exchanger 12 external to the enclosure 10. Thus, rather than pumping a hot or cold fluid into the heat exchanger 12 in the enclosure 10 (i.e., using a heat transfer fluid that stays the same phase), a refrigerant which changes phase while flowing through the heat exchanger 12 in the enclosure may be used. This may offer improved heat transfer rates at least because the fluid in the first heat exchanger 12 is directly evaporated or condensed within the enclosure 10. In alternative embodiments, the second heat exchanger 12 may operate as, or replace, the thermal apparatus 22.

The heat exchanger 12 may be plumbed to an optional cold-water storage tank (optional reservoir 14). The storage tank may be insulated to minimize loss to the environment. The reservoir 14 may store cold water from the thermal apparatus 22 thus allowing immediate cooling as soon as cooling is required in the thermal refugia. An inline 0.186 kW (¼ horsepower (hp)) utility pump may be used to pump the cooling water from the cold-water storage tank through the heat exchanger. To keep the water in the storage tank cool, it may be plumbed to a 0.373 kW (½ hp), air-cooled chiller. A 0.075 kW (1/10 hp) inline utility pump may be used to pump water from the chiller to the cold-water storage tank. The total electrical power required to operate the prototype thermal refugia system may be approximately 0.64 kW, which may include the chiller and two water pumps. The prototype thermal refugia system may be powered by a photovoltaic (PV) system power source. An array of four 120 cell monocrystalline solar panels each having a rated power output of 330 W may be used. To store the electricity, four 12 V, 200 Ah batteries may be connected into a 24 V, 400 Ah battery pack. The PV panels may generate enough electric power to run the cooling system and charge the battery at the same time when enough insolation (e.g., >500) is available. When the insolation is not sufficient to run the cooling system, the system 100 may draw energy from the battery pack.

The system 100 may further include a first at least one pump P1 operably coupled to the reservoir 14 and the heat exchanger 12. The first at least one pump P1 may be configured to pump the fluid between the thermal apparatus 22 and the heat exchanger 12. The first at least one pump P1 may be submersible utility pumps or in-line pumps or any other suitable pumps. In line pumps may be advantageous as they save physical space and do not require as much exterior hardware. Since the system may be placed outside, smaller and more compact elements may be beneficial.

The system 100 may further include a feedback sensor (e.g., thermistor 16 and temperature sensors 17*a-d* and 19*a-b*) operably coupled to the at least one enclosure 10 and configured to sense an immediate temperature of the at least one local volume of water. This may advantageously allow for better control of the maintenance of the set temperature. Any number of sensors may be included in the system to optimize the maintenance of the set temperature.

The system 100 may further include a mass flow meter 18 operably coupled to the heat exchanger 12 and configured to determine flow rate through the heat exchanger 12. This may be advantageous to better control the maintenance of the set temperature. Flow rate affects the heat transfer, as discussed herein. Any number of mass flow meters may be included in the system to optimize the maintenance of the set temperature.

The system 100 may further include an optional second pump P2 (as shown in 6B-6D) operably coupled to the thermal apparatus 22 and the reservoir 14. The second pump P2 may be configured to pump the fluid between the thermal apparatus 22 and the optional reservoir 14. The controller 24 may be further configured to adjust the second pump P2 to change the immediate temperature of the local volume of water to match the set temperature. The second pump P2 may be submersible utility pumps or in-line pumps or any other suitable pumps. In line pumps may be advantageous as they save physical space and do not require as much exterior hardware. Since the system may be placed outside, smaller and more compact elements may be beneficial.

The system 100 may further include further pumps to better control and optimize maintenance of the temperature at the set temperature. For example, in some embodiments, two or more pumps are used, or 4 or more pumps are used, or 10 or more pumps are used, etc.

The system 100 may further include one or more valves V1-V3 as illustrated in FIGS. 1-7. The valves may be used to stop or start flow through the system 100, or to regulate flow through the system 100. The valves V1-V3 may work in tandem with the other sensors (mass flow sensor, temperature sensor, etc.) in order to regulate the control of the system 100 to maintain a desired temperature in the local body of water.

The system 100 may further include a power source 36a-d (as shown in FIGS. 6C-6D, and as partially shown in FIGS. 6A-6B) coupled to the controller 24 and the thermal apparatus 22. The power source 36a-d may include at least one photovoltaic panel. The power source may be, for example, a power generator, a battery, or a photovoltaic panel. In embodiments using a power generator, for example, the power source 36a-d may only include one generator 36. The power source may provide power to the controller, the pump(s), and the thermal apparatus, for example. The power source may be operably coupled to and provide power to a battery as well, for example. Such a battery may be used to supplement the power source. In an embodiment, the system is turned on and off at fixed times using a controller which controls a timer or timers. In another embodiment, the system cools or heats the local water near the thermal refugium as needed to maintain a set temperature of the local water.

The system may further include at least one battery 32a-d (as shown in FIGS. 6C-6D, and as partially shown in FIGS.

the electrical subsystem (shown in FIG. 6D). The inverter 26, charge controller 34, bus bars 28a-b, DC switch 30, and AC outlet 25a may work in tandem to execute the instructions from the controller 24.

The system may further include more than one enclosure 10, as shown in FIG. 7. In FIG. 7, two enclosures 10a and 10b are depicted, and both are connected to the optional reservoir 14 and the thermal apparatus 22 via plumbing. In alternative embodiments, the system may include one or more enclosures 10, one or more heat exchangers 12, one or more extensions 20, and may regulate the temperature of one or more refugia. The electrical subsystem and the cooling/heating subsystem may be singular and connected to multiple refugia subsystems. In alternative embodiments, multiple systems could be installed in a body of water such that there were multiple of each subsystem described herein.

In one embodiment, and referring to the elements as discussed herein, a system 100 to provide a thermal refugium in a body of water includes at least one enclosure 10 configured to provide at least one local volume of water from the body of water. The system further includes a heat exchanger 12 within the at least one enclosure 10 to perform at least one of cooling and heating the at least one local volume of water of the body of water. The system further includes a thermal apparatus 22 operably coupled to the heat exchanger 12. The system further includes a fluid disposed within at least one of the heat exchanger 12 and the thermal apparatus 22. The system further includes a controller 24 operably coupled to the thermal apparatus 22. The controller 24 may be configured to automatically maintain a local temperature of the at least one local volume of water. The local temperature may include a set temperature that is set by a user. The system may further include a power source operably coupled to the controller 24.

Figure 19A:
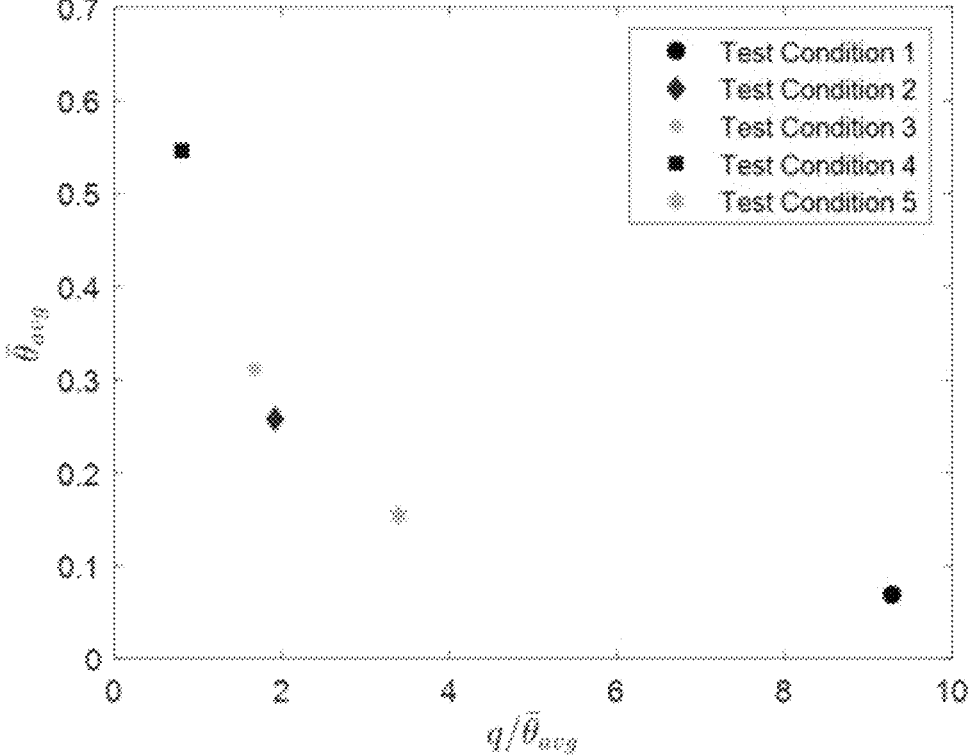
FIGS. 19A-19B are example data sets of the effect of various test conditions on average dimensionless temperature difference vs. average heat transfer per dimensionless temperature difference, and on average temperature difference vs. average heat transfer per degree Celsius of cooling.
Figure 19B:
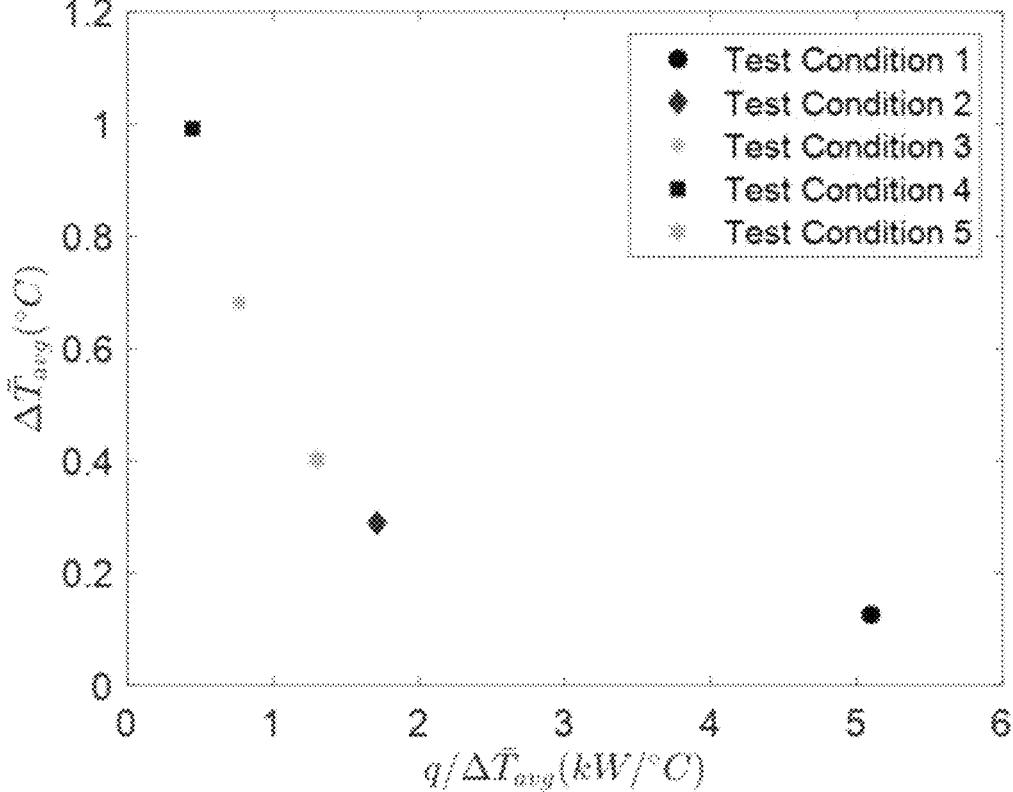

FIGS. 19A-19B are example data sets of the effect of various test conditions on average dimensionless temperature difference vs. average heat transfer per dimensionless temperature difference, and on average temperature difference vs. average heat transfer per degree Celsius of cooling.

TABLE 8

| | Further Embodiment Configurations and Test Conditions for the Enclosure 10 | | | |
|---|---|---|---|---|
| Test | Prototype configuration | Flow rate | Average free Stream temperature (° C.) | Average heat exchanger inlet temperature (° C.) |
| Test Condition 1 | Base Enclosure | $0.12 \text{ kg} \cdot \text{s}^{-1}$ | 9.88 | 8.24 |
| Test Condition 2 | Base Enclosure + Panel | $0.12 \text{ kg} \cdot \text{s}^{-1}$ | 7.57 | 6.51 |
| Test Condition 3 | Base Enclosure + Extension | $0.12 \text{ kg} \cdot \text{s}^{-1}$ | 9.69 | 7.49 |
| Test Condition 4 | Base Enclosure + Extension + Panel | $0.12 \text{ kg} \cdot \text{s}^{-1}$ | 8.52 | 6.69 |
| Test Condition 5 | Base Enclosure + Extension | $0.068 \text{ kg} \cdot \text{s}^{-1}$ | 9.77 | 7.21 |

6A-6B) operably coupled to the power source 36a-d. The power source 36a-d may be operable to charge the at least one battery 32a-d in addition to powering the controller 24 and the thermal apparatus 22, and wherein the at least one battery 32a-d is operable to supplement the power source 36a-d.

The system may further include an inverter 26, a charge controller 34, bus bars 28a-b, a DC switch 30, and AC outlet 25a. All the electrical components can be grouped together as a photovoltaic system 60 (shown in FIGS. 5 and 7) or as FIGS. 19A-19B show the effects of the enclosure configurations on the average degree of cooling and heat transfer. For test condition 1, using only the base enclosure, the dimensionless, average temperature difference is 0.069, which is significantly smaller than other test conditions. Additionally, the average heat transfer required per dimensionless, average temperature difference is significantly higher. As such, it can be hypothesized that the base enclosure (test condition 1) allows for significant water exchange and mixing with the warmer free stream. As a result, the average temperature inside the enclosure remains very close to the free stream temperature. Utilizing a panel (test condition 2) or an extension (test condition 3) results in a similar dimensionless, average temperature difference (0.26 vs. 0.31) and average heat transfer required per dimensionless cooling effect, with the extension having a slightly better impact. But both are a significant improvement over the base enclosure. Compared to the base enclosure, the dimensionless temperature difference is approximately quadrupled and the average heat transfer per dimensionless cooling effect is approximately one-fifth of the base enclosure design. Adding both the panel and the extension (test condition 4) had the best performance. It showed the largest dimensionless, average temperature difference (0.55) as well as the largest absolute temperature difference (~1 degree Celsius).

Additionally, it required the lowest heat transfer rate per degree of cooling. It achieved approximately 55% of the maximum degree of cooling that was possible for the experimental conditions, which is nearly double that of the other enclosure configurations and almost an order of magnitude improvement from the base design. Comparing the results of test condition 5 to test condition 3 shows the effect of cooling water mass flow rate. These two test conditions have the same enclosure configuration but test condition 5 has a lower mass flow rate. The lower mass flow of the cooling water resulted in a smaller dimensionless, average temperature difference (0.15 vs. 0.31). Thus, a key requirement for minimizing the heat transfer rate required per degree of cooling and to achieve a high degree of cooling is to limit water exchange between the enclosure and the free stream. However, the thermal refugia subsystem designs are sensitive to the thermal resistance between the heat exchanger 12 and the water in the enclosure. As such, care should be taken to prevent isolating the enclosure 10 to the degree that it stagnates the fluid motion inside the enclosure 10 and thus limits the heat transfer rate or using too low of a flow rate in the heat exchanger 12. However, that stagnation point has not yet been reached with these enclosure designs, and one possible method for improvement is to increase the cooling water mass flow rate.

Figure 18A:
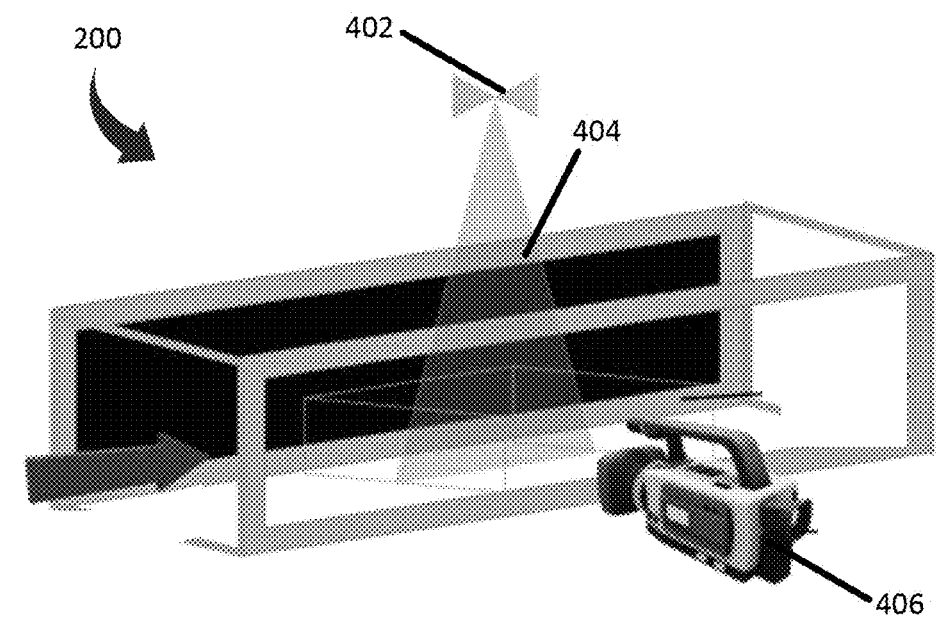
FIG. 18A is a schematic perspective view of an example particle image velocimetry (PIV) experimental set up.
Figure 18B:
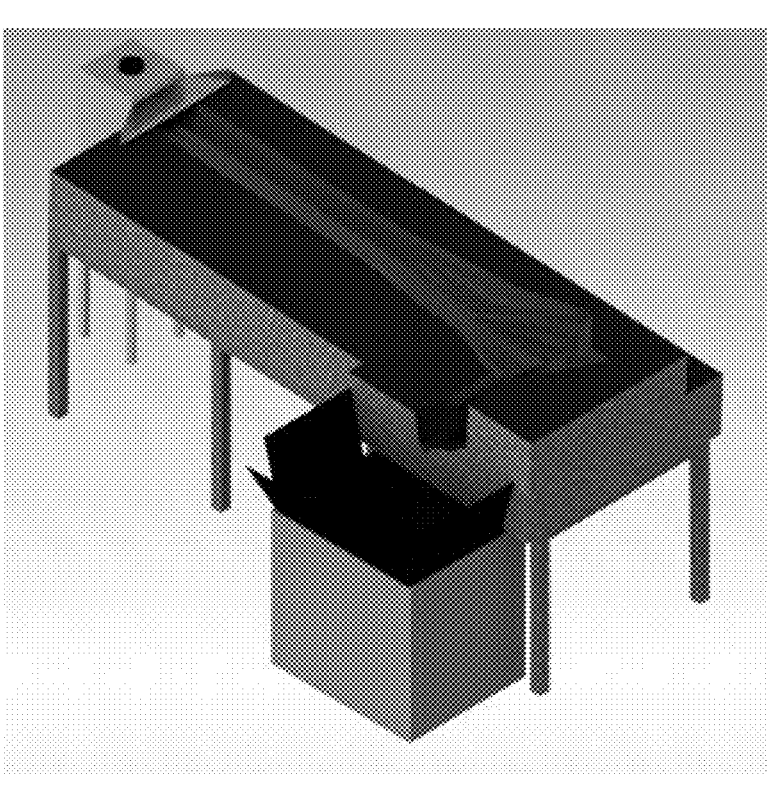
FIG. 18B is a computer-aided perspective view of a replica stream system.

FIG. 18A is a schematic perspective view of an example particle image velocimetry (PIV) experimental set up. FIG. 18B is a computer-aided perspective view of a replica stream system.

To conduct these experiments, an open-channel water tunnel 400 may be constructed. Considering the space constraint in the lab, a distorted scaling model may be utilized. A 22.88:1 scaling may be applied to the model stream width and a 5.40:1 to its maximum depth. In the case of the chosen scaling, the critical geometric ratio may be 4.24. The model may be scaled based on a Froude number (Fr) similitude to the actual stream, and it may maintain a consistent flow regime based on the Reynolds number (Re) with the actual stream. The scaling objective is to match the Froude number meaning the ratio of the Froud number for the actual stream and model stream to be unity. The Froude number, a ratio of the inertial forces to gravitational forces.

In this study, the flow characteristics were captured using particle image velocimetry (PIV) experimental system 300. Fundamentally, in a PIV experiment, the fluid is seeded with small particles. Then a laser 402 is used to irradiate a plane of the flow 404. The particles reflect the laser light. Then, high speed cameras 406 are used to take images of the fluid flow at two instances, one after another, separated by a few microseconds. After capturing at least two instances of the flow, the displacement of the particles is obtained by tracking the movement of the individual particles with a computer software. The velocity of flow can be determined from the time and displacement of the particle and the streamlines can also be determined.

Four different enclosure sizes were tested as shown by Table 9. All enclosures were the full width of the water tunnel. However the length and height the enclosures were varied. In addition to different enclosure sizes, the impact of a panel partially blocking the downstream opening 52 was tested, and the impact of using a baffle to further isolate the heat exchanger 12 from the free stream. In these tests, a dummy heat exchanger consisting of plastic rods was placed into the enclosure. Thus, the other variables were (i) the presences of a panel and (ii) the presences of a baffle. An example of the different combinations of potential enclosure-heat exchanger configurations is given in the schematics of FIG. 18A.

TABLE 9

| Enclosure Dimensions | | | |
|---|---|---|---|
| Enclosure# | Width (m) | Length (m) | Height (m) |
| 1 | 0.3048 | 0.1524 | 0.0508 |
| 2 | 0.3048 | 0.1524 | 0.1016 |
| 3 | 0.3048 | 0.3048 | 0.0508 |
| 4 | 0.3048 | 0.3048 | 0.1016 |

FIGS. 20A-20D are schematic side views of various enclosures according to various example embodiments, and FIG. 20E is a schematic side view of an enclosure according to an example embodiment. 20A depicts an enclosure 10 and extension 20. FIG. 20B depicts an enclosure 10, extension 20, panel 50, and heat exchanger 12. FIG. 20C depicts an enclosure 10 and extension 20, and a heat exchanger 12. FIG. 20D depicts an enclosure 10 and extension 20, and a panel 50 and a baffle 54. FIG. 20E depicts an enclosure and extension with lengths L(20) and L(10), a heat exchanger with length L(12), a panel with height (hp), and a baffle with height (hb1) that is a distance (x1) away from the panel 50.

Figure 21A:
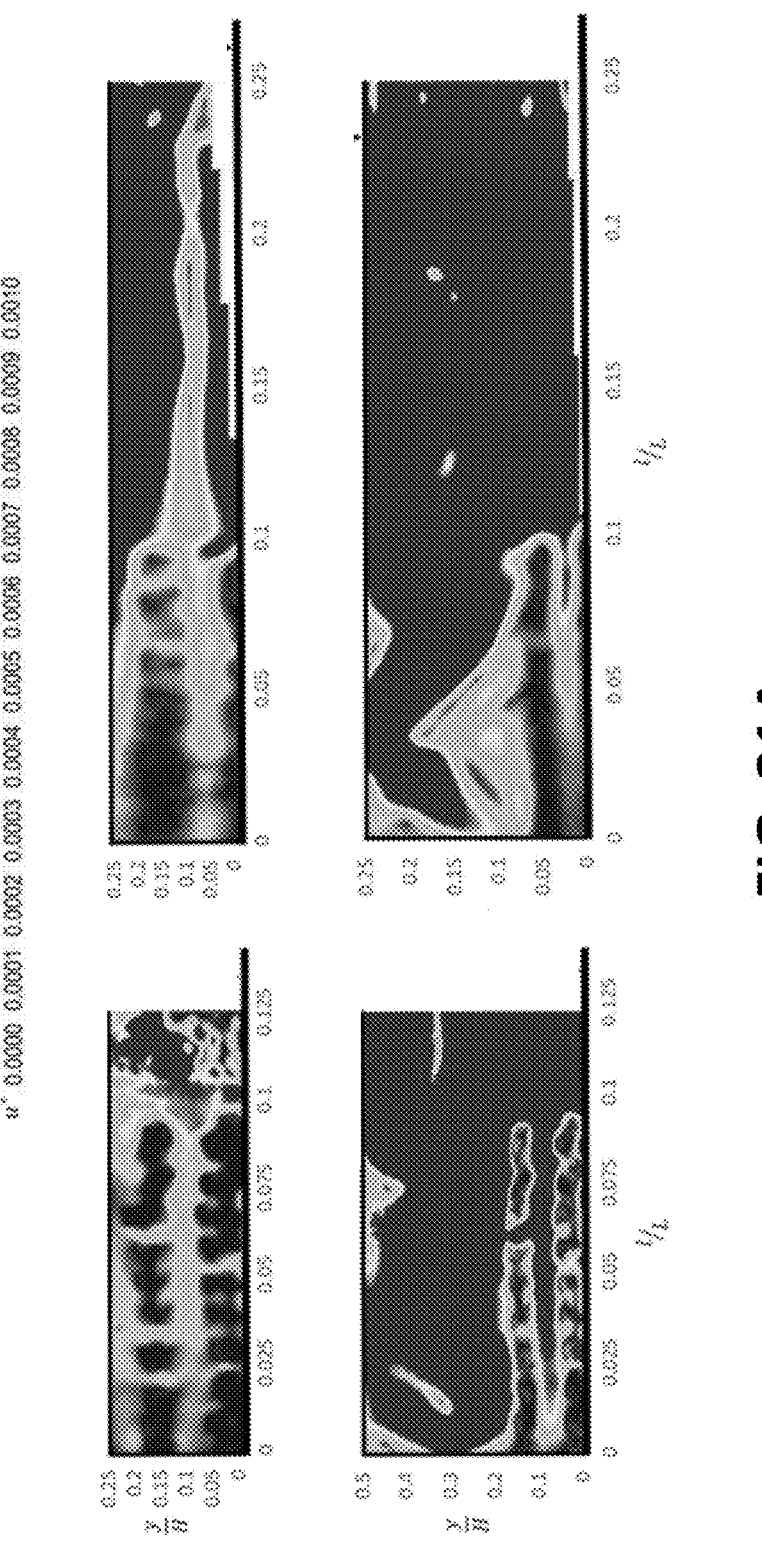
FIG. 21A is an example data set of non-dimensional velocity magnitude contour of various enclosure embodiments, each without a panel and without a baffle.

FIG. 21A is an example data set of non-dimensional velocity magnitude contour of various enclosure embodiments, each without a panel and without a baffle. With the panel and baffle added to the enclosure, a larger separation vortex may be formed near the panel. This clockwise vortex may recirculate the free stream water that is entering the enclosure and minimizes the mixing of free stream water with the enclosure water. The strong rotation of the separation vortex may cause a strong mixing with the stagnant flow inside, creating a large counterclockwise vortex is created near the baffle, which may then recirculate water within the enclosure. This large vortex may trap water within the enclosure and ensures mixing. These mixing regions created by the vortices would increase the heat transfer rate inside the enclosure. Further, an enclosure with a height half of the free stream water depth and longer in length along with the panel and baffle may be suitable for the refugia.

Figure 21B:
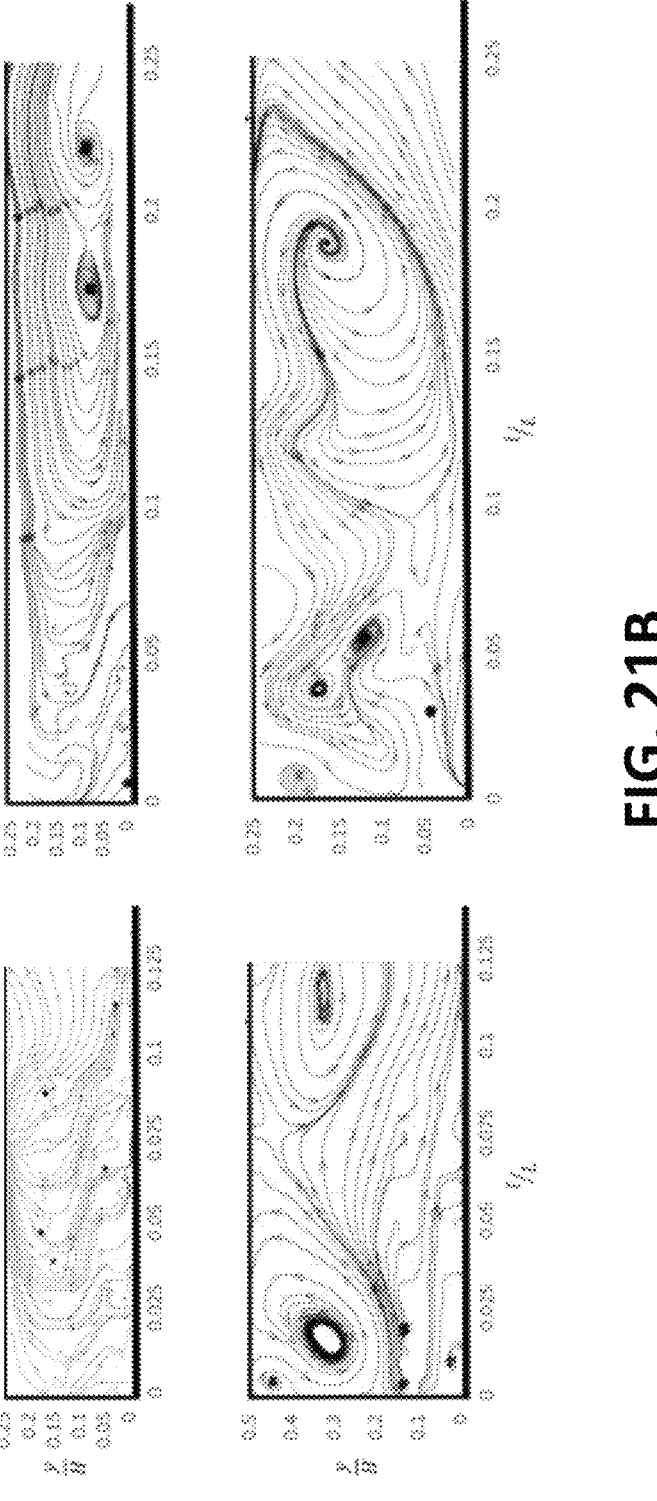
FIG. 21B is an example data set of streamlines of various enclosure embodiments, each without a panel and without a baffle.

FIG. 21B is an example data set of streamlines of various enclosure embodiments, each without a panel and without a baffle. FIG. 22A is an example data set of non-dimensional velocity magnitude contour of various enclosure embodiments, each with a panel and with a baffle. FIG. 22B is an example data set of streamlines of various enclosure embodiments, each with a panel and with a baffle.

FIGS. 21-22 present the non-dimensional velocity and streamlines, respectively, for: (a) enclosure #1, (b) enclosure #2, (c) enclosure #3, and (d) enclosure #4 with a heat exchanger 12 inside as shown in FIG. 20B (where (a)-(d)

refer to the four quadrant images of FIG. 21, and go from top left (a) to bottom left (b) to top right (c) to bottom right (d)). The flow near the heat exchanger 12 tubes may be low due to water interaction with the tubes (the blue regions, which correspond to the darker regions on the left), but there is flow in the vacant space in between the tube rows. Overall these images show that without a panel or a baffle, there is significant fluid motion in and out of the enclosure (the red regions, which correspond to the darker regions on the right and which extend into the middle of the figure). For enclosure #1 (FIG. 20A), velocity may be low, but that is likely because the heat exchanger 12 takes up the majority of the space inside the enclosure, and the high velocities near the downstream opening 52 indicate high mixing with the free stream. For enclosure #2 (FIG. 20B), an increase in enclosure height, which increases the enclosure downstream opening 52 size, may facilitate a higher velocity magnitude in the entire enclosure except for near the heat exchanger tubes. From FIG. 20C, the streamlines for this enclosure show two counterclockwise vortices due to flow entering the enclosure with high momentum. The way these vortices are rotating, it may introduce mixing inside the enclosure and pushes the water out of the enclosure, which allows water exchange with the free stream. Figures (c) show the effect of increasing enclosure length compared to enclosure #1. From FIG. 21A(c), the velocity magnitude is high in between the enclosure downstream opening 52 and almost stagnant near the heat exchanger 12, similar to and slightly less than enclosure #1. It also shows that there is water flow at a lower velocity between the heat exchanger 12 tube rows, and this low velocity flow stream is extended to the downstream opening 52. From FIG. 21B(c), the streamlines for this enclosure show that a counterclockwise vortex which was not present in enclosure #1. As such, an increase in enclosure length facilitates the formation of the vortex. The vortex interacts with slower moving water near the heat exchanger 12 and creates another counterclockwise vortex. These vortices intermix and push water out of the enclosure but not as significantly as with enclosure #2. FIGS. 21A and 21B (d) show the effect of increasing the enclosure compared to enclosure #3. An increase in enclosure height results in a higher velocity in almost the entire enclosure. However, a small region of lower velocity on top of the heat exchanger 12 and a reduced velocity in between the heat exchanger 12 tube rows is also observed. From FIG. 21B(d), the vortices created in the enclosure are larger compared to enclosure #3 due to the height increase. A large counterclockwise vortex closer to the downstream opening 52 pushes the water out of the enclosure at a high velocity, which results in water exchange with the free stream and likely more than with enclosure #3.

FIGS. 23A-23D are example data sets of the effect of extension size on average dimensionless temperature difference, on average temperature difference, on average heat transfer per dimensionless average temperature difference, and on average heat transfer per degree of average temperature difference, respectively.

FIGS. 22A-D shows the non-dimensional velocity magnitudes and streamlines, respectively, for the enclosure configuration of an enclosure with a heat exchanger 12, panel 50, and baffle 54 (FIG. 20D) for: (a) enclosure #3 and (b) enclosure #4. The baffle and the panel have a strong effect on the flow characteristics. For enclosure #3 (FIG. 21A(a)), the water flow downstream of the baffle is almost stagnant (blue color) since it restricts water movement within the enclosure. The streamlines (FIG. 22B(a)) show that the flow creates a strong clockwise vortex with tight, concentric streamlines near the panel. Interaction among the clockwise vortex, water in the enclosure, and the baffle creates a counterclockwise vortex near the baffle, which traps the water inside the enclosure but also ensures mixing within the enclosure. This counterclockwise vortex combined with the clockwise vortex minimizes water exchange with the free stream. FIG. 22A-B (d) show the effect of enclosure height increase in enclosure #4 compared to enclosure #3. With the increase in enclosure height, the region on top of the heat exchanger 12 and in between the panel 50 and baffle 54 shows a much higher non-dimensional velocity magnitude compared to enclosure #3. The fluid velocity is low near the heat exchanger 12 because of the effect of the baffle 54 and strong viscous flow resistance due to the heat exchanger 12 tubes. The streamlines (FIG. 22B(b)) show that with the increase of enclosure 10 height, a larger separation vortex is formed near the panel. This clockwise vortex recirculates the free stream water that is entering the enclosure and minimizes the mixing of free stream water with the enclosure water. The strong rotation of the separation vortex causes a strong mixing with the stagnant flow inside, creating a large counterclockwise vortex is created near the baffle, which recirculates water within the enclosure. This large vortex traps water within the enclosure 10 and ensures mixing. So, with the taller enclosure 10, even though the velocity magnitude is higher, the fluid is primarily recirculated within the enclosure 10 rather than flowing in and out of the enclosure 10. This is advantageous for maintaining the desired temperature within the enclosure 10.

Thus, with a panel and baffle, the enclosure 10 is better isolated from the freestream, but also there are multiple vortices within the enclosure 10 to help enable good heat transfer with the heat exchanger 12. Additionally, with the baffle 54 and panel 50, a taller enclosure 10 (e.g. half the stream height) can be used. The taller enclosure 10 allows for more volume to be enclosed, particularly near the heat exchanger 12, but still is successful at limited water exchange with the free stream.

FIGS. 23E-23H are example data sets of the effect of baffle location on average temperature difference, dimensionless average temperature difference, average heat transfer per average temperature difference, average heat transfer per dimensionless average temperature difference, standard deviation of temperature difference, and dimensionless standard deviation of temperature difference, respectively.

The refugia design parameters tested are the enclosure length ratio; baffle location; and panel and baffle size. The enclosure length ratio (re) is the ratio of enclosure length (Le) to the heat exchanger length (LHX). For all of experiments, the heat exchanger flow rate was set at 0.0505. Experimental parameters to analyze the enclosure length ratios are given in Table 10. Four enclosure length ratios are tested to analyze the effect on the enclosure cooling performance. All the enclosure length ratios are tested for no-panel/baffle, panel, and panel and baffle configuration. The panel and baffle size for these experiments were 18.24 cm×5.08 cm, and the baffle was attached at a distance 4.45 cm from the heat exchanger 12.

The effect of the baffle location on the enclosure cooling performance is analyzed by changing the baffle location during experiments. The baffle location (rb) is expressed as a ratio between the distance of the baffle from the enclosure downstream opening 52 to the distance of the heat exchanger 12 from the enclosure downstream opening 52. Experimental parameter to analyze the baffle are given in Table 11. All the baffle locations are tested using the panel-and-baffle configuration of the enclosure and for enclosure length ratios of 1.63, 1.96, and 2.13. The panel and baffle size for these experiments were 18.24 cm×5.08 cm.

TABLE 10

Experimental Parameters to Analyze the Enclosed Length Ratios

| Enclosure length ratio ($r_e$) | Panel and baffle size | Panel and baffle configuration |
|---|---|---|
| 1.63 | N/A | No baffle/panel |
|  | 18.24 cm × 5.08 cm | Panel |
|  |  | Baffle and panel |
| 1.79 | N/A | No baffle/panel |
|  | 18.24 cm × 5.08 cm | Panel |
|  |  | Baffle and panel |
| 1.96 | N/A | No baffle/panel |
|  | 18.24 cm × 5.08 cm | Panel |
|  |  | Baffle and panel |
| 2.13 | N/A | No baffle/panel |
|  | 18.24 cm × 5.08 cm | Panel |
|  |  | Baffle and panel |

TABLE 11

Experimental Parameter to Analyze the Baffle Location

| Baffle location ($r_b$) | Enclosure length ratio ($r_e$) | Panel and baffle size |
|---|---|---|
| 0.27-0.53 | 1.63 | 18.24 cm × 5.08 cm |
| 0.17-0.70 | 1.96 | 18.24 cm × 5.08 cm |
| 0.15-0.74 | 2.13 | 18.24 cm × 5.08 cm |

TABLE 12

Experiments Conducted to Analyze the
Effect of Panel and Baffle Size

| Test | Panel and baffle configuration | Panel and baffle size |
|---|---|---|
| Test Condition 1 | No panel/baffle | N/A |
| Test Condition 2 | Panel | Panel size: 18.24 cm × 5.08 cm |
| Test Condition 3 | Panel | Panel size: 18.42 cm × 3.31 cm |
| Test Condition 4 | Panel and baffle | Panel size: 18.24 cm × 5.08 cm |
|  |  | Baffle size: 18.42 cm × 5.08 cm |
| Test Condition 5 | Panel and baffle | Panel size: 18.42 cm × 3.31 cm |
|  |  | Baffle size: 18.42 cm × 3.31 cm |
| Test Condition 6 | Panel and baffle | Panel size: 18.24 cm × 5.08 cm |
|  |  | Baffle size: 18.42 cm × 3.31 cm |
| Test Condition 7 | Panel and baffle | Panel size: 18.24 cm × 3.31 cm |
|  |  | Baffle size: 18.42 cm × 5.08 cm |

Figure 23A:
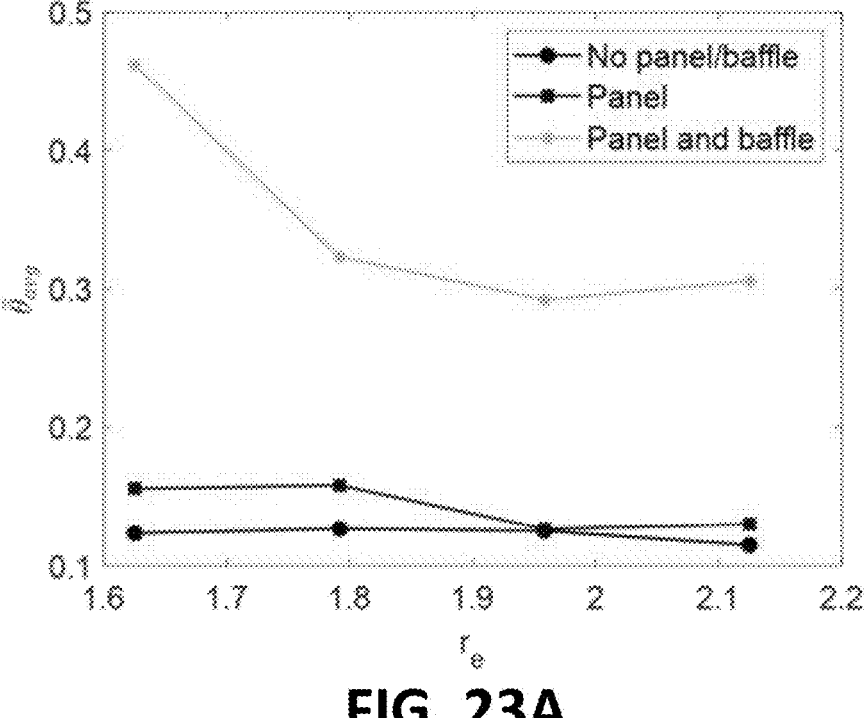
FIGS. 23A-23D are example data sets of the effect of extension size on average dimensionless temperature difference, on average temperature difference, on average heat transfer per dimensionless average temperature difference, and on average heat transfer per degree of average temperature difference, respectively.
Figure 23B:
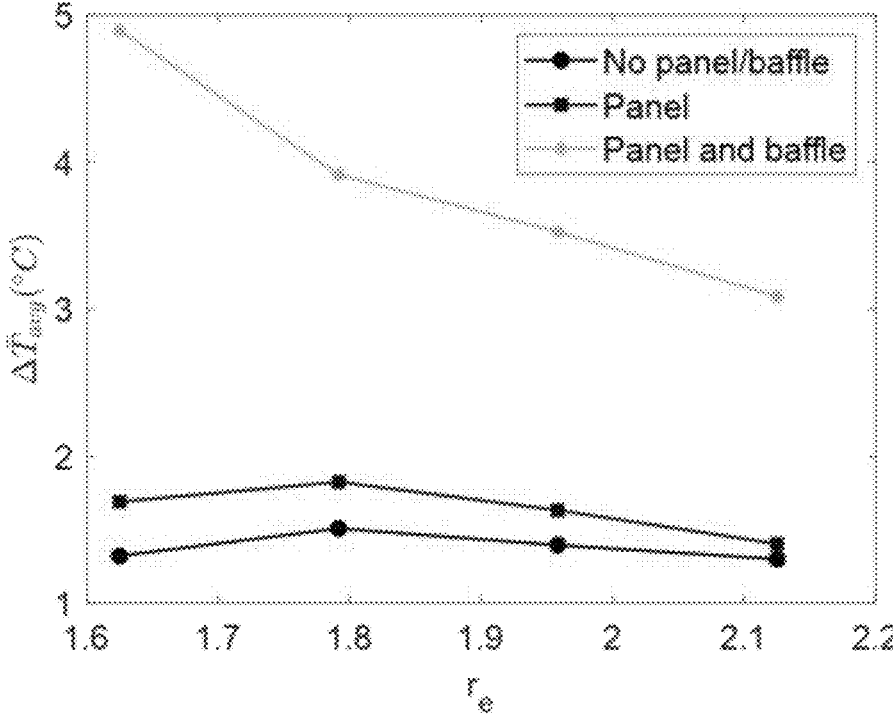
Figures 23C, 23D:
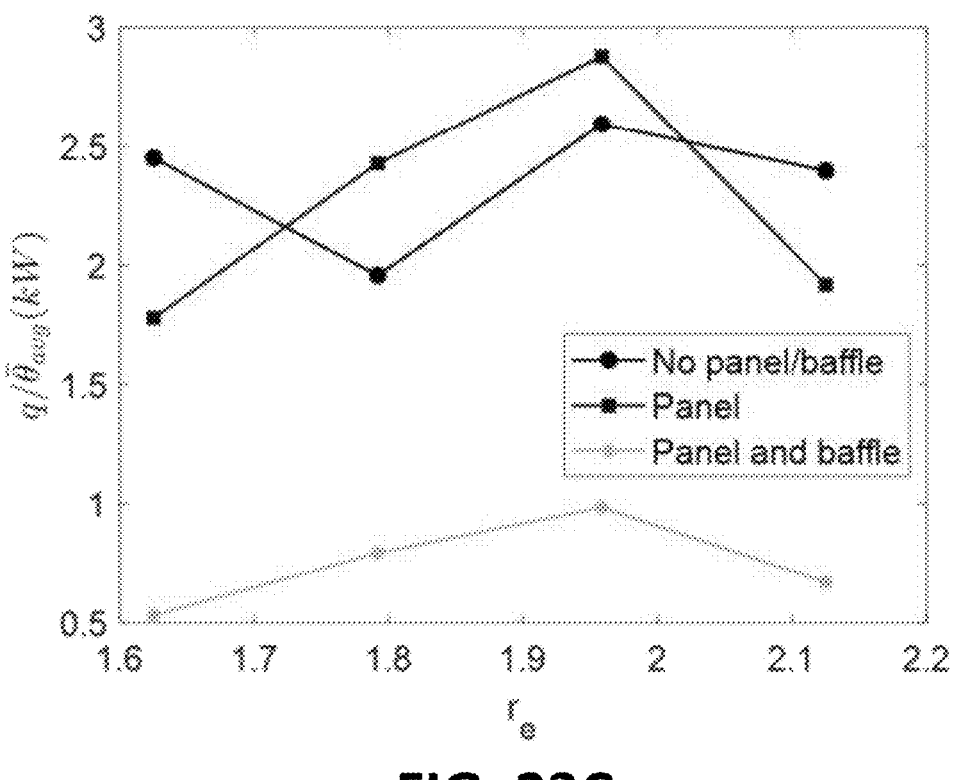
Figure 23E:
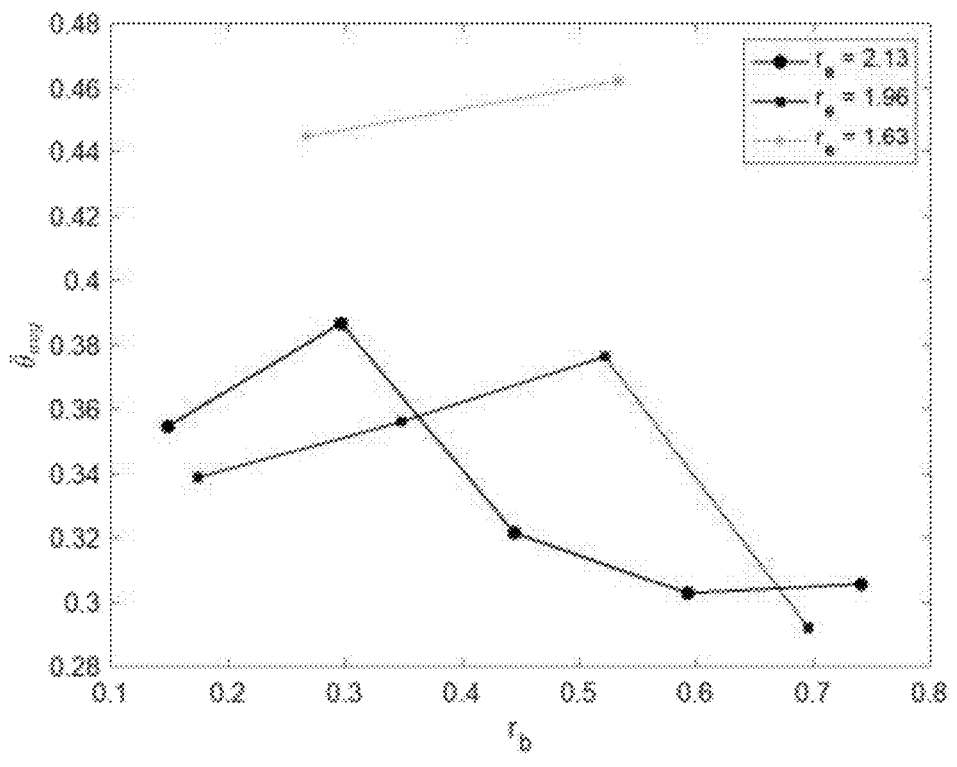
FIGS. 23E-23H are example data sets of the effect of baffle location on average temperature difference, dimensionless average temperature difference, average heat transfer per average temperature difference, average heat transfer per dimensionless average temperature difference, standard deviation of temperature difference, and dimensionless standard deviation of temperature difference, respectively.
Figure 23F:
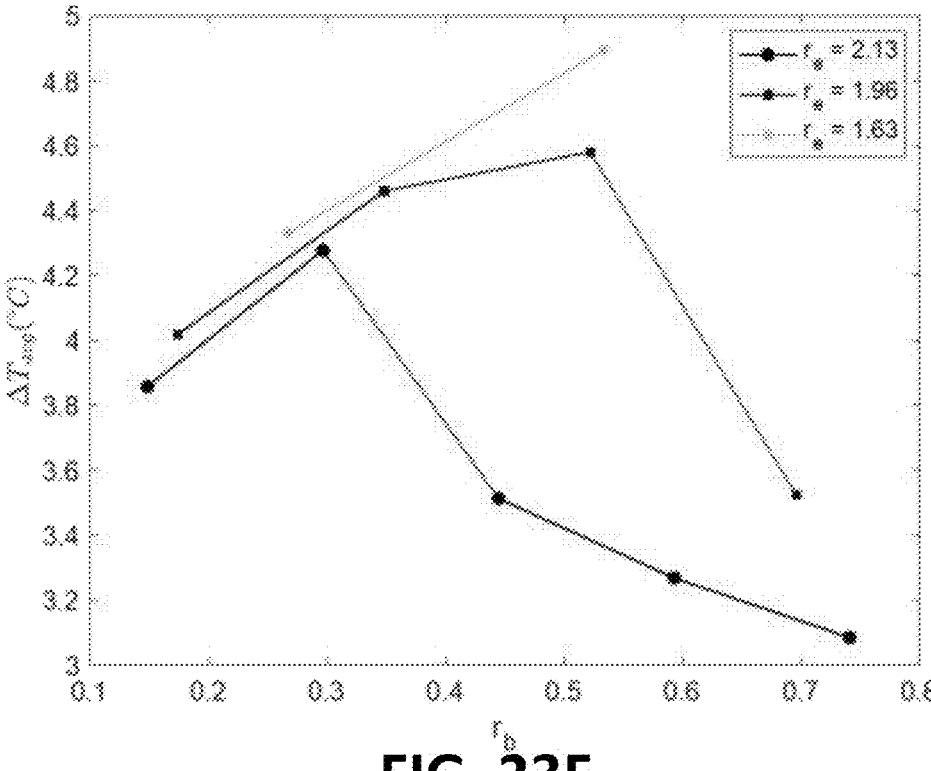
Figure 23G:
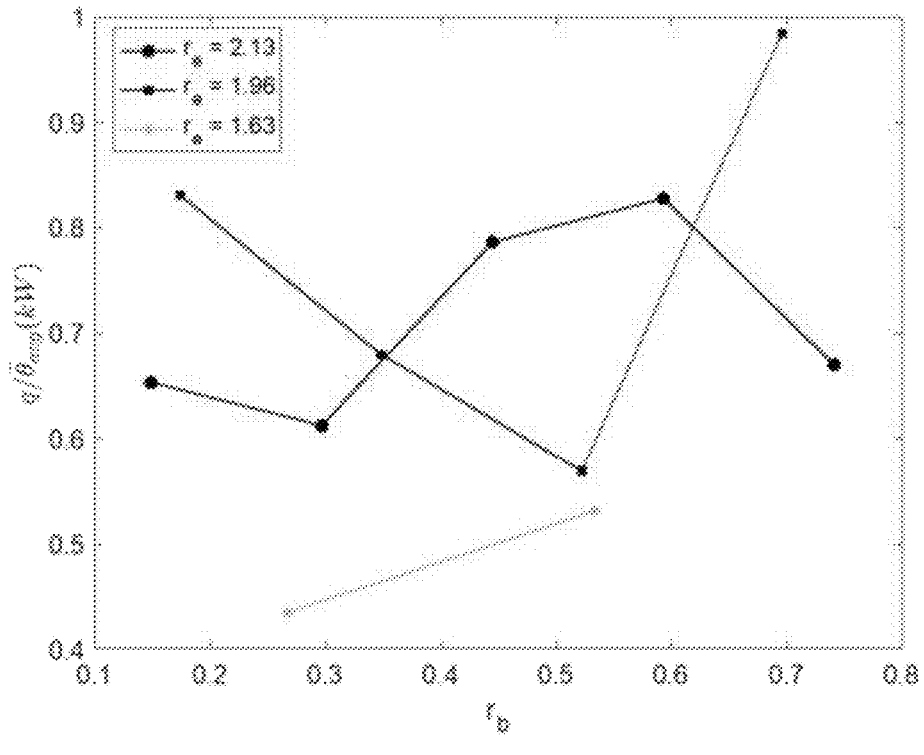
Figure 23H:
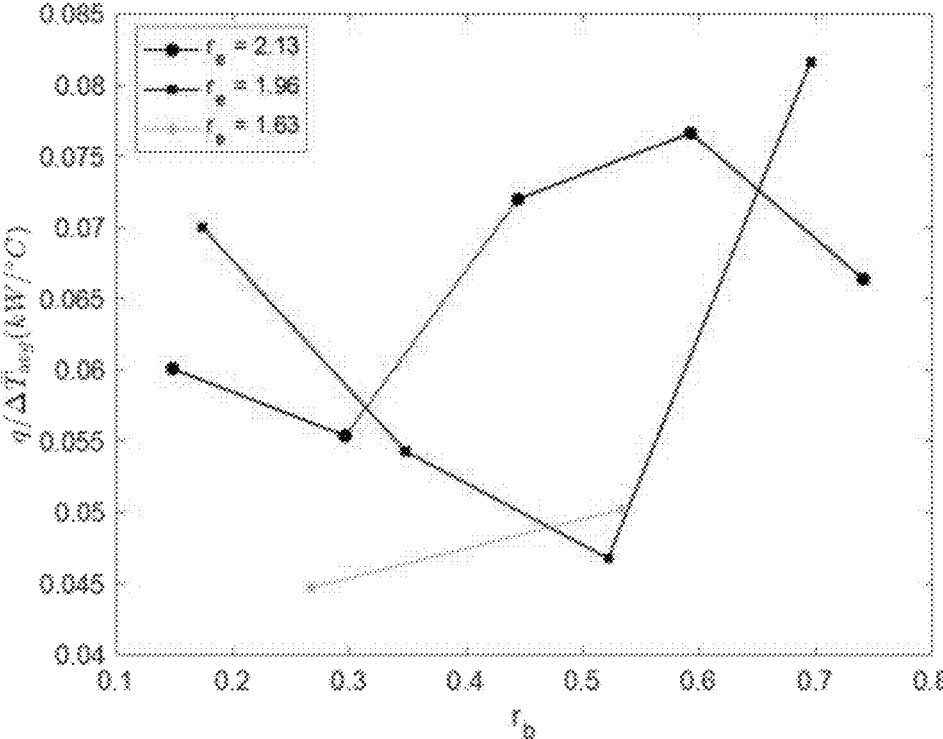

FIGS. 23A-B show the effect of enclosure length on the dimensionless degree of cooling and the degree of cooling, and FIGS. 23 C-D shows the effect on the heat transfer per degree of cooling.

For enclosure configuration with no-panel/baffle, for a given enclosure length ratio (re), the dimensionless temperature difference is small (FIG. 23A) compared to the enclosure configuration with panel and baffle. Reason for such a small temperature difference is that the no-panel/baffle configuration allows significant water exchange with the free stream. With the increase in re, the temperature difference remains largely unaffected. As such, re has no significant effect on temperature difference for this configuration. The reason may be that the degree of cooling achieved for this enclosure configuration is low enough that the effect of change in re on the degree of cooling becomes smaller. The heat transfer per degree of cooling has variation when there is no panel or baffle and thus no definitive trend is observed with respect to extension length. For enclosure configuration with panel, the degree of cooling is slightly higher than the configuration with no-panel/baffle but significantly lower than with the panel and baffle. With this configuration, there is a slight decrease in the degree of cooling as the enclosure is made longer. Likely this is due to a larger volume being enclosed by the enclosure and thus there is a larger volume of water to cool which results in a lower average temperature inside the enclosure. As the enclosure is made longer, the heat transfer per degree of cooling initially increases which is likely need because more water is being cooled. However, at ratios greater than 2, it decreases.

This decrease may be due to the longer enclosure being better at isolating the water near the heat exchanger 12 from the free stream. For the configuration with panel-and-baffle, the degree of cooling is significantly higher while the heat transfer per degree of cooling is significantly lower than the other configurations. An increase in enclosure length ratio reduces the degree of cooling. However, as seen with the panel-only configuration, the heat transfer per degree of cooling increases with enclosure length ratio until the ratio exceeds 1.96, then it decreases.

FIGS. 23 E-H show the effect of the baffle location (Table 9 experimental conditions) on the degree of cooling and heat transfer per degree of cooling, respectively. For the enclosure with length ratio of 1.63, changing baffle location (rb) from 0.27 to 0.53, the degree of cooling increases slightly. Such small increase is possibly due to the baffle 54 being closer to the heat exchanger 12. When baffle 54 is closer to the heat exchanger 12, it introduces higher mixing in the heat exchanger region, which increases heat transfer rates. However, the volume increase between the baffle 54 and panel 50 increases free stream mixing with the enclosure water. Due to the competing effect of increased heat transfer rates and increased free stream mixing, the change in degree of cooling is small. For the enclosure with length ratio of 1.96, the dimensionless degree of cooling initially increases but for a baffle 54 location beyond 0.52, it decreases. A similar effect is seen for the enclosure with a length ratio of 2.13, but the inflection point occurs at a smaller ratio (0.3). The inflection point in the degree of cooling curve also corresponds to an inflect point in the heat transfer per degree of cooling (FIG. 23G-23H). As the degree of cooling initially increases, the heat transfer per degree of cooling decreases. However at the inflection point, the heat transfer per degree of cooling starts to increase. Each enclosure length ratio has an optimal baffle 54 location where the temperature difference is maximum. For the 1.63, 1.96, and 2.13 enclosure length ratio, the optimal baffle locations are 0.53, 0.52, and 0.30, respectively. As the enclosure length ratio increases, the optimal baffle location shifts to a lower value.

Figure 24A:
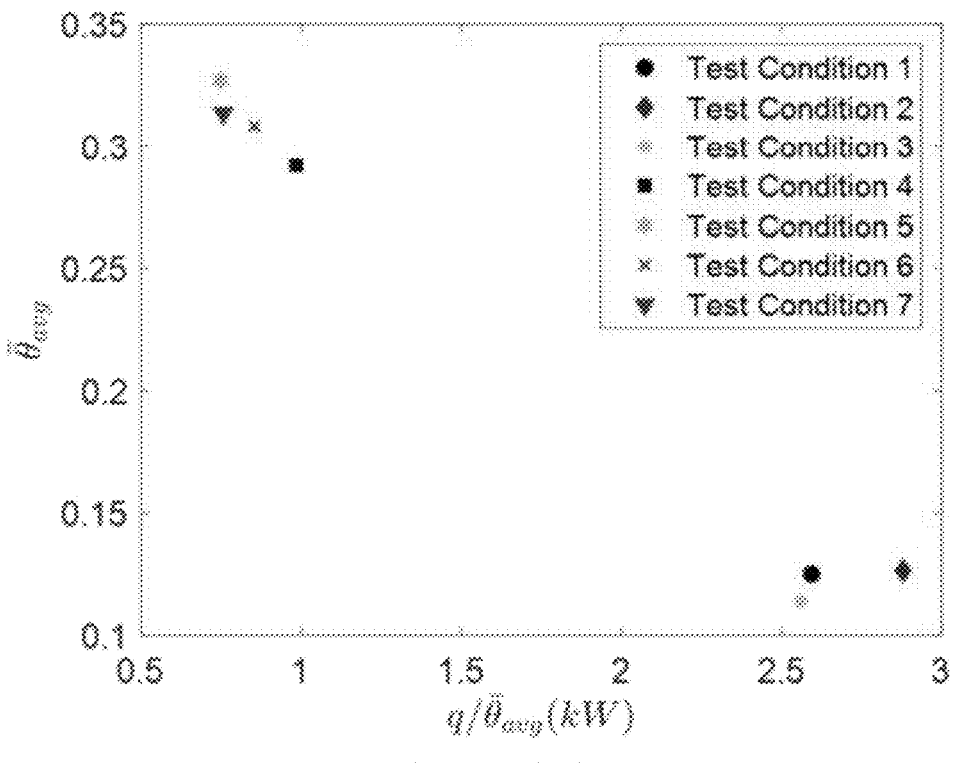
FIGS. 24A and 24B are example data sets of the effect of various test conditions on average dimensionless temperature difference vs. average heat transfer per dimensionless average temperature difference, and on average temperature difference vs. average heat transfer per average temperature difference, respectively.
Figure 24B:
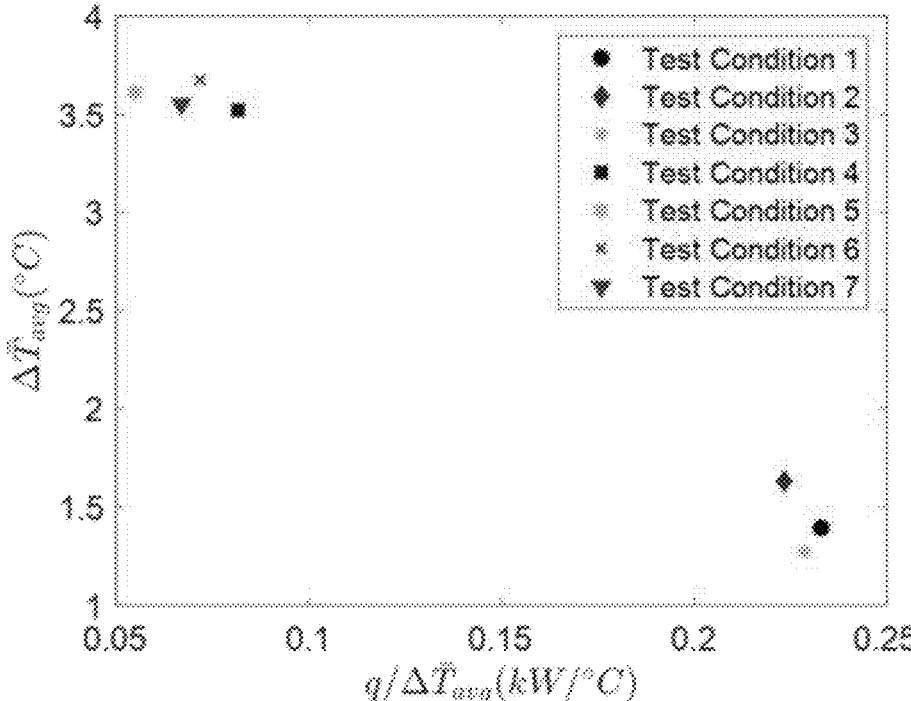

FIGS. 24A and 24B are example data sets of the effect of various test conditions on average dimensionless temperature difference vs. average heat transfer per dimensionless average temperature difference, and on average temperature difference vs. average heat transfer per average temperature difference, respectively.

Additionally, each enclosure length ratio has an optimal baffle location where heat transfer per degree of cooling is the lowest, and beyond which heat transfer requirement increases. This indicates that these baffle locations are able to minimize the exchange of the enclosure water with the warmer free stream and increase heat transfer by introducing mixing.

FIGS. 24A-B compares the degree of cooling with the heat transfer per degree of cooling for the test conditions listed in Table 10. The effect of the enclosure configuration is clearly observed. For each condition with both the panel-and-baffle (test condition 4-7), the degree of cooling is greater than other configurations (test condition 1-3), and significantly less heat transfer is required to achieve that temperature difference. The higher degree of cooling achieved for these configurations is possibly due to limited water exchange between the enclosure and the free stream for the configurations with both the panel-and-baffle. Adding the panel or changing the panel size (test condition 2 and 3) does not make a substantial difference in dimensionless degree of cooling and heat transfer required per degree of cooling compared to the no-panel/baffle configuration (test condition 1). The size of the panel or baffle (Test 4-7) can make a small difference on the degree of cooling or heat transfer per degree of cooling but not as significant as including the baffle.

In one embodiment, the system may include a combination of a heat exchanger 12 and an enclosure 10 placed in the stream; and an optional water tank (optional reservoir 14), a chiller (thermal apparatus 22), and a pump (at least one pump P1) to transport and collect the cooling water to and from the heat exchanger 12. A triple-pass heat exchanger may be included. The overall dimensions of the heat exchanger may be about 15.24 cm×15.24 cm×6.99 cm. To cool the water, the chiller may be used. The cooling water may be pumped through a closed loop using an inline pump. Water may be collected from the heat exchanger exit and sent to the chiller via a storage tank. The cooling water flow rate may be adjusted using a valve on the inlet tube to the heat exchanger and the flow rate may be measured using a turbine flow meter. The enclosure 10, the panel 50, and the baffle 54 are schematically shown in FIG. 20E.

Methods

The methods disclosed herein may use or refer to the same elements as discussed herein with respect to the systems.

Figure 25:
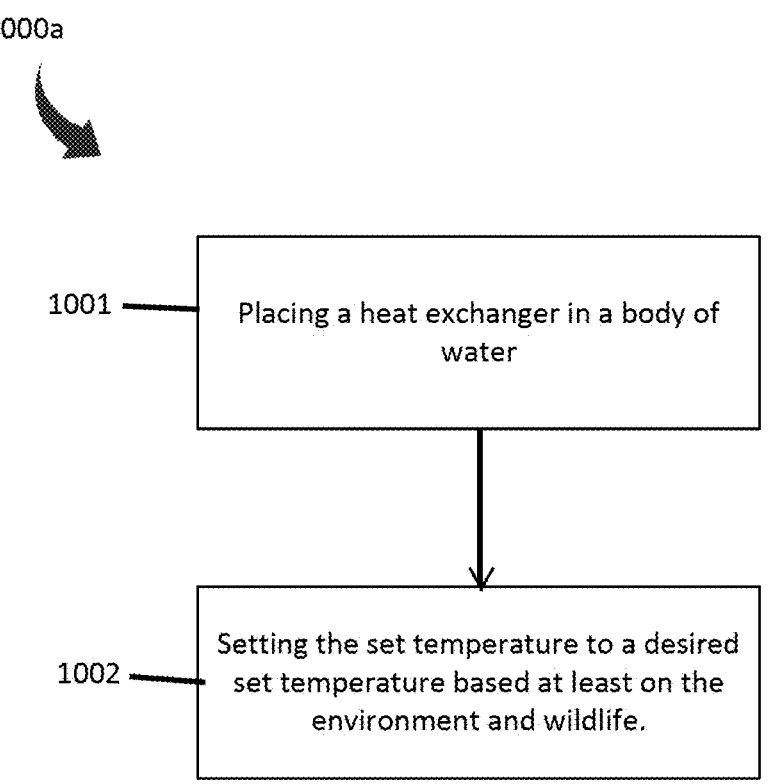
FIG. 25 is an example method using the systems of FIGS. 1-24.

As shown in FIG. 25, a method 1000a of locally maintaining a temperature of at least one local volume of water of a body of water. The method 1000a may include placing the heat exchanger 12 of the system of claims 1-12 in the body of water 1101. The method 1000a may further include setting the set temperature to a desired set temperature based at least on the environment and wildlife 1002.

As shown in FIGS. 26A-B, a method 1000b may include partially isolating at least one local volume of water from a body of water 1003. The method 1000b may further include transferring heat into or out of the at least one local volume of water via a fluid passing through a heat exchanger 12 that is in thermal communication with the at least one local volume of water 10004. The method 1000b may further include moving the heat into or out of the fluid via a thermal apparatus 22, wherein the thermal apparatus 22 is located away from the body of water 10005. The method 1000b may further include automatically maintaining a local temperature in the at least one local volume of water sustainable for wildlife living in the body of water, wherein the local temperature comprises a set temperature that is set by a user 10006.

The method 1000b may further optionally include (designated with dashed lines) wherein partially isolating at least one local volume of water further comprises partially surrounding the heat exchanger to create an enclosure 10 which extends from an upstream region to a downstream region and defines a downstream opening, wherein the downstream opening allows wildlife to enter the enclosure 1007.

The method 1000b may further optionally include wherein creating an enclosure 10 further includes coupling an extension 20 to the downstream region of the enclosure 10, wherein the extension 20 extends from the downstream region to an extended downstream region and defines an extended downstream opening 1008.

The method 1000b may further optionally include coupling a panel 50 to the extended downstream opening 1009.

The method 1000b may further optionally include coupling a baffle 54 to the extension 1010.

The method 1000b may further optionally include pumping the fluid between the heat exchanger 12 and the thermal apparatus 22 using a first at least one pump P1 (noted as reference 1011). The method 1000b may further optionally include pumping the fluid between the optional reservoir 14 and the thermal apparatus 22 using the optional second pump P2, 1012. The method 1000b may further optionally include sensing an immediate temperature of the at least one local volume of water 1013. The method 1000b may further optionally include determining a flow rate through the heat exchanger 1014. The method 1000b may further optionally include comparing the immediate temperature of the at least one local volume of water to the set temperature and adjusting the pumping of the fluid to change the immediate temperature to match the set temperature 1015.

The method 1000b may further optionally include wherein adjusting the pumping of the fluid to change the immediate temperature of the at least one local volume of water to match the set temperature further comprises controlling the pumps using a controller and powering the pumps using a power source 1016.

The method 1000b may further optionally include charging at least one battery 32a-d using the power source 1017. The power source 36a-d is operable to charge the at least one battery in addition to powering the controller and the thermal apparatus, and wherein the at least one battery is operable to supplement the power source.

Any element as discussed herein, or at least any part of the enclosure 10 and thermal refugia can be delineated as a device, with the structures and functions as described herein.

EXAMPLE EMBODIMENTS

Example Ex1. A system to provide at least one thermal refugium in a body of water comprising:
  at least one enclosure configured to partially isolate at least one local volume of water from the body of water;
  at least one heat exchanger within the at least one enclosure to transfer heat into or out of the at least one local volume of water;
  a thermal apparatus operably coupled to the at least one heat exchanger and configured to transfer the heat in and out of a fluid, the fluid being circulated between the thermal apparatus and the at least one heat exchanger; and
  a controller operably coupled to the thermal apparatus, wherein the controller is configured to control the transfer of the heat into or out of the at least one local volume of water to maintain a local temperature in the at least one local volume of water sustainable for wildlife living in the body of water.

Example Ex2. The system of Example Ex1, wherein the local temperature comprises a set temperature that is set by a user.

Example Ex3. The system of any of Examples Ex1-Ex2, wherein the at least one heat exchanger comprises at least one single-pass tube.

Example Ex4. The system of any of Examples Ex1-Ex3, wherein the at least one single-pass tube comprises two or more single-pass tubes, and wherein the two or more single-pass tubes are configured in a staggered construction and comprise a pitch that facilitates movement of wildlife between the tubes.

Example Ex5. The system of any of Examples Ex1-Ex4, wherein the at least one enclosure further extends from an upstream region to a downstream region and defines a downstream opening, wherein the upstream region comprises an upstream sidewall extending across an upstream opening of the at least one enclosure, and wherein the downstream opening allows wildlife to enter the enclosure.

Example Ex6. The system of any of Examples Ex1-Ex5, further comprising:

an extension operably connected to the downstream region of the at least one enclosure, wherein the extension extends from the downstream region to an extended downstream region and defines an extended downstream opening, and wherein the extended downstream opening allows wildlife to enter the enclosure;

a panel operably connected to the extended downstream opening and configured to restrict flow into and out of the at least one enclosure; and at least one baffle operably connected to the extension and forming a tortuous fluid flow pathway in the extension.

Example Ex7. The system of any of Examples Ex1-Ex6, wherein the panel extends from a wall of the extended downstream opening towards another wall of the extended downstream opening, and wherein the at least one baffle comprises a first baffle extending from a first interior sidewall.

Example Ex8. The system of any of Examples Ex1-Ex7, wherein the at least one baffle further comprises a second baffle extending from a second interior sidewall that opposes the first interior sidewall, and wherein the first baffle is located more proximal to the extended downstream opening than the second baffle.

Example Ex9. The system of any of Examples Ex1-Ex8, further comprising:

at least one pump operably coupled to the heat exchanger and configured to pump the fluid into and out of the heat exchanger;

a feedback sensor operably coupled to the at least one enclosure and configured to sense an immediate temperature of the at least one local volume of water; and a mass flow meter operably coupled to the heat exchanger and configured to determine flow rate through the heat exchanger, wherein the controller is configured to compare the immediate temperature of the at least one local volume of water to the set temperature and adjust at least one of the at least one pump and the thermal apparatus to change the immediate temperature to match the set temperature.

Example Ex10. The system of any of Examples Ex1-Ex9, further comprising a plumbing system to operably couple the heat exchanger and the thermal apparatus.

Example Ex11. The system of any of Examples Ex1-Ex10, wherein the first pump is an in-line pump.

Example Ex12. The system of any of Examples Ex1-Ex11, wherein the fluid comprises water.

Example Ex13. The system of any of Examples Ex1-Ex12, wherein the thermal apparatus comprises an electrically driven chiller.

Example Ex14. The system of any of Examples Ex1-Ex13, wherein the thermal apparatus comprises an electrically driven heater.

Example Ex15. The system of any of Examples Ex1-Ex14, further comprising:

a power source coupled to the controller and the thermal apparatus; and at least one battery operably coupled to the power source, wherein the power source is operable to charge the at least one battery in addition to powering the controller and the thermal apparatus, and wherein the at least one battery is operable to supplement the power source.

Example Ex16. The system of any of Examples Ex1-Ex15, wherein the thermal apparatus further comprises a water heater and a water cooler.

Example Ex17. The system of any of Examples Ex1-Ex18, wherein the body of water comprises a naturally occurring river or stream.

Example Ex18. A method of maintaining a temperature of at least one local volume of water of a body of water comprising:

placing the heat exchanger of the system of any of Examples Ex1-Ex17 in the body of water; and setting the set temperature to a desired set temperature based at least on the environment and wildlife.

Example Ex19. A system to provide a thermal refugium in a body of water comprising:

at least one enclosure configured to provide at least one local volume of water from the body of water;

a heat exchanger within the at least one enclosure to perform at least one of cooling and heating the at least one local volume of water of the body of water;

a thermal apparatus operably coupled to the heat exchanger;

a fluid disposed within at least one of the heat exchanger and the thermal apparatus;

a controller operably coupled to the thermal apparatus, wherein the controller is configured to automatically maintain a local temperature of the at least one local volume of water, and wherein the local temperature comprises a set temperature that is set by a user; and a power source operably coupled to the controller.

Example Ex20. A method of maintaining a temperature of at least one local volume of water of a body of water comprising:

placing the heat exchanger of the system of claim 19 in the body of water; and setting the set temperature to a desired set temperature based at least on the environment and wildlife.

Example Ex21. A method, comprising:

partially isolating at least one local volume of water from a body of water;

transferring heat into or out of the at least one local volume of water via a fluid passing through a heat exchanger that is in thermal communication with the at least one local volume of water;

moving the heat into or out of the fluid via a thermal apparatus, wherein the thermal apparatus are located away from the body of water; and automatically maintaining a local temperature in the at least one local volume of water sustainable for wildlife living in the body of water, wherein the local temperature comprises a set temperature that is set by a user.

Example Ex22. The method of Example Ex21, wherein partially isolating at least one local volume of water further comprises partially surrounding the heat exchanger to create an enclosure which extends from an upstream region to a downstream region and defines a downstream opening, wherein the downstream opening allows wildlife to enter the enclosure.

Example Ex23. The method of any of Examples Ex21-Ex22, wherein creating an enclosure further comprises:

coupling an extension to the downstream region of the enclosure, wherein the extension extends from the downstream region to an extended downstream region and defines an extended downstream opening;

coupling a panel to the extended downstream opening; and coupling a baffle to the extension.

Example Ex24. The method of any of Examples Ex21-Ex23, wherein partially isolating a local volume of water further comprises allowing wildlife to enter the enclosure via the extended downstream opening.

Example Ex25. The method of any of Examples Ex21-Ex24, wherein partially isolating a local volume of water facilitates movement of wildlife between adjacent tubes of the heat exchanger.

Example Ex26. The method of any of Examples Ex21-Ex25, further comprising:

pumping the fluid between the heat exchanger and the thermal apparatus using at least one pump;

sensing an immediate temperature of the at least one local volume of water;

determining a flow rate through the heat exchanger; and comparing the immediate temperature of the at least one local volume of water to the set temperature and adjusting the pumping of the fluid to change the immediate temperature to match the set temperature.

Example Ex27. The method of any of Examples Ex21-Ex26, wherein adjusting the pumping of the fluid to change the immediate temperature of the at least one local volume of water to match the set temperature further comprises controlling the at least one pump using a controller and powering the at least one pump using a power source.

Example Ex28. The method of any of Examples Ex21-Ex27, further comprising:

charging at least one battery using the power source, wherein the power source is operable to charge the at least one battery in addition to powering the controller and the thermal apparatus, and wherein the at least one battery is operable to supplement the power source.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the diagrams and algorithms illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality.

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of" and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

The foregoing description has been presented for the purposes of illustration and description. It is not intended to be exhaustive or to limit the embodiments to the precise form disclosed. Many modifications and variations are possible in light of the above teachings. Any or all features of the disclosed embodiments can be applied individually or in any combination and are not meant to be limiting, but purely illustrative. It is intended that the scope of the invention be limited not with this detailed description, but rather, determined by the claims appended hereto.

The invention claimed is:

1. A system to provide at least one thermal refugium in a body of water comprising:

at least one enclosure configured to partially isolate at least one local volume of water from the body of water, wherein the enclosure defines an opening configured to allow wildlife to freely enter the enclosure from the body of water and freely exit the enclosure to the body of water, wherein the opening is configured to allow wildlife to swim between the enclosure and the body of water;

at least one heat exchanger within the at least one enclosure to transfer heat into or out of the at least one local volume of water;

a thermal apparatus operably coupled to the at least one heat exchanger and configured to transfer the heat in and out of a fluid, the fluid being circulated between the thermal apparatus and the at least one heat exchanger; and a controller operably coupled to the thermal apparatus, wherein the controller is configured to control the transfer of the heat into or out of the at least one local volume of water to maintain a local temperature in the at least one local volume of water sustainable for the wildlife living in the body of water.

2. The system of claim 1, wherein the local temperature comprises a set temperature that is set by a user.

3. The system of claim 2, further comprising:

at least one pump operably coupled to the heat exchanger and configured to pump the fluid into or out of the heat exchanger;

a feedback sensor operably coupled to the at least one enclosure and configured to sense an immediate temperature of the at least one local volume of water; and a mass flow meter operably coupled to the heat exchanger and configured to determine flow rate through the heat exchanger, wherein the controller is configured to compare the immediate temperature of the at least one local volume of water to the set temperature and adjust at least one of the at least one pump and the thermal apparatus to change the immediate temperature to match the set temperature.

4. The system of claim 3, further comprising a plumbing system to operably couple the heat exchanger and the thermal apparatus.

5. The system of claim 1, wherein the at least one heat exchanger comprises at least one single-pass or multi-pass tube.

6. The system of claim 5, wherein the at least one single-pass or multi-pass tube comprises two or more single-pass or multi-pass tubes, and wherein the two or more single-pass or multi-pass tubes are configured in either of an aligned construction or a staggered construction, wherein each of the aligned construction and the staggered construction comprise a pitch that facilitates movement of the wildlife between the tubes.

7. The system of claim 1, further comprising:

a power source coupled to the controller and the thermal apparatus; and at least one battery operably coupled to the power source, wherein the power source is operable to charge the at least one battery in addition to powering the controller and the thermal apparatus, and wherein the at least one battery is operable to supplement the power source.

8. A method of maintaining a temperature of at least one local volume of water of a body of water comprising:

placing the heat exchanger of the system of claim 1 in the body of water; and setting the set temperature to a desired set temperature based at least on the environment and the wildlife.

9. The system of claim 1, further comprising:

an extension operably connected to a downstream region of the at least one enclosure, wherein the extension extends from the downstream region to an extended downstream region and defines an extended downstream opening, the opening configured to allow wildlife to enter and exit the enclosure comprising the extended downstream opening, and wherein the extended downstream opening allows the wildlife to enter the enclosure;

a panel operably connected to the extended downstream opening and configured to restrict flow into and out of the at least one enclosure; and at least one baffle operably connected to the extension and forming a tortuous fluid flow pathway in the extension.

10. The system of claim 9, wherein the panel extends from a wall of the extended downstream opening towards another wall of the extended downstream opening, and wherein the at least one baffle comprises a first baffle extending from a first interior sidewall.

11. The system of claim 10, wherein the at least one baffle further comprises a second baffle extending from a second interior sidewall that opposes the first interior sidewall, and wherein the first baffle is located more proximal to the extended downstream opening than the second baffle.

12. A system to provide at least one thermal refugium in a body of water comprising:

at least one enclosure configured to partially isolate at least one local volume of water from the body of water, wherein the enclosure defines an opening configured to allow wildlife to enter and exit the enclosure, wherein the at least one enclosure further extends from an upstream region to a downstream region and defines a downstream opening, the opening configured to allow wildlife to enter and exit the enclosure comprising the downstream opening, wherein the upstream region comprises an upstream sidewall extending across an upstream opening of the at least one enclosure, and wherein the downstream opening allows the wildlife to enter the enclosure;

at least one heat exchanger within the at least one enclosure to transfer heat into or out of the at least one local volume of water;

a thermal apparatus operably coupled to the at least one heat exchanger and configured to transfer the heat in and out of a fluid, the fluid being circulated between the thermal apparatus and the at least one heat exchanger; and a controller operably coupled to the thermal apparatus, wherein the controller is configured to control the transfer of the heat into or out of the at least one local volume of water to maintain a local temperature in the at least one local volume of water sustainable for the wildlife living in the body of water.

13. The system of claim 12, further comprising:

an extension operably connected to the downstream region of the at least one enclosure, wherein the extension extends from the downstream region to an extended downstream region and defines an extended downstream opening, the opening configured to allow wildlife to enter and exit the enclosure comprising the extended downstream opening, and wherein the extended downstream opening allows the wildlife to enter the enclosure;

a panel operably connected to the extended downstream opening and configured to restrict flow into and out of the at least one enclosure; and at least one baffle operably connected to the extension and forming a tortuous fluid flow pathway in the extension.

14. The system of claim 13, wherein the panel extends from a wall of the extended downstream opening towards another wall of the extended downstream opening, and wherein the at least one baffle comprises a first baffle extending from a first interior sidewall.

15. The system of claim 14, wherein the at least one baffle further comprises a second baffle extending from a second interior sidewall that opposes the first interior sidewall, and wherein the first baffle is located more proximal to the extended downstream opening than the second baffle.

16. The system of claim 12, further comprising:

at least one pump operably coupled to the heat exchanger and configured to pump the fluid into or out of the heat exchanger;

a feedback sensor operably coupled to the at least one enclosure and configured to sense an immediate temperature of the at least one local volume of water; and a mass flow meter operably coupled to the heat exchanger and configured to determine flow rate through the heat exchanger, wherein the local temperature comprises a set temperature that is set by a user and the controller is configured to compare the immediate temperature of the at least one local volume of water to the set temperature and adjust at least one of the at least one pump and the thermal apparatus to change the immediate temperature to match the set temperature.

17. A system to provide a thermal refugium in a body of water comprising:

at least one enclosure configured to provide at least one local volume of water from the body of water, wherein the body of water comprises a naturally occurring river or stream, wherein the enclosure defines an opening configured to allow wildlife to freely enter the enclosure from the body of water and freely exit the enclosure to the body of water;

a heat exchanger within the at least one enclosure to perform at least one of cooling and heating the at least one local volume of water of the body of water;

a thermal apparatus operably coupled to the heat exchanger;

a fluid disposed within at least one of the heat exchanger and the thermal apparatus;

a controller operably coupled to the thermal apparatus, wherein the controller is configured to automatically maintain a local temperature of the at least one local volume of water, and wherein the local temperature comprises a set temperature that is set by a user; and a power source operably coupled to the controller.

18. A method of maintaining a temperature of at least one local volume of water of a body of water comprising:

placing the heat exchanger of the system of claim 13 in the body of water; and setting the set temperature to a desired set temperature based at least on the environment and wildlife.

19. A system to provide a thermal refugium in a body of water comprising:

at least one enclosure configured to provide at least one local volume of water from the body of water, wherein the enclosure defines an opening configured to allow wildlife to freely enter the enclosure from the body of water and freely exit the enclosure to the body of water, wherein the opening is configured to allow wildlife to swim between the enclosure and the body of water;

a heat exchanger within the at least one enclosure to perform at least one of cooling and heating the at least one local volume of water of the body of water;

a thermal apparatus operably coupled to the heat exchanger;

a fluid disposed within at least one of the heat exchanger and the thermal apparatus;

a controller operably coupled to the thermal apparatus, wherein the controller is configured to automatically maintain a local temperature of the at least one local volume of water, and wherein the local temperature comprises a set temperature that is set by a user; and a power source operably coupled to the controller.

20. A system to provide at least one thermal refugium in a body of water comprising:

at least one enclosure configured to partially isolate at least one local volume of water from the body of water, wherein the enclosure defines an opening configured to allow wildlife to freely enter the enclosure from the body of water and freely exit the enclosure to the body of water, and wherein the body of water comprises a naturally occurring river or stream;

at least one heat exchanger within the at least one enclosure to transfer heat into or out of the at least one local volume of water;

a thermal apparatus operably coupled to the at least one heat exchanger and configured to transfer the heat in and out of a fluid, the fluid being circulated between the thermal apparatus and the at least one heat exchanger; and a controller operably coupled to the thermal apparatus, wherein the controller is configured to control the transfer of the heat into or out of the at least one local volume of water to maintain a local temperature in the at least one local volume of water sustainable for the wildlife living in the body of water.

* * * * *